United States Patent
Chapman et al.

(10) Patent No.: US 11,154,049 B2
(45) Date of Patent: Oct. 26, 2021

(54) SYSTEMS AND METHODS FOR NORMOTHERMIC EXTRACORPOREAL ORGAN PERFUSION

(71) Applicant: Washington University, St. Louis, MO (US)

(72) Inventors: William Chapman, St. Louis, MO (US); Babak Banan, St. Louis, MO (US); Yiing Lin, St. Louis, MO (US)

(73) Assignee: Washington University

(*) Notice: Subject to any disclaimer, the term of this patent is extended or adjusted under 35 U.S.C. 154(b) by 470 days.

(21) Appl. No.: 15/400,809

(22) Filed: Jan. 6, 2017

(65) Prior Publication Data

US 2017/0188571 A1    Jul. 6, 2017

Related U.S. Application Data

(60) Provisional application No. 62/275,579, filed on Jan. 6, 2016, provisional application No. 62/433,219, filed on Dec. 12, 2016.

(51) Int. Cl.
*A01N 1/02* (2006.01)

(52) U.S. Cl.
CPC ......... *A01N 1/0247* (2013.01); *A01N 1/0284* (2013.01)

(58) Field of Classification Search
CPC .................................................. A01N 1/0247
See application file for complete search history.

(56) References Cited

U.S. PATENT DOCUMENTS

| | | | | |
|---|---|---|---|---|
| 5,141,847 A * | 8/1992 | Sugimachi | ............... | A01N 1/02 137/624.13 |
| 5,586,438 A * | 12/1996 | Fahy | ........................ | A01N 1/02 435/284.1 |
| 2004/0170950 A1* | 9/2004 | Prien | ........................ | A01N 1/02 435/1.2 |
| 2006/0154357 A1* | 7/2006 | Hassanein | ................ | A01N 1/02 435/284.1 |
| 2007/0009881 A1* | 1/2007 | Arzt | ........................ | A01N 1/02 435/1.2 |

OTHER PUBLICATIONS

Reiling et al., "Urea Production During Normothermic Machine Perfusion: Price of Success?", 2015, Liver Transplantation, 21, pp. 700-703. (Year: 2015).*

(Continued)

*Primary Examiner* — Jonathan M Hurst
(74) *Attorney, Agent, or Firm* — Polsinelli PC

(57) ABSTRACT

A system and method for perfusing an organ with a normothermic extracorporeal perfusion system is disclosed. The perfusion system is an active flow system using a centrifugal pump to aid in circulation. The system includes a dialyzer that removes excess fluid and impurities, while maintaining the pH, which allows the perfusion system to be used for an extended period that may exceed 24 hours. The system includes a parallel circuit, which includes at least one centrifugal pump, a membrane oxygenator comprising a heat exchanger; a dialyzer; a measurement cell for real-time monitoring of oxygen saturation and hematocrit in the liver; more than one flow probe; and an organ chamber.

9 Claims, 40 Drawing Sheets

(56) References Cited

OTHER PUBLICATIONS

Ploeg, R. et al., "Impact of Donor Factors and Preservation on Function and Survival After Liver Transplantation," Transplant. Proc., Dec. 1993, pp. 3031-3033, vol. 25, No. 6, Elsevier B.V.

Brockmann, J. et al., "Normothermic Perfusion: A New Paradigm for Organ Preservation," Ann. Surg., Jul. 2009, pp. 1-6, vol. 250, No. 1, Lippincott Williams & Wilkins, Inc.

Busuttil, R. et al., "The Utility of Marginal Donors in Liver Transplantation," Liver Transpl., Jul. 2003, pp. 651-663, vol. 9, No. 7, American Association for the Study of Liver Diseases.

Clavien P-A. et al., "Preservation and Reperfusion Injuries in Liver Allografts. An Overview and Synthesis of Current Studies," Transplantation, May 1992, pp. 957-978, vol. 53, No. 5, Williams & Wilkins, USA.

Dutkowski, P. et aL., "Novel Short-term Hypothermic Oxygenated Perfusion (HOPE) System Prevents Injury in Rat Liver Graft From Non-Heart Beating Donor," Ann. Surg., Dec. 2006, pp. 968-977, vol. 244, No. 6, Lippincott Williams & Wilkins, Inc.

Fuller, B. et al., "Possible Resuscitation of Liver Function by Hypothermic Reperfusion in Vitro After Prolonged (24-Hour) Cold Preservation—A 31P NMR Study," Transplantation, Sep. 1990, pp. 511-535, vol. 50, No. 3, Williams & Wilkins.

Graham, J. et al., "'Resuscitation' of marginal liver allografts for transplantation with machine perfusion technology," J. Hepatol., 2014, pp. 418-431, vol. 61, No. 2, Elsevier.

Imber, C. et aL, "Optimisation of Bile Production during Normothermic Preservation of Porcine Livers," Am. J. Transplant., 2002, pp. 593-599, vol. 2, No. 7, Blackwell Munksgaard.

Imber, C. et al., "Advantages of Normothermic Perfusion Over Cold Storage in Liver Preservation," Transplantation, Mar. 15, 2002, pp. 701-709, vol. 73, No. 5, Lippincott Williams & Wilkins, Inc., USA.

Izamis, M-L. et al., "Resuscitation of Ischemic Donor Livers with Normothermic Machine Perfusion: A Metabolic Flux Analysis of Treatment in Rats," PLoS One, Jul. 2013, pp. 1-11, vol. 8, No. 7, e69758.

Jain, S. et al., "Ex-vivo study of flow dynamics and endothelial cell structure during extended hypothermic machine perfusion preservation of livers," Cryobiology, Jun. 2004, pp. 322-332, vol. 48, No. 3, Elsevier Inc.

Minor, T. et al., "Liver preservation with HTK: salutary effect of hypothermic aerobiosis by either gaseous oxygen or machine perfusion," Clin. Transplant., May 14, 2002, pp. 206-211, vol. 16, No. 3, Blackwell Munksgaard.

Nassar, A. et al., "Ex Vivo Normothermic Machine Perfusion Is Safe, Simple, and Reliable: Results From a Large Animal Model," Surg. Innov., 2015, pp. 61-69, vol. 22, No. 1.

Op Den Dries, S. et al., "Ex vivo Normothermic Machine Perfusion and Viability Testing of Discarded Human Donor Livers," Am. J. Transplant., 2013, pp. 1327-1335, vol. 13, No. 5, The American Society of Transplantation and the American Society of Transplant Surgeons.

Op Den Dries, S. et al., "Hypothermic Oxygenated Machine Perfusion Prevents Arteriolonecrosis of the Peribiliary Plexus in Pig Livers Donated after Circulatory Death," PLoS ONE, Feb. 2014, pp. 1-10, vol. 9, No. 2, e88521.

Ploeg, R. et al., "Risk Factors for Primary Dysfunction After Liver Transplantation—A Multivariate Analysis," Transplantation, Apr. 1993, pp. 807-813, vol. 55, No. 4, Williams & Wilkins.

Pokorny, H. et al., "Organ survival after primary dysfunction of liver grafts in clinical orthotopic liver transplantation," Transpl. Int., 2000, pp. S154-S157, vol. 13, Suppl. 1, Springer-Verlag.

Reddy, S. et al., "Non-Heart-Beating Donor Porcine Livers: the Adverse Effect of Cooling," Liver Transpl., Jan. 2005, pp. 35-38, vol. 11, No. 1, American Association for the Study of Liver Diseases.

Reiling, J. et al., "Urea Production During Normothermic Machine Perfusion: Price of Success?," Liver Transpl., 2015, pp. 700-703, vol. 21, No. 5, American Association for the Study of Liver Diseases.

Schon, M. et al., "Liver Transplantation After Organ Preservation With Normothermic Extracorporeal Perfusion," Annl. Surg., 2001, pp. 114-123, vol. 233, No. 1, Lippincott Williams & Wilkins, Inc.

Vogel, T. et al., "The role of normothermic extracorporeal perfusion in minimizing ischemia reperfusion injury," Transplant. Rev., Apr. 2012, pp. 156-162, vol. 26, No. 2, Elsevier Inc.

Vogel, T. et al., "Ex-vivo normothermic liver perfusion: an update," Curr. Opin. Organ Transplant., Apr. 2010, pp. 167-172, vol. 15, No. 2, Wolters Kluwer Health / Lippincott Williams & Wilkins, Inc.

Xu, H. et al., "Pronlonged Hypothermic Machine Perfusion Preserves Hepatocellular Function But Potentiates Endothelial Cell Dysfunction in Rat Livers," Transplantation, Jun. 15, 2004, pp. 1676-1682, vol. 77, No. 11, Lippincott Williams & Wilkins, Inc.

\* cited by examiner

W20-NELP

W20-NELP

SYSTEMS AND METHODS FOR NORMOTHERMIC EXTRACORPOREAL ORGAN PERFUSION

CROSS REFERENCE

This application is a non-provisional that claims benefit to U.S. Provisional Patent Application Nos. 62/275,579, filed on Jan. 6, 2016, and 62/433,219, filed on Dec. 13, 2016, the disclosure of which is herein incorporated by reference in its entirety.

FIELD OF THE INVENTION

The present invention relates to systems and methods for normothermic extracorporeal organ perfusion.

BACKGROUND OF THE INVENTION

There is critical transplant organ shortage that leads to mortality of potential transplant recipients who are on the organ waitlist. The shortage leads to an interest in expanding the donor pool by using sub-optimal marginal organs like steatotic livers, grafts after cardiac death or livers from donors with acute or chronic diseases. But sub-optimal organs are more susceptible to ischemia reperfusion injury, and also post-transplant complications such as primary graft malfunction.

Normally organs that are obtained from donors are kept in cold storage before they could be used in the transplant to a recipient. The principle of cold storage relies on the reduction of metabolic activity in stored organs. Despite a substantial reduction in aerobic metabolism in low temperatures, however, anaerobic metabolism continues, leading to ATP depletion in the graft. Ultimately, accumulation of lactic acid results in phospholipase activation, cell swelling, and death. To prevent ATP depletion and its deleterious consequences during preservation, graft perfusion with oxygenated solution is necessary. Technologies that rely on cool, passive (gravity) liver perfusion are ill-suited for suboptimal liver transplantation causing complications including ischemic-reperfusion injury (IRI).

Warm perfusion of the liver can diminish IRI and prevent injuries resulting from the rewarming of a cold-preserved graft. Therefore, there is a need for a perfusion system that is optimized for normothermic perfusion, that makes use of suboptimal donor organ, that can cater to physiological and pharmacological manipulations, and that is suitable for perfusions extending for a long periods of time.

SUMMARY

The present disclosure provides for a normothermic extracorporeal organ perfusion system. This system may be used for perfusion of ex-vivo organs at a warm physiological temperature.

In one aspect, this system encompasses an active system and uses the flow pumps to assist in the flow of fluid. The system may also include a dialyzer that helps in maintaining the perfusate volume, removes impurities, and maintains pH that allows for longer perfusion time on the perfusion system.

One aspect encompasses a parallel circuit of a reservoir, at least one centrifugal pump, a membrane oxygenator, a heat exchanger, a dialyzer, a flow control, at least one pressure probe, at least one flow probe, a measurement cell for real-time monitoring of oxygen saturation and hematocrit, and an organ chamber. The reservoir may be used to store the perfusate. The membrane oxygenator may be used to exchange the carbon dioxide in the perfusate to oxygen. The dialyzer may be used to remove excess liquid and impurities from the perfusate and maintain the pH of the perfusate. The flow control may adjust the amount of perfusate that flows through the circuit in a unit of time. The pressure probe may measure the pressure of the perfusate that flows through the circuit. The flow probe may measure the volume of fluid that flows through the circuit. The measurement cell may monitor real-time oxygen saturation and hematocrit. The circuit may be connected in parallel with tubing, so that the components are in fluid connection by way of the tubing. The circuit may include a thermoelectric water pump connected to the heat exchanger of the oxygenator for controlling the perfusate temperature and capable of incrementally increasing the temperature. The organ chamber may serve as a blood reservoir. The organ to be perfused may be body organ liver, kidney, heart, lung, spleen, and pancreas. The system may include a collection port, to periodically collect perfusate during perfusion.

Another aspect may include a normothermic organ perfusion method. All the components of the perfusion circuit may be connected in parallel, with tubing that allows perfusate to flow through the components and the tubing. The components connected in parallel but not limited to the order of connection may be a reservoir, organ chamber, a dialyzer, at least one centrifugal pump, a membrane oxygenator, a flow probe, and a thermoelectric water pump. The normothermic organ perfusion system may be primed with a physiological solution and an anticoagulant. After priming and before connecting the organ, the perfusion system may be run for about 30 minutes to equilibrate the system.

In one aspect, the organ to be perfused may be connected in parallel to the system from the input artery of the organ to the venous out flow from the organ. The temperature of the perfusate may be incrementally increased from the refrigeration temperature for organ in cold storage to a normothermic temperature. During perfusion perfusate may be tested for pressure, flow, and metabolites at a periodic interval. The perfusion system may be used for perfusion and maintenance of organs for long periods of time.

Another aspect of the present invention encompasses a method to perfuse liver using a normothermic organ perfusion system including a reservoir, a liver chamber, a dialyzer, at least one centrifugal pump, a membrane oxygenator, a flow controller, flow probe, a pressure probe, and a thermoelectric water pump are connected in a parallel circuit. The system may be primed with saline and an anticoagulant. After priming and before connecting the organ, the perfusion system may be run for about 30 minutes to equilibrate the system. The liver may be placed in the organ chamber and connected in parallel to the perfusion circuit.

In an alternative aspect the system encompasses a dual input circuit. As the liver is an organ of dual circulation, the liver for perfusion may be connected to a dual input circuit. One input may be connected to the hepatic artery, and another input may be connected to the portal vein. A bile output unit connected to the bile duct may be included in the circuit. The bile may be collected and periodically reintroduced into the recirculating perfusate. The volume and flow of the perfusate that enters the liver through the hepatic artery and portal vein may be controlled and maintained to obtain a blood pressure similar to that found at physiological levels.

Additional embodiments and features are set forth in part in the description that follows, and will become apparent to those skilled in the art upon examination of the specification or may be learned by the practice of the disclosed subject matter. A further understanding of the nature and advantages of the disclosure may be realized by reference to the remaining portions of the specification and the drawings, which forms a part of this disclosure.

BRIEF DESCRIPTION OF THE DRAWINGS

The following figures illustrate various aspects of the disclosure. The description will be more fully understood with reference to the following figures and data graphs, which are presented as various embodiments of the disclosure and should not be construed as a complete recitation of the scope of the disclosure, wherein.

DETAILED DESCRIPTION

Figure 1A:
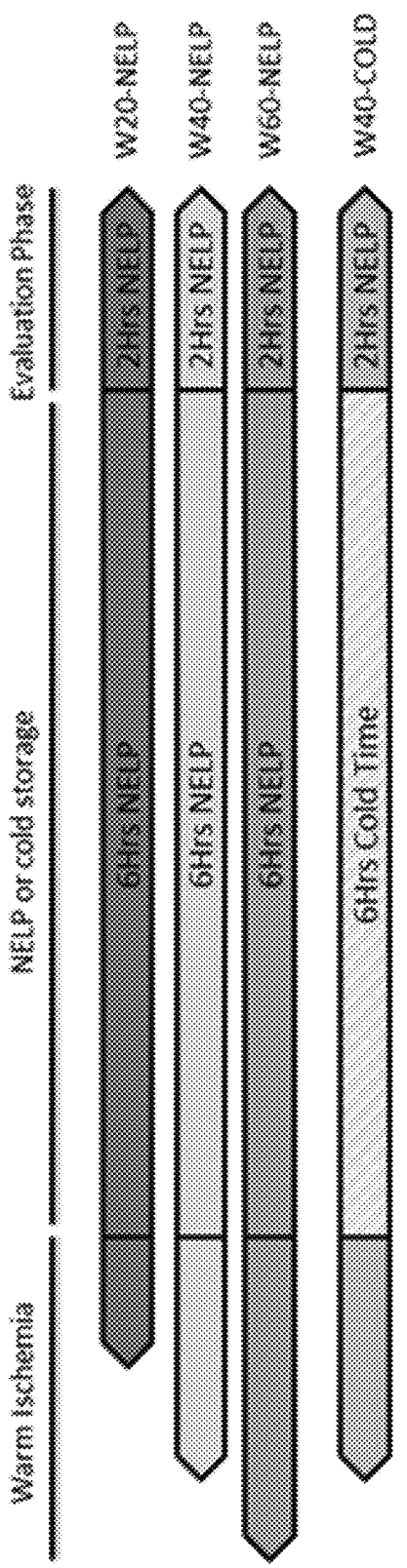
FIG. 1A is a schematic of a study design using experimental pigs to illustrate an aspect of normothermic extracorporeal liver perfusion for donation after cardiac death.

The disclosure may be understood by reference to the following detailed description, taken in conjunction with the drawings as described below. It is noted that, for purposes of illustrative clarity, certain elements in various drawings may not be drawn to scale.

Provided herein is a Normothermic Extracorporeal Perfusion systems and methods. The system improves organ performance, reduces ischemic damage, and restores physiologic function and viability prior to transplant in comparison to cold perfusion. The system may enable long term perfusion of up to and more than 24 hours.

In one aspect, the perfusion system may be used on an organ immediately after removal from the donor. In another aspect, the perfusion system may also be used on organs that have been previously in kept in cold storage.

In an aspect, for organs that have been in cold storage before transplant, the perfusion may be carried out at the constant physiological temperature or the temperature of the perfusate may be incrementally increased form the cold temperature to that of the Normothermic temperature. For example, the temperature of the perfusate in the circuit that is used to perfused organs previously in cold storage, the perfusion can start at a refrigeration temperature of about 4° C. and increase to a physiological temperature of about 37° C. to about 38° C. In various aspects the perfusion temperature may start at about 1° C. to about 20° C., from about 5° C. to about 30° C., from about 10° C. to about 40° C. The time taken to increase the temperature of the circulating perfusate in the perfusion system, form refrigeration temperature to physiological temperature may range from about 20 minutes to about 120 minutes. In various aspects, the time taken to raise the perfusate from cold storage temperature to physiological temperature may be from about 5 minutes to about 30 minutes, from about 20 minutes to about 40 minutes, from about 30 minutes to about 50 minutes, from about 40 minutes to about 70 minutes, from about 60 minutes to about 90 minutes, from about 70 minutes to about 110 minutes, from about 80 minutes to about 120 minutes, and from about 100 minutes to about 140 minutes. In an aspect, the total length of organ perfusion may range from one hour to up to 24 hours. In various aspects, the total length of organ perfusion may range from about 30 minutes to about 2 hours, from about 1 hour to about 4 hours, from about 3 hours to about 6 hours, from about 4 hours to about 8 hours, from about 6 hours to about 12 hours, from about 8 hours to about 16 hours from about 12 hours to about 24 hours, from about 16 hours to about 28 hours, from about 20 hours to about 32 hours.

In an aspect, the perfusion system may be used to maintain an organ to preserve its metabolic activity and health of the organ. The organ to be perfused may be a human organ obtained from a donor that needs to be preserved before transplantation. In an alternative aspect, the organ may also be an organ from other animals for example but limited to organs of animals like dogs, cats, and farm animals. The organ to be perfused may be an organ such as but not limited to a liver, kidney, pancreas, spleen, lung, or heart.

In an aspect, the perfusion system may be used with a healthy donated organ that needs to be maintained before transplant to a recipient. In an alternative aspect the perfusion system may also be used with a sub-optimal organ that may need to be processed by perfusion before transplanting to a recipient. The suboptimal organ may be for example, but not limited to, a steatotic liver that has reduced liver function and would normally lead to a decrease in transplant success rate. In an alternative aspect, perfusion system may be used to extract the lipids from the steatotic liver, before the liver, now defattened could be transplanted to a donor.

In one aspect, the perfusion system may be a parallel circuit and include components including but not limited to an organ chamber, at least one reservoir, at least one fluid pump, a dialyzer, a membrane oxygenator, a fluid flow/pressure controller, at least one flow and/or pressure probe, heat exchanger, and a temperature controller. The organ chamber in the perfusion system may also act as the reservoir for the perfusate. The system may also include at least one sampling port, to sample the perfusate. The perfusion system may also include a probe to monitor the saturation level or hematocrit value of the perfusate. In an aspect, the membrane oxygenator included in the perfusion system may maintain the perfusate at a physiological oxygen and carbon dioxide level for example at the vascular docking side of the circuit the oxygen level may be maintained at about 95% and carbon dioxide % may be maintained at about 5%. In various aspects, the oxygen level may be from about 75% to about 95%, from about 80% to about 98%, from about 85% to about 97%. In various aspects the carbon dioxide percentage may be from about 15% to about 5%, from about 20% to about 2%, from about 15% to about 3%.

Figure 1B:
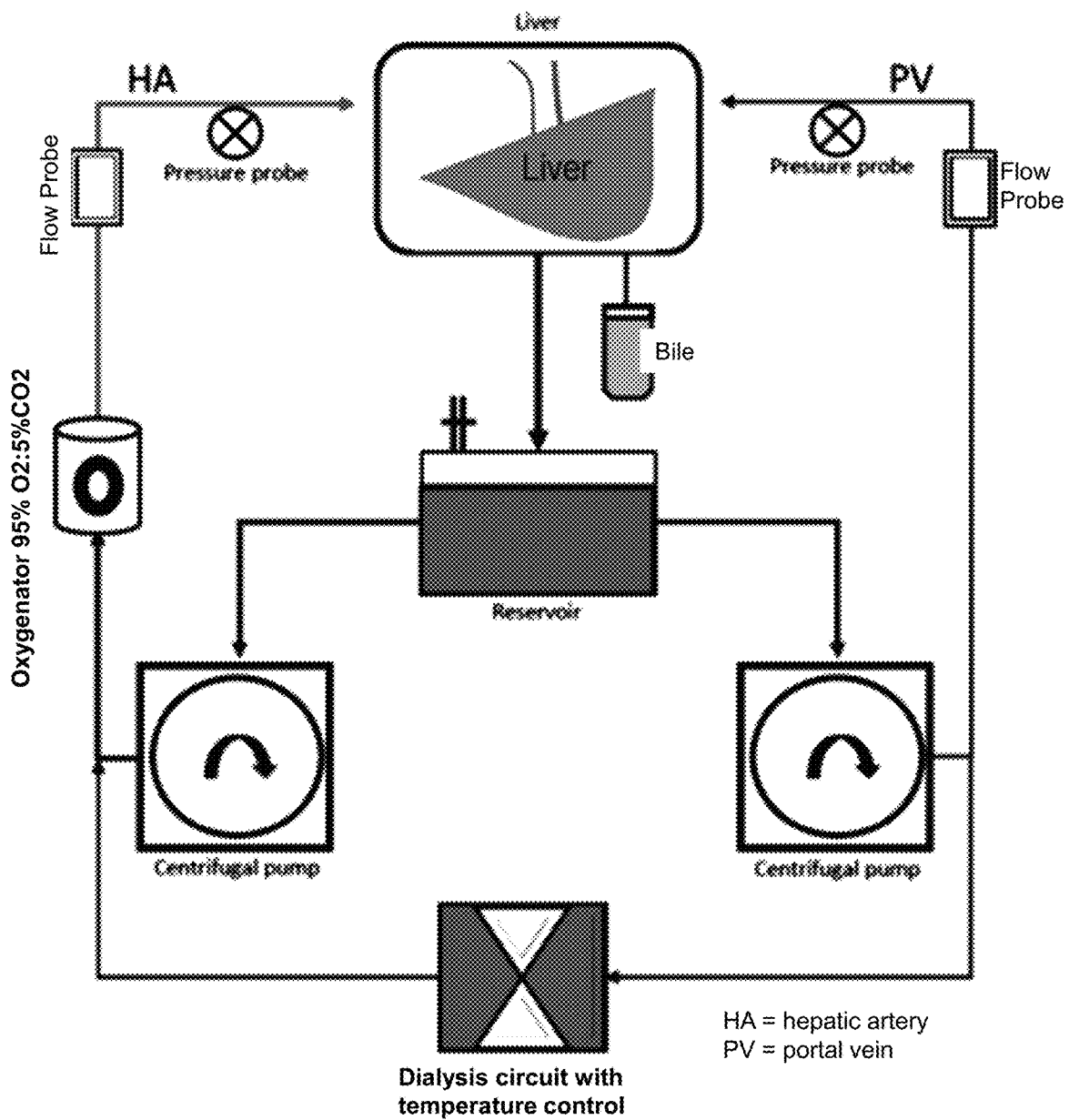
FIG. 1B illustrates an aspect of a perfusion system that may be used to perfuse liver by a dual recirculating circuit.

In an aspect, the perfusion system may be used in the perfusion of organs that contain a dual blood supply for example the liver, the perfusion system 100 may include a dual recirculating circuit, as illustrated by FIG. 1B. The dual circulating circuit may include an organ chamber 102, two centrifugal pumps 104, 106, a venous reservoir bag 108, membrane oxygenator 110, two flow probes 112, 114, two pressure probes 116, 118, and a dialyzer 120. In the liver, the dual recirculating system may include a dual input, one input 106 to the hepatic artery using one centrifugal pump and another 108 to the portal vein using another centrifugal pump. If the organ being perfused is a liver 126, the perfusion system may include, bile collecting output unit 128 connected to the bile duct. Bile collected from the bile collecting output unit may be periodically introduced into the perfusate to recirculate through the liver.

Figure 7A:
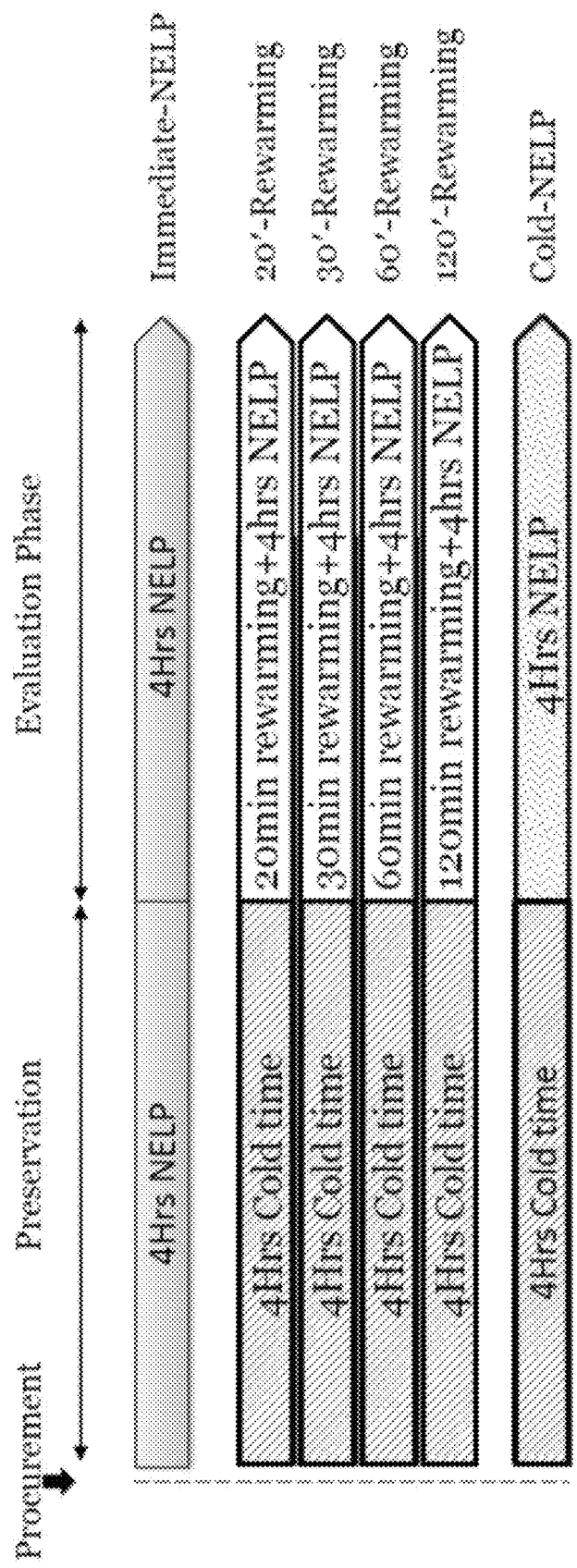
FIG. 7A is a schematic of a study design using experimental groups of pigs to illustrate an aspect of normothermic extracorporeal liver perfusion with gradual rewarming of cold stored livers.
Figure 7B:
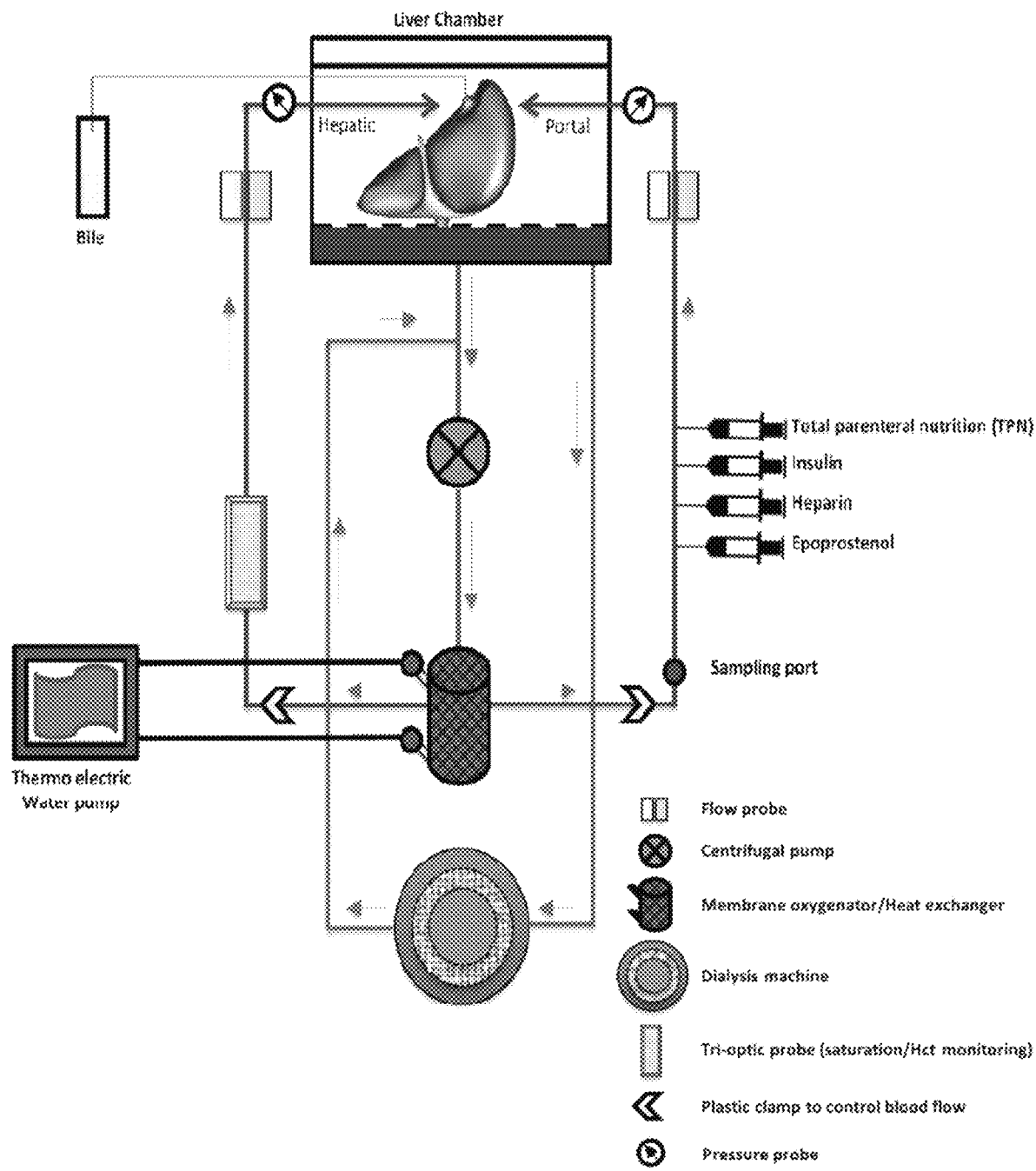
FIG. 7B illustrates an aspect of a perfusion circuit that may be used to perfuse liver after gradual rewarming of cold stored livers.

In an alternative aspect, the perfusion system 200 to perfuse the liver may be a single re-circulating circuit as illustrated by FIG. 7B, which may include, but is not limited to, one centrifugal pump 204, a liver chamber 202 that served as blood reservoir, a membrane oxygenator/heat exchanger 210, two flow probes 212, 214, two pressure probes 216, 218, and a dialyzer 220. Perfusate temperature may be controlled by a thermoelectric water pump 230 connected to the integrated heat exchanger of the oxygenator, and heparin infused at about 500 U/hr. The perfusion system 200 may include bile collecting output unit 228, a triopic probe 232 to measure saturation and or heamatocrit, and a sampling port 234 to periodically collect perfusate. In an aspect, the perfusion system 200 may have an infusion unit 250. In one aspect, the infusion unit may have subunits including subunit for the infusion of total parenteral nutrition (TPN) 252, subunit for insulin 254, subunit for heparin 256, and subunit for epoprostenol 258. In various aspects the heparin infused may be about 300 U/hr to about 400 U/hr, from about 350 U/hr to about 450 U/hr, about 400 U/hr to about 500 U/hr, and about 450 U/hr to about 550 U/hr. In an aspect, prior to placement on perfusion, the kidney may be flushed with about 2 L of saline via the renal artery. In various aspects, the kidney may be infused with about 1 L to about 2 L, about 1.5 L to about 2.5 L and about 2 L to about 3 L of saline.

In an aspect, the liver may be covered with a thin plastic sheet to prevent excess evaporation. The flows may be maintained at about 0.45±0.15 L/min for the hepatic artery and about 1.3±0.2 L/min for the portal vein to achieve constant arterial pressures of about 80±5 mmHg and portal pressures of about 6±1 mmHg. The membrane oxygenator may be supplemented with about 95% $O_2$ and about 5% $CO_2$. In various aspects, the oxygen level in the membrane oscillator may be from about 75% to about 95%, from about 80% to about 98%, from about 85% to about 97%. In various aspects, the carbon dioxide percentage may be from about 15% to about 5%, from about 20% to about 2%, from about 15% to about 3%. The flows and pressures may be constantly monitored and the hematocrit may be kept between about 20 and about 25 by ultra-filtration of excess fluid by dialysis. In various aspects, the hematocrit values may be kept between from about 15 to about 20, from about 18 to about 22, from about 20 to about 24, and from about 25 to about 30. The perfusate may be supplemented with Clinimix E4.25/5 at about 7 ml/hr, prostacyclin at about 10 mcg/hr, and insulin at about 10 U/hr. In various aspects the perfusate may be supplemented with Clinimix E4.25/5 at about 5 ml/hr to about 8 ml/hr, about 6 ml/hr to about 10 ml/hr, and 8 ml/hr to about 12 ml/hr. In various aspects the perfusate may be supplemented with prostacyclin at about 5 mcg/hr to about 8 mcg/hr, 6 mcg/hr to about 10 mcg/hr, and 9 mcg/hr to about 12 mcg/hr. In various aspects the perfusate may be supplemented with insulin at about 7 U/hr to about 9 U/hr, about 8 U/hr to about 10 U/hr, about 9 U/hr to about 12 U/hr.

Figure 14A:
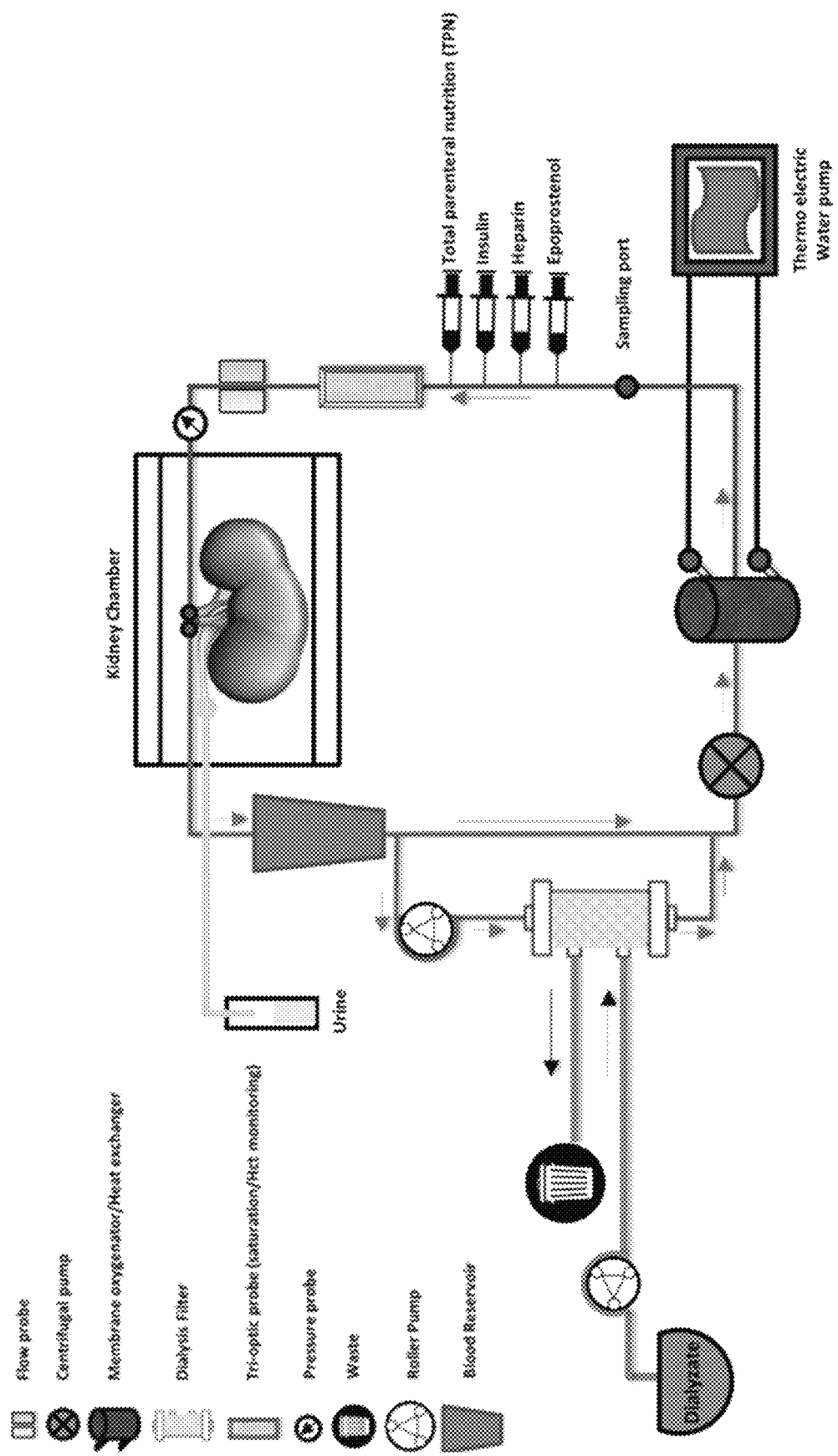
FIG. 14A illustrates a kidney normothermic extracorporeal perfusion circuit type A.
Figure 14B:
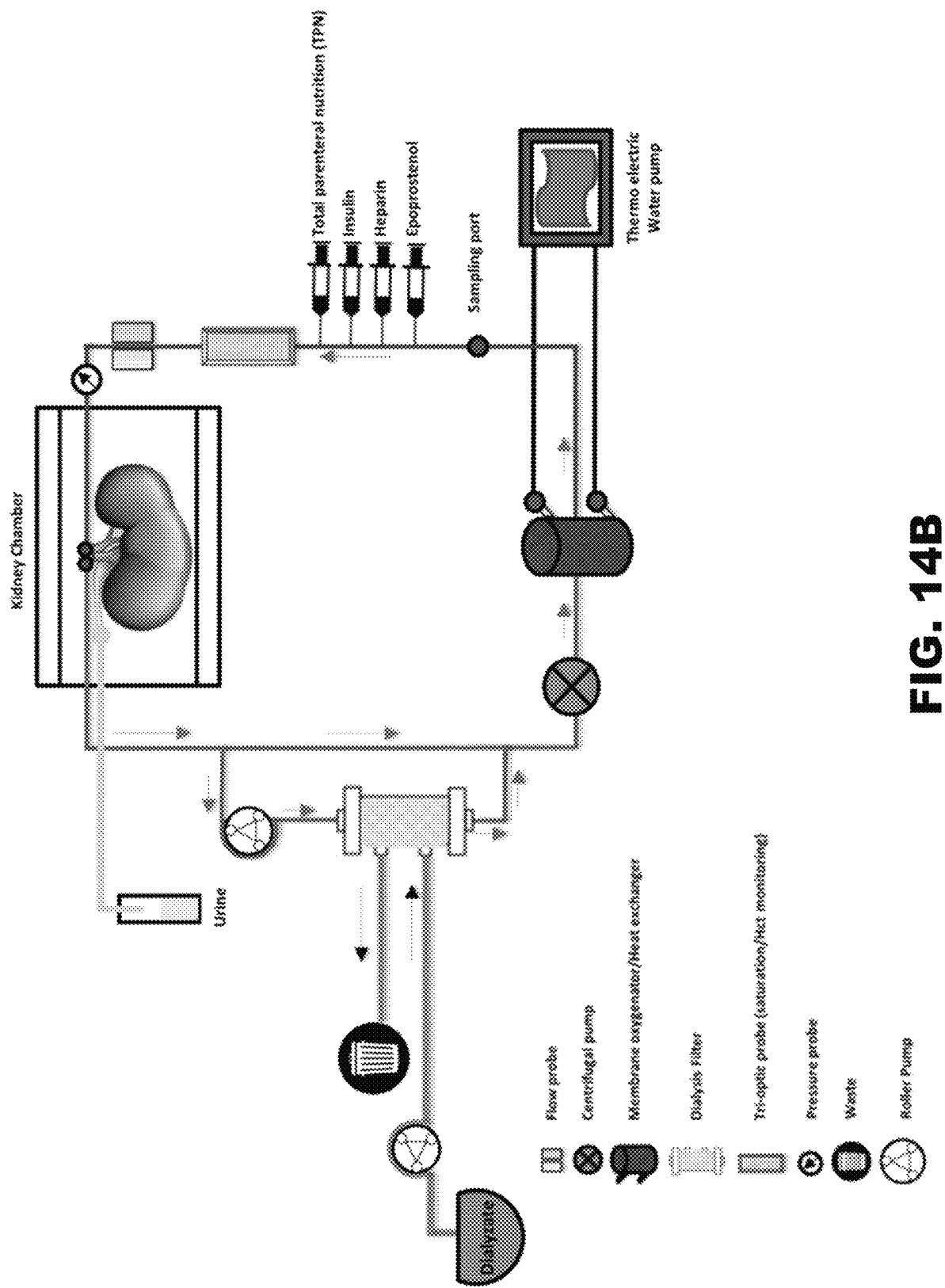
FIG. 14B illustrates a kidney normothermic extracorporeal perfusion circuit type B.
Figure 14C:
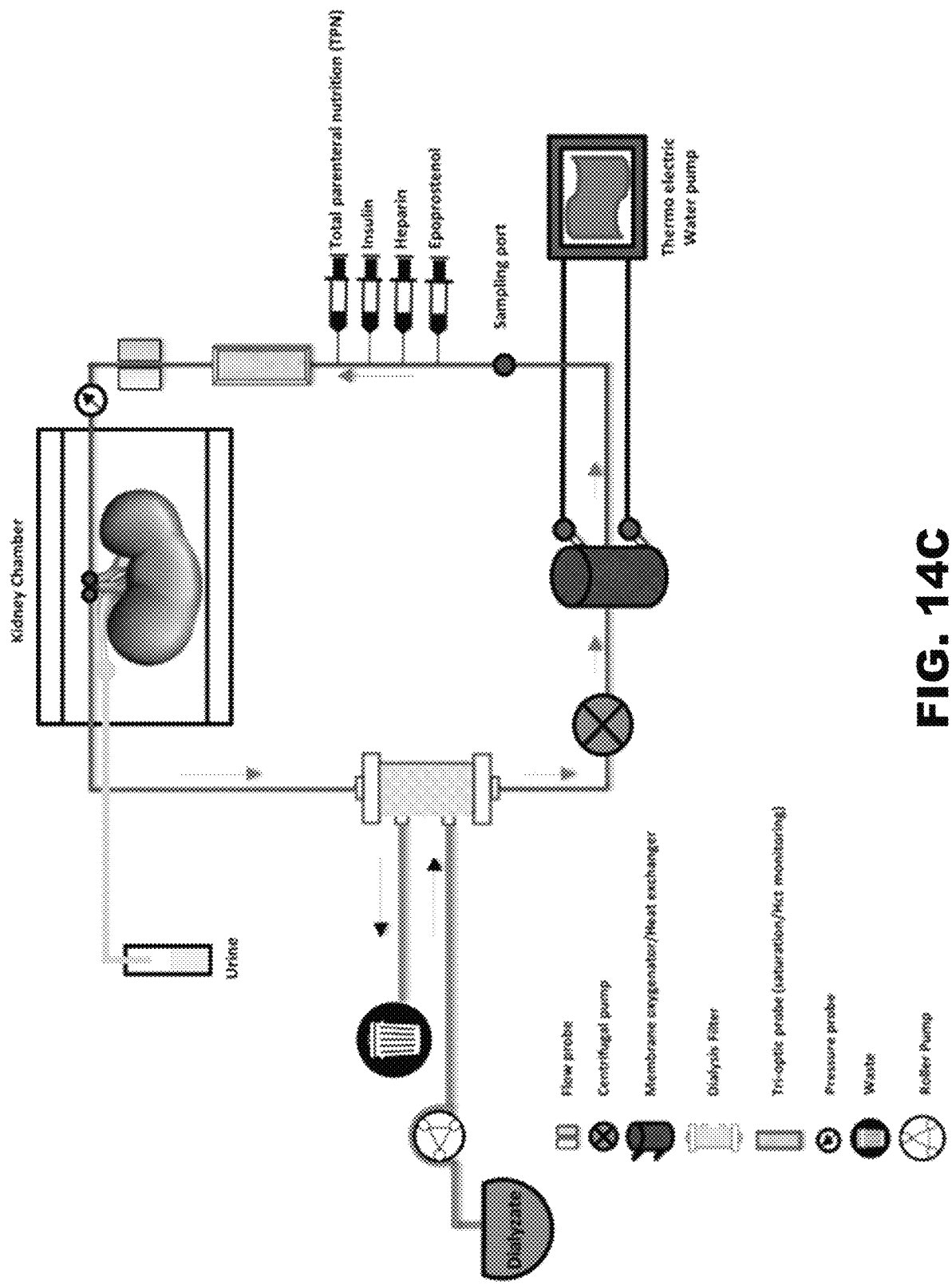
FIG. 14C illustrates a kidney normothermic extracorporeal perfusion circuit type C.

In an aspect the perfusion system may be for organs that include a single blood supply for example the kidney the system may be a single re-circulating closed system, as illustrated by FIG. 14A, FIG. 14B, and FIG. 14C. If the perfused organ is the kidney, the perfusion system may include urine collecting output unit that is connected to the ureter of the kidney and collects the urine that is produced during perfusion. The urine may be periodically discarded during perfusion.

In one aspect of a perfusion system 300 to perfuse a kidney, as illustrated by FIG. 14A, the system may include a single re-circulating circuit which may include, but is not limited to, one centrifugal pump 304, two roller pumps 342, 344, a kidney chamber 302 that serves as blood reservoir, a membrane oxygenator/heat exchanger 310, an additional blood reservoir 303, a flow probe 314, a pressure probe 318, a trioptic probe 332 to measure saturation and hematocrit, and a dialyzer 320. The perfusion system 300 may also include a waste collection unit 346 and a dialysate reservoir 340, connected to the dialyzer 320. The perfusion system 300 may have an infusion unit 350. In one aspect, the infusion unit may have subunits including subunit for the infusion of total parenteral nutrition (TPN) 352, subunit for insulin 354, subunit for heparin 356, and subunit for epoprostenol 358. Perfusate temperature may be controlled by a thermoelectric water pump 330 connected to the integrated heat exchanger of the oxygenator 310, and heparin infused at about 500 U/hr. In various aspects, the heparin infused may be about 300 U/hr to about 400 U/hr, from about 350 U/hr to about 450 U/hr, about 400 U/hr to about 500 U/hr, and about 450 U/hr to about 550 U/hr. In an aspect, prior to placement on perfusion, the kidney may be flushed with about 2 L of saline via the renal artery. In various aspects, the kidney may be infused with about 1 L to about 2 L, about 1.5 L to about 2.5 L and about 2 L to about 3 L of saline. The kidney may be covered with a thin plastic sheet to prevent excess evaporation. The flows may be maintained at physiological arterial pressure. The membrane oxygenator may be supplemented with about 95% O2 and about 5% CO2. In various aspects, the oxygen level in the membrane oscillator may be from about 75% to about 95%, from about 80% to about 98%, from about 85% to about 97%. In various aspects, the carbon dioxide percentage may be from about 15% to about 5%, from about 20% to about 2%, from about 15% to about 3%. The flows and pressures may be constantly monitored and the hematocrit may be kept between about 20 and about 25 by ultra-filtration of excess fluid by dialysis. In various aspects, the hematocrit values may be kept between from about 15 to about 20, from about 18 to about 22, from about 20 to about 24, and from about 25 to about 30. The perfusate may be supplemented with nutrients including amino acids, a vasodilator and insulin. In an aspect, the perfusate may be supplemented with Clinimix E4.25/5, prostacyclin, and insulin. The perfusate may be supplemented with Clinimix E4.25/5 at about 7 ml/hr, prostacyclin at about 10 mcg/hr and insulin at about 10 U/hr. In various aspects the perfusate may be supplemented with about 5 ml/hr to about 8 ml/hr, about 6 ml/hr to about 10 ml/hr, and 8 ml/hr to about 12 ml/hr of Clinimix E4.25/5. In various aspects the perfusate may be supplemented with about 5 mcg/hr to about 8 mcg/hr, 6 mcg/hr to about 10 mcg/hr, and 9 mcg/hr to about 12 mcg/hr of prostacyclin. In various aspects the perfusate may be supplemented with about 7 U/hr to about 9 U/hr, about 8 U/hr to about 10 U/hr, about 9 U/hr to about 12 U/hr of insulin.

In an alternative aspect of a perfusion system 400 to perfuse a kidney, as illustrated by FIG. 14B, the system may include a single re-circulating circuit which may include, but is not limited to, one centrifugal pump 304, two roller pumps 342, 344, a kidney chamber 302 that serves as blood reservoir, a membrane oxygenator/heat exchanger 310, a flow probe 314, a pressure probe 318, a trioptic probe 332 to measure saturation and hematocrit, and a dialyzer 320. Perfusate temperature may be controlled by a thermoelectric water pump 330 connected to the integrated heat exchanger of the oxygenator, and heparin may be infused at 500 U/hr. prior to placement on perfusion, the kidney may be flushed with 2 L of saline via the renal artery. The perfusion system 400 may also include a waste collection unit 346 and a dialysate reservoir 340, connected to the dialyzer 320. The perfusion system 300 may have an infusion unit 350. In one aspect, the infusion unit may have subunits including subunit for the infusion of total parenteral nutrition (TPN) 352, subunit for insulin 354, subunit for heparin 356, and subunit for epoprostenol 358. Perfusate temperature may be controlled by a thermoelectric water pump 330 connected to the integrated heat exchanger of the oxygenator 310, and heparin infused at about 500 U/hr. The kidney may be covered with a thin plastic sheet to prevent excess evaporation. The flows may be maintained at physiological arterial pressure. The membrane oxygenator may be supplemented with 95% $O_2$ and 5% $CO_2$. In various aspects, the oxygen level in the membrane oscillator may be from about 75% to about 95%, from about 80% to about 98%, from about 85% to about 97%. In various aspects, the carbon dioxide percentage may be from about 15% to about 5%, from about 20% to about 2%, from about 15% to about 3%. The flows and pressures may be constantly monitored and the hematocrit may be kept between about 20 and about 25 by ultra-filtration of excess fluid by dialysis. In various aspects, the hematocrit values may be kept between from about 15 to about 20, from about 18 to about 22, from about 20 to about 24, and from about 25 to about 30. The perfusate may be supplemented with nutrients including amino acids, a vasodilator and insulin. In an aspect, the perfusate may be supplemented with Clinimix E4.25/5, prostacyclin, and insulin. The perfusate may be supplemented with Clinimix E4.25/5 at about 7 ml/hr, prostacyclin at about 10 mcg/hr and insulin at about 10 U/hr. In various aspects the perfusate may be supplemented with about 5 ml/hr to about 8 ml/hr, about 6 ml/hr to about 10 ml/hr, and 8 ml/hr to about 12 ml/hr of Clinimix E4.25/5. In various aspects the perfusate may be supplemented with about 5 mcg/hr to about 8 mcg/hr, 6 mcg/hr to about 10 mcg/hr, and 9 mcg/hr to about 12 mcg/hr of prostacyclin. In various aspects the perfusate may be supplemented with about 7 U/hr to about 9 U/hr, about 8 U/hr to about 10 U/hr, about 9 U/hr to about 12 U/hr of insulin.

In another alternative aspect of a perfusion system 500 to perfuse a kidney, as illustrated by FIG. 14C, the system may include a single re-circulating circuit which may include, but is not limited to, one centrifugal pump 304, one roller pumps 344, a kidney chamber 302 that serves as blood reservoir, a membrane oxygenator/heat exchanger 310, a flow probe 314, a pressure probe 318, a trioptic probe 332 to measure saturation and hematocrit, and a dialyzer 320. Perfusate temperature may be controlled by a thermoelectric water pump 330 connected to the integrated heat exchanger of the oxygenator, and heparin may be infused at 500 U/hr. prior to placement on perfusion, the kidney may be flushed with 2 L of saline via the renal artery. The perfusion system 400 may also include a waste collection unit 346 and a dialysate reservoir 340, connected to the dialyzer 320. The perfusion system 300 may have an infusion unit 350. In one aspect, the infusion unit may have subunits including subunit for the infusion of total parenteral nutrition (TPN) 352, subunit for insulin 354, subunit for heparin 356, and subunit for epoprostenol 358. Perfusate temperature may be controlled by a thermoelectric water pump 330 connected to the integrated heat exchanger of the oxygenator 310, and heparin infused at about 500 U/hr. The kidney may be covered with a thin plastic sheet to prevent excess evaporation. The flows may be maintained at physiological arterial pressure. The membrane oxygenator may be supplemented with about 95% $O_2$ and about 5% $CO_2$. In various aspects, the oxygen level in the membrane oscillator may be from about 75% to about 95%, from about 80% to about 98%, from about 85% to about 97%. In various aspects, the carbon dioxide percentage may be from about 15% to about 5%, from about 20% to about 2%, from about 15% to about 3%. The flows and pressures may be constantly monitored and the hematocrit may be kept between about 20 and about 25 by ultrafiltration of excess fluid by dialysis. In various aspects, the hematocrit values may be kept between from about 15 to about 20, from about 18 to about 22, from about 20 to about 24, and from about 25 to about 30. The perfusate may be supplemented with nutrients including amino acids, a vasodilator and insulin. In an aspect, the perfusate may be supplemented with Clinimix E4.25/5, prostacyclin, and insulin. The perfusate may be supplemented with Clinimix E4.25/5 at about 7 ml/hr, prostacyclin at about 10 mcg/hr and insulin at about 10 U/hr. In various aspects the perfusate may be supplemented with about 5 ml/hr to about 8 ml/hr, about 6 ml/hr to about 10 ml/hr, and 8 ml/hr to about 12 ml/hr of Clinimix E4.25/5. In various aspects the perfusate may be supplemented with about 5 mcg/hr to about 8 mcg/hr, 6 mcg/hr to about 10 mcg/hr, and 9 mcg/hr to about 12 mcg/hr of prostacyclin. In various aspects the perfusate may be supplemented with about 7 U/hr to about 9 U/hr, about 8 U/hr to about 10 U/hr, about 9 U/hr to about 12 U/hr of insulin.

In an aspect the perfusion system may be limited in size by using only a single centrifugal pump and or a single roller pump that would reduce the volume of flow through the perfusion system. In various aspects of the system, the volume of flow may be from about 800 cc to about 900 cc, about 850 cc to about 1000 cc, about 900 cc to about 1100 cc, about 1000 cc to about 1200 cc, about 1100 cc to about 1300 cc, about 1200 cc to about 1400 cc, about 1300 cc to about 1500 cc. In one aspect the volume of flow through the system is from about 800 cc to about 1500 cc.

In one aspect the dialyzer included in the perfusion system may include a hollow fiber dialyzer with about 4000 $cm^2$ surface area. In various aspects, the dialyzer of the perfusion system may include a surface area ranging from about 2000 $cm^2$ to about 3000 $cm^2$, from about 2500 $cm^2$ to about 4000 $cm^2$, from about 3000 $cm^2$ to about 4500 $cm^2$, and from about 3500 to about 5500 $cm^2$ surface area, respectively. In one aspect the dialyzer may be used to remove excess solution from the recirculating perfusate, to maintain the saturation of the perfusion fluid or the hematocrit of the perfusate when the perfusate is blood. The dialyzer may stabilize the pH and amounts of electrolytes in the perfusate, and remove impurities from the perfusate. In another aspect the dialyzer may also remove excess calcium from the recirculating perfusate and thus reduce the ischemic reperfusion injury that may be due to accumulation of Calcium. The removal of fluid, impurities, calcium, and maintenance of pH may allow for longer perfusion times, even to the perfusion times of more than 24 hours.

In an aspect the organ perfusion system may be primed before connecting the organ into the organ chamber. The priming solution may include saline or other physiological solution and an anticoagulant. The priming solution may be about 700 ml of normal saline and about 10,000 units of heparin. In various aspects, the priming solution used may be from about 500 ml to about 650 ml, from about 550 ml to about 700 ml from about 650 ml to about 750 ml from about 700 ml to about 850 ml, from about 800 ml to about 1000 ml, from about 950 ml to about 1500 ml of normal saline. The perfusate that may be blood may then be added to the perfusion system and the perfusion system may be run for about 30 minutes to achieve equilibrium with the system before the organ to be perfused is connected to the system. In various aspects, the priming solution used may contain from about 5000 units to about 7500 units, from about 6000 units to about 8500 units, from about 8000 units to about 1100 units, and from about 1000 units to about 1200 units of Heparin.

In one aspect the circuit of the perfusion system may include an additional waste collection output unit that is connected to the dialyzer output and collects excess fluid and other impurities filtered out by the dialyzer. The waste may be periodically discarded during perfusion.

In one aspect the perfusate used in the perfusion system may be the donor's blood. In an alternative aspect, the perfusate may be compatible blood that is not the donor's blood. In an alternative aspect the perfusate may be physiological isotonic solutions, for example but not limited to normal saline, Ringer's solution, and 5% dextrose. In another alternative aspect, the perfusate may include chemical and enzymes that digest cells, for example but not limited to sodium dodecyl sulfate, deoxycholic acid, Triton X, Trypsin, collagenases, lipases, nucleases, exonucleases.

In an aspect the organ chamber may serve as the reservoir for the perfusate. In an alternative aspect, the perfusion system may also include an additional reservoir to store the perfusate.

The perfusion system may be used to create organ scaffold for organ engineering. The donor organ used for the organ scaffold may be a pig organ for example but not limited to a pig heart or the liver. If the perfusion system is used for organ scaffold, the perfusate may be a solution containing enzymes or other chemicals that would digest and remove the cells from the donor organ to create a scaffold.

In one aspect the perfusion system may also be used to repopulate the organ scaffold with autologous and heterologous pluripotent cells. The scaffold may be maintained on the perfusion system during recellularization with pluripotent cells and formation of a functional organ. Organ scaffolds may be created by treating organs of animals like pigs. The perfusion system may be used to create organs on demand, and created from cells autologous or homologous to the transplant recipient, to decrease the immune graft rejection of organs in the recipients.

Figure 15A:
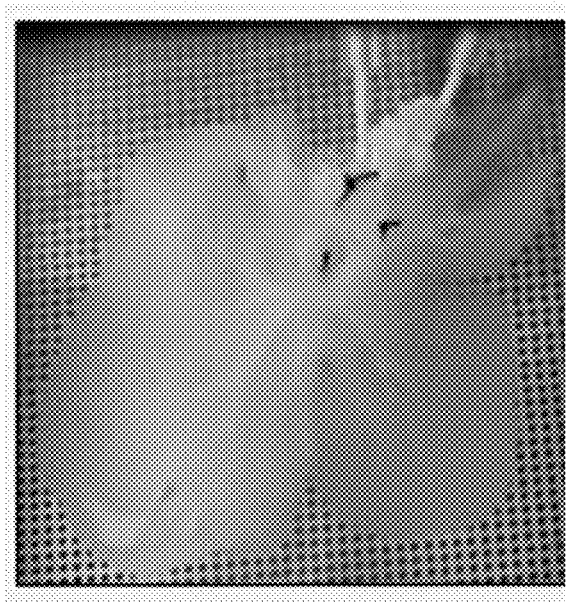
FIG. 15A illustrates the perfusion of liver with a dye during liver decellularization by Normothermic extracorporeal perfusion.
Figure 15B:
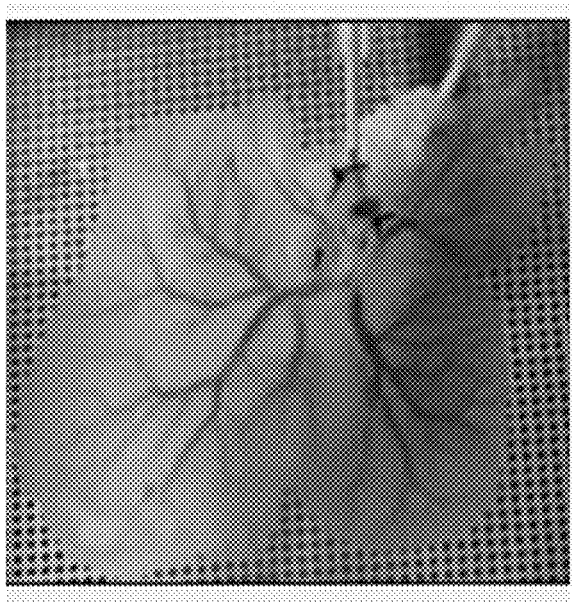
FIG. 15B Illustrates the perfusion of liver with a dye during liver decellularization by Normothermic extracorporeal perfusion.
Figure 15C:
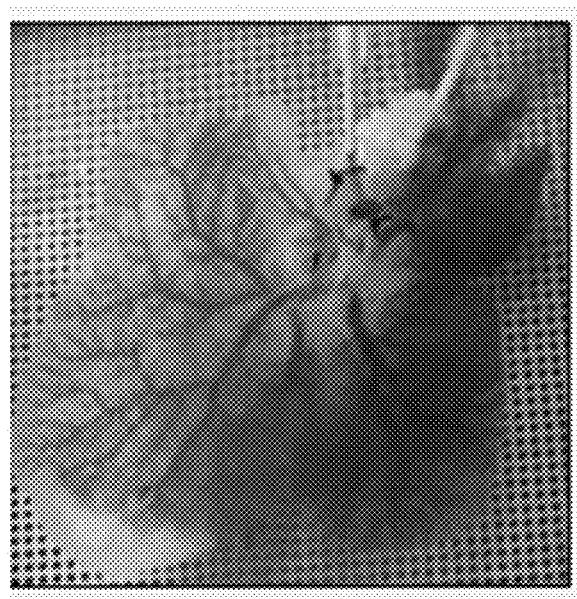
FIG. 15C Illustrates the perfusion of liver with a dye during liver decellularization by Normothermic extracorporeal perfusion.
Figure 15D:
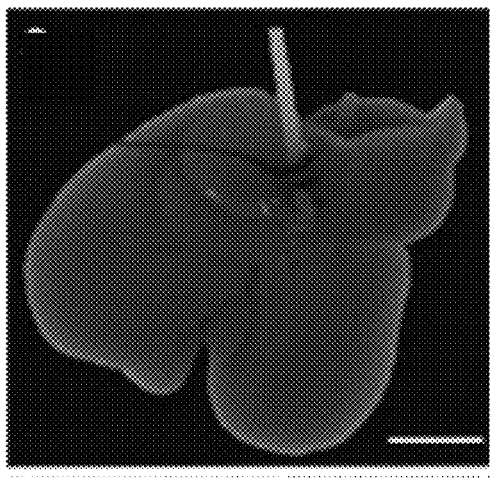
FIG. 15D illustrates the decellularization of the liver using normothermic extracorporeal liver perfusion.
Figure 15E:
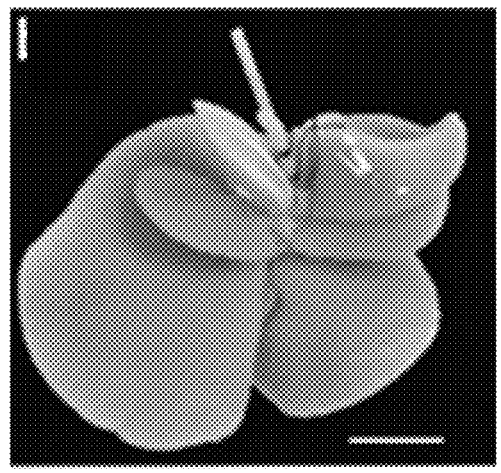
FIG. 15E illustrates the decellularization of the liver using normothermic extracorporeal liver perfusion.
Figure 15F:
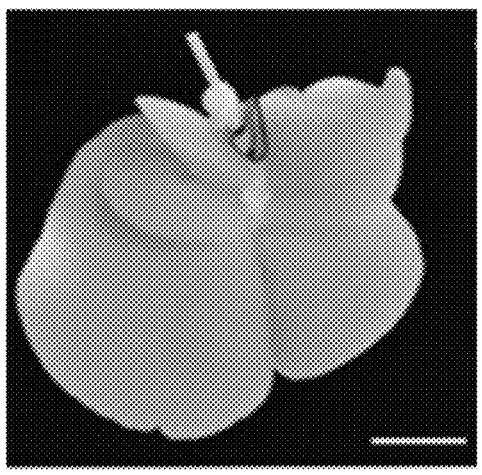
FIG. 15F illustrates the decellularization of the liver using normothermic extracorporeal liver perfusion.
Figure 15G:
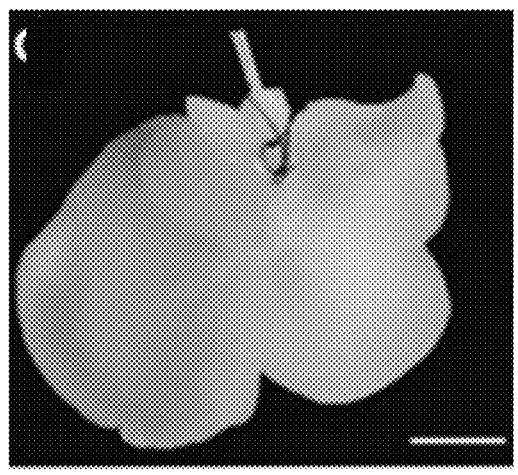
FIG. 15G illustrates the decellularization of the liver using normothermic extracorporeal liver perfusion.
Figure 15H:
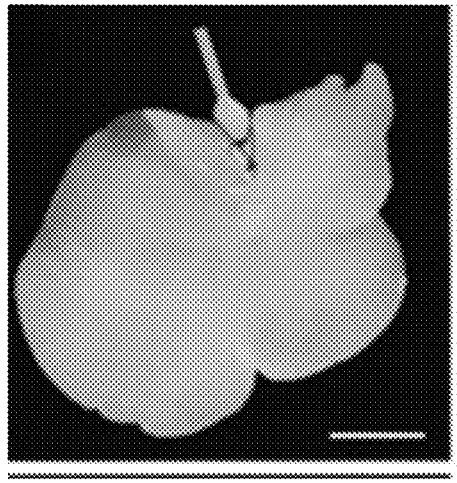
FIG. 15H illustrates the decellularization of the liver using normothermic extracorporeal liver perfusion.
Figure 15I:
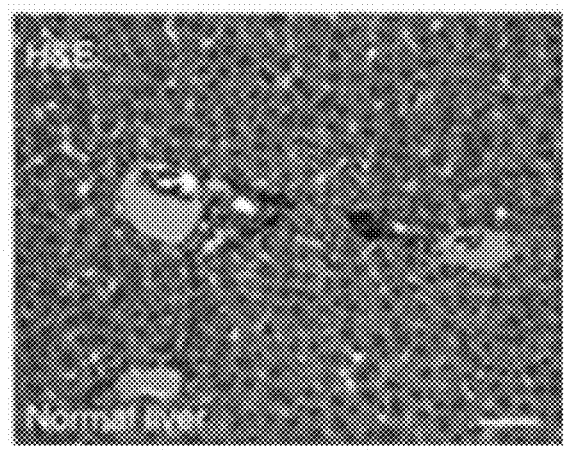
FIG. 15I illustrates the decellularization of the liver using normothermic extracorporeal liver perfusion.
Figure 15J:
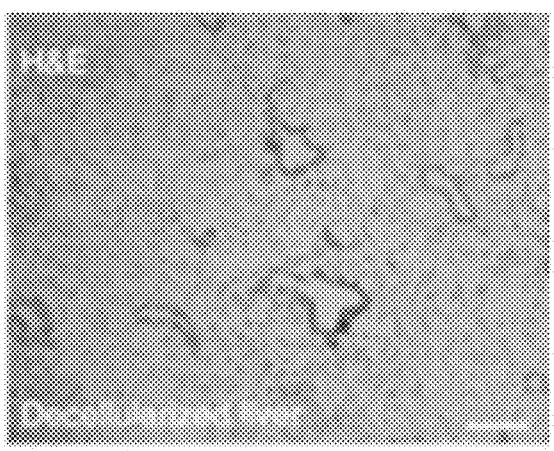
FIG. 15J illustrates the decellularization of the liver using normothermic extracorporeal liver perfusion.
Figure 15K:
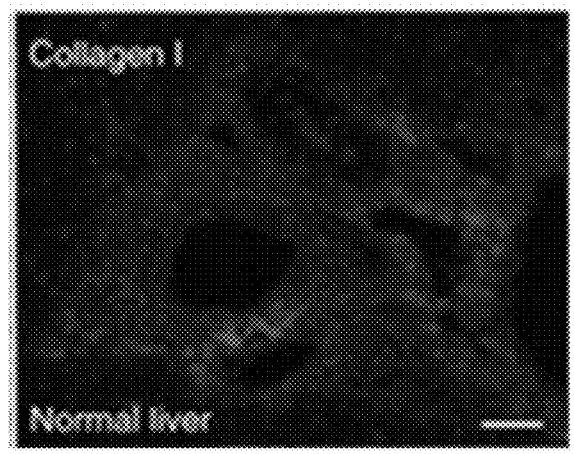
FIG. 15K illustrates the decellularization of the liver using normothermic extracorporeal liver perfusion.
Figure 15L:
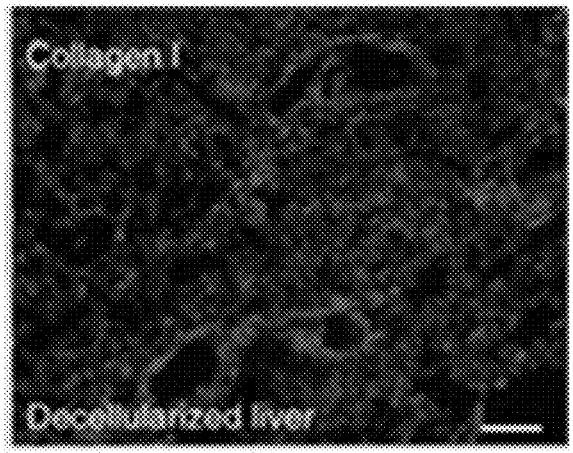
FIG. 15L illustrates the decellularization of the liver using normothermic extracorporeal liver perfusion.
Figure 15M:
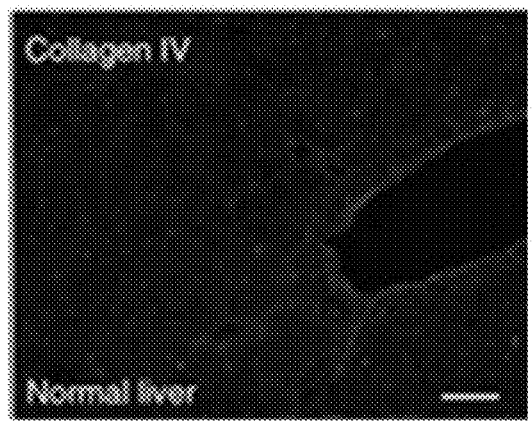
FIG. 15M illustrates the decellularization of the liver using normothermic extracorporeal liver perfusion.
Figure 15N:
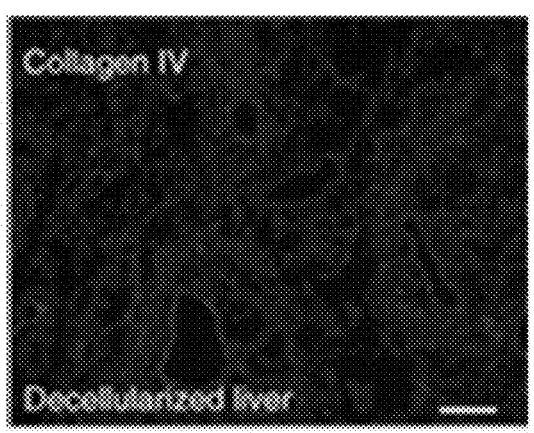
FIG. 15N illustrates the decellularization of the liver using normothermic extracorporeal liver perfusion.
Figure 15O:
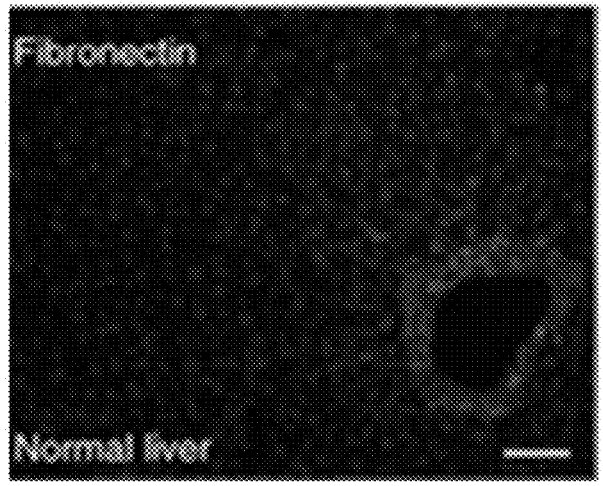
FIG. 15O illustrates the decellularization of the liver using normothermic extracorporeal liver perfusion.
Figure 15P:
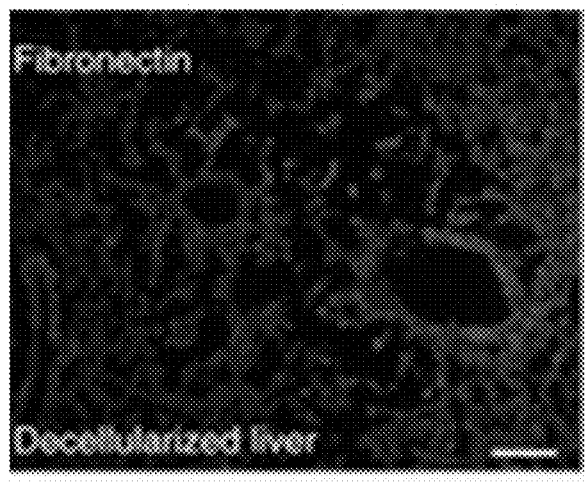
FIG. 15P illustrates the decellularization of the liver using normothermic extracorporeal liver perfusion.
Figure 15Q:
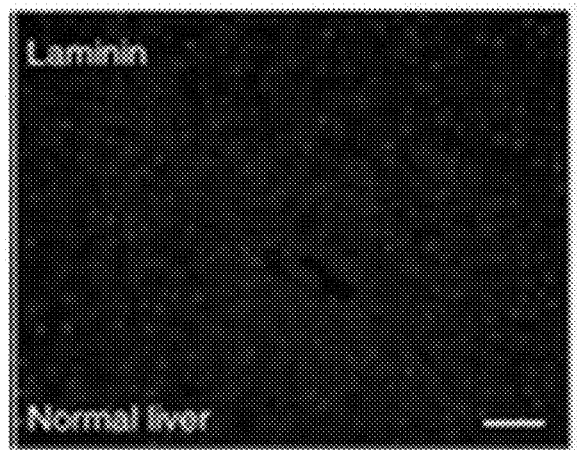
FIG. 15Q illustrates the decellularization of the liver using normothermic extracorporeal liver perfusion.
Figure 15R:
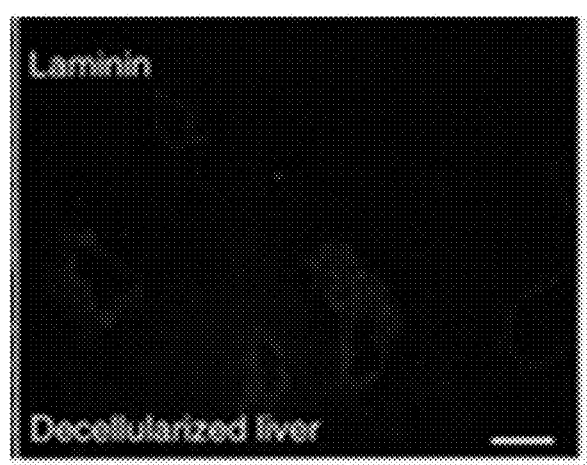
FIG. 15R illustrates the decellularization of the liver using normothermic extracorporeal liver perfusion.

In one aspect the dual circuit system through the hepatic artery and portal vein may reach the entire circulation of the liver, as exhibited by injecting a dye as illustrated in FIG. 15A-15C. The perfusion system may be used to inject enzymes and chemicals to digest and dislodge cells in the liver. The loss of cells in the pig liver as it is perfused by digestion enzymes and chemicals may be observed as a gradual loss of color of the pig liver as illustrated in FIG. 15D-15H. H&E staining before and after perfusion with decellularizing enzymes and chemicals shows the loss of hepatocytes histologically. The loss of hepatocytes may be shown by staining the liver with fiber and extracellular matrix proteins like Collagen I, Collagen II, Fibronectin, Lamin. As the cellular content decreases, the hepatic fibers and extracellular matrix proteins may become more prominent that may be shown by increase of the intensity of the stain in Collagen I, Collagen II, Fibronectin, Lamin, after treatment with decellularizing enzymes and chemicals using the perfusion system as illustrated in FIG. 15I-15R.

Figure 16A:
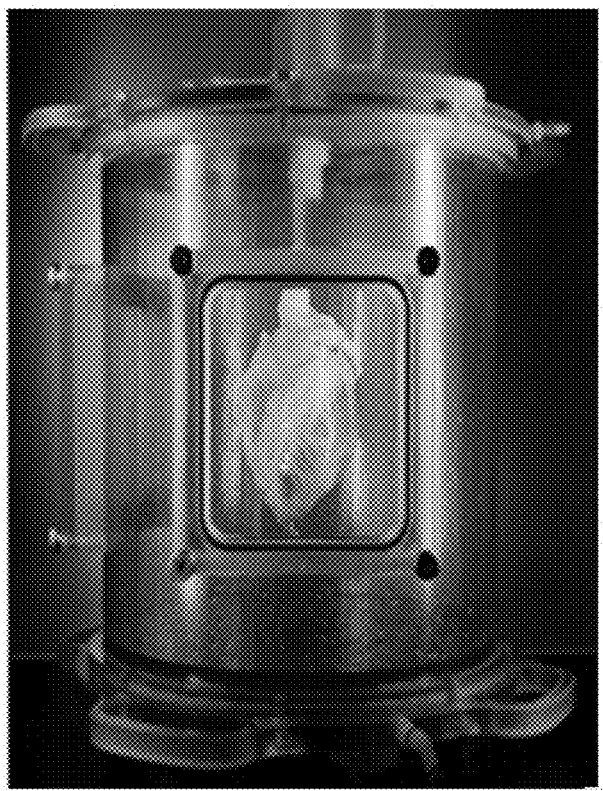
FIG. 16A illustrates a heart chamber to hold the heart during normothermic extracorporeal organ perfusion.
Figure 16B:
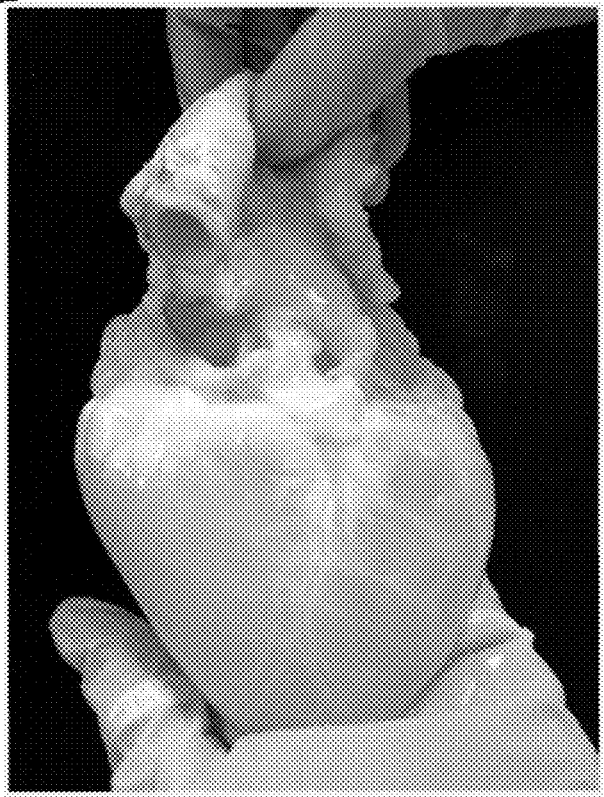
FIG. 16B illustrates a decellularized heart by normothermic extracorporeal organ perfusion.
Figure 16C:
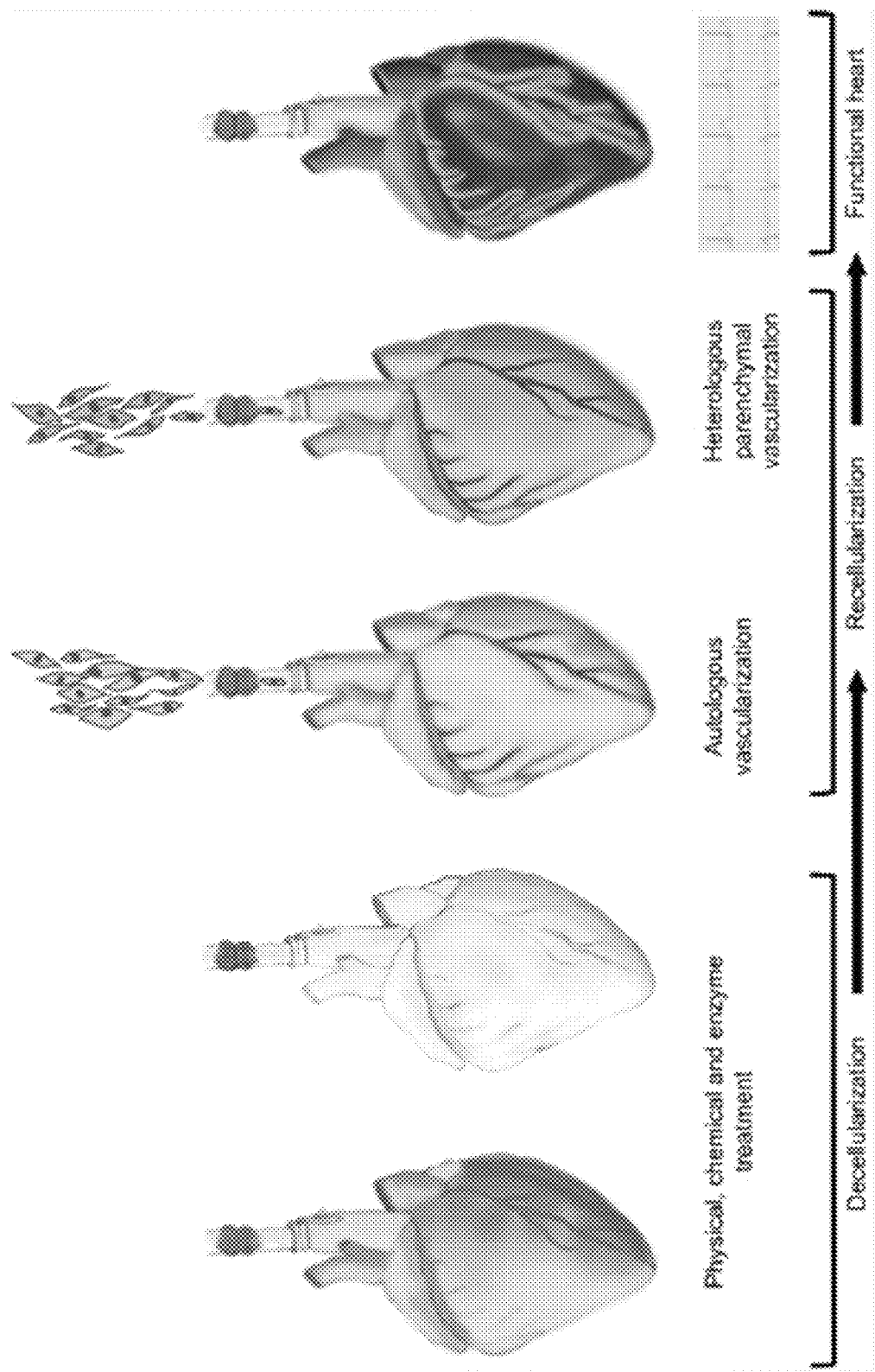
FIG. 16C illustrates the steps in creating a heart scaffold and organ engineering of the heart by normothermic extracorporeal organ perfusion.

In another aspect a pig heart may be used to create a scaffold. A pig heart may be ideal to use as a scaffold for an organ engineered for transplant into a recipient. A heart organ chamber that also serves as a perfusate reservoir may be used with the organ perfusion system as shown in FIG. 16A. In one aspect, after the perfusion process, the decellularized heart may be ready to be used as a scaffold and to be recellularized, as shown by a loss of color of the organ in FIG. 16B. The perfusion system may be used to circulate enzymes and chemicals into the heart to digest and dislodge cardiac cells, to create a scaffold ready for recellularization. The heart scaffold may be recellularized with autologous vascularization and heterologous parenchymal vascularization to create a functional heart (FIG. 16C). The engineered organ may reduce transplant rejection risk in the recipient.

EXAMPLES

The examples described herein are included to demonstrate various aspects of the invention. It should be appreciated by those of skill in the art that the techniques disclosed in the examples included herein represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1: Normothermic Extracorporeal Liver Perfusion (NELP) for Donation after Cardiac Death Livers This example illustrates how sub optimal livers that are obtained after cardiac death, and would otherwise result in failed transplants, may be used successfully, after Normothermic extracorporeal liver perfusion, with the perfusion system described.

Female land race/farm pigs (30-35 kg) were purchased from Oak Hill Genetics, IL. All animals were housed and maintained in accordance with the National Resource Council guidelines. All experimental procedures and protocols were approved by the Animal Studies committee and Department of Comparative Medicine at the Washington University School of Medicine in St Louis. They were given access to food and water ad libitum and were restricted from solid food but not water 12 hours before the operation. Animals were assigned randomly to 1 of 4 groups, with 3 animals per group: 20-minute warm ischemia group (W20-NELP), 40-minute warm ischemia group (W40-NELP), and 60-minute warm ischemia group (W60-NELP) followed by 6 hours of NELP and a final 2-hour NELP evaluation phase (FIG. 1A). For the last group, animals were subjected to 40 minutes of warm ischemia and 6 hours of cold storage followed by a final 2-hour NELP evaluation phase (W40-Cold). The final 2-hour NELP runs as the functional evaluation phase for this study, and data obtained during this phase were used for purposes of comparison.

All animals were premedicated with buprenorphine 0.01-0.05 mg/kg as well as TKX cocktail (tiletamine 4 mg/kg, ketamine 2 mg/kg, and xylazine 2 mg/kg) intramuscularly. Animals were then intubated and anesthetized using 1% isoflurane (for both induction and maintenance), 50% nitrous oxide and oxygen, and maintained on full anesthetic support. A midline abdominal approach was used to gain access to the liver for standard dissection and isolation. The abdominal aorta and splenic vein were cannulated to flush the organ-preservation solution. The animal was heparinized (300 U/kg), and whole blood was collected in blood collection bags (Jorgensen Laboratories, Inc, Loveland, Colo.). The supra-celiac and infra-renal aorta were then ligated, and cardiac arrest was induced by the use of KCl (75-100 mg/kg).

For simulating donation after cardiac death (DCD), the abdomen was covered with an activated warming blanket after supraceliac cross clamping. According to each study group, after 20, 40, or 60 minutes of induced warm ischemia, the livers were flushed with 3 L (1 L via aorta, 2 L via portal vein) of Custodial HTK (histidine-tryptophan-ketoglutarate) solution (Dr Franz Kohler Chemie Co., Bensheim, Germany) at 4° C. Liver excision, cannulation, and brief cold storage did not exceed 45 minutes. The cold storage before NELP did not exceed 15 minutes.

Example 2: Ex Vivo Normothermic Liver Perfusion System

The circuit was primed with 700 mL or 1,500 mL of saline and 10,000 U heparin. Blood was added (1100±150 ml) to the circuit after passing through a leukocyte filter (Pall Corporation, Port Washington, N.Y.). The NELP circuit was run for 30 minutes to allow the dialyzer to achieve equilibrium prior to placement of the liver onto the system (Table 1). Table 1 shows blood gas analysis and chemistry at the beginning of the evaluation phase in the study groups (mean±SD). The dialysis machine was connected to the system 30 minutes before connecting the livers to the machine perfusion. The dialysis machine insured stabilized blood chemistry, pH and electrolytes throughout the perfusion sessions.

Before docking onto the system, the liver was flushed with 2 L of saline via the hepatic artery and portal vein. The centrifugal pumps provided constant flow of blood to the hepatic artery and the portal vein with flows maintained at 0.5±0.1 L/min and 1.2±0.2 L/min respectively, with constant arterial pressures of 85±10 mm Hg and portal pressures of 12±4 mm Hg. Perfusate oxygenation with 95% O2 and 5% CO2 was provided proximal to the vascular docking sites in the circuit. The flows and pressures were monitored constantly and the hematocrit was kept between 15 and 20 by ultrafiltration of excess fluid by dialysis. To simulate entero-hepatic re-circulation, the bile produced from the graft back was reinjected into the perfusate.

Example 3: Assessment of the Liver

This example shows data of assessment of the liver from the experimental design described in Example 1

Samples for blood gas, glucose, and electrolyte monitoring were taken hourly from both the arterial and venous limbs of the circuit simultaneously. The oxygen content (C) was calculated using the formula: Ca/vO2=Hb×1.39×Sa/vO2. Fick's equation for oxygen extraction ratio was then applied: (CaO2−CvO2)/CaO2. Hourly measurements of aspartate transaminase AST, alanine transaminase (ALT), and total bilirubin were made. Liver biopsies were taken, preserved in 10% formalin, and sent for hematoxylin and eosin (H&E) staining. A pathologist independently reviewed the slides for hepatocyte morphology, necrosis, and level of IRI. Bile production was assessed every hour and was evaluated for concentrations of LDH, ALP, bicarb, glucose as well as pH. INR (CoaguChek XS system; Roche diagnostics, Germany) and lactate (Lactate plus; Nova biomedical, UK) levels were also measured at hourly intervals. Bile acid recirculation was mimicked via reintroduction of collected bile through the portal limb. INR (CoaguChek XS system; Roche Diagnostics, Mannheim, Germany) and lactate (Lactate plus; Nova Biomedical, Runcom, UK) levels also were measured at hourly intervals.

β-galactosidase enzyme has been previously used as a marker of Kupffer cell activation. In addition, concentration of hyaluronic acid enzyme has been used as a marker of SEC damage. The Kupffer cells activation and SEC damage by measuring concentrations of these enzymes in the perfusate was accessed. Blood samples were taken at hourly intervals and used for ELISA according to the manufacture's protocol for porcine β-galactosidase (My Biosource) and porcine hyaluronic acid (Echelon Biosciences, Inc).

GraphPad prism v5 software was used to generate graphs. 2-way ANOVA test for scatter plots, and t-test for columnar graphs were carried out for direct comparison of study groups. P-values less than 0.05 were considered to be significant. Data are presented as mean±SD.

Example 4: Warm Perfusion Versus Cold Preservation, NELP Reduces Hepatocyte Injury of DCD Livers Compared with Grafts Preserved in Cold Storage Livers from 9 female landrace pigs were subjected to either 20 minutes (W20-NELP), 40 minutes (W40-NELP), or 60 minutes (W60-NELP) of warm ischemia followed by 6 hours of NELP followed by a 2-hour NELP evaluation phase. This was compared with 3 livers subjected to 40 minutes of warm ischemia time followed by 6 hours of cold storage (W40-Cold) and a 2-hour NELP evaluation phase. Groups were compared with the 2-way analysis of variance test.

NELP stabilized transaminases accompanied by significant improvement in bile production and decline in lactate and INR values in all W-NELP groups. Histologic analysis demonstrated significant improvement from 0 hour (mild-to-moderate sinusoidal dilation and zone 3 necrosis) to the end of the NELP run (minimal necrosis and mild IRI). Comparison of W40-NELP and W40-Cold revealed greater bile production and oxygen extraction ratio in W40-NELP. In contrast, markers of cellular and functional damage were increased in the W40-Cold group.

To evaluate the efficacy of NELP in recovering DCD livers, livers were subjected to warm ischemia and then either placed on NELP or maintained in cold storage for 6 hours. Livers from both groups were then placed onto NELP for a final 2-hour period to simulate post-transplant conditions in which measurements of the liver physiologic function were collected. Liver enzymes were measured as markers of liver injury and necrosis.

Figure 2A:
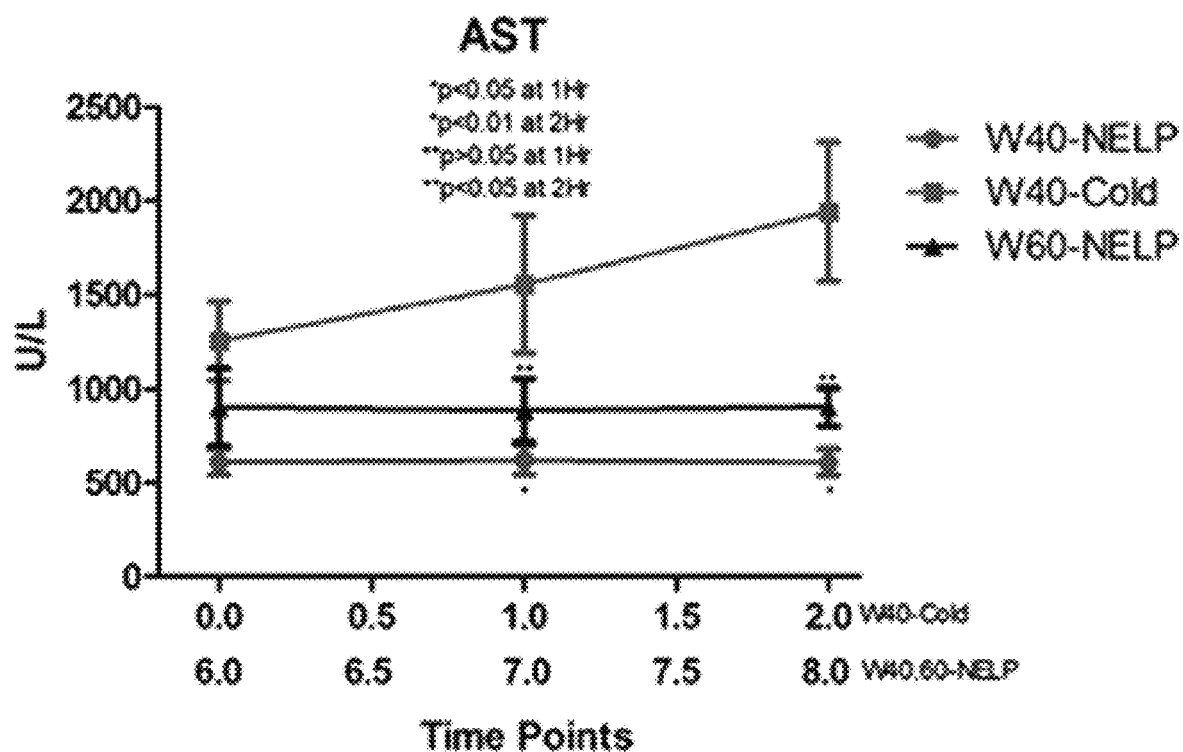
FIG. 2A is a graph showing the level of aspartate transaminase (AST) during the evaluation phase of the liver in the perfusion system.
Figure 2B:
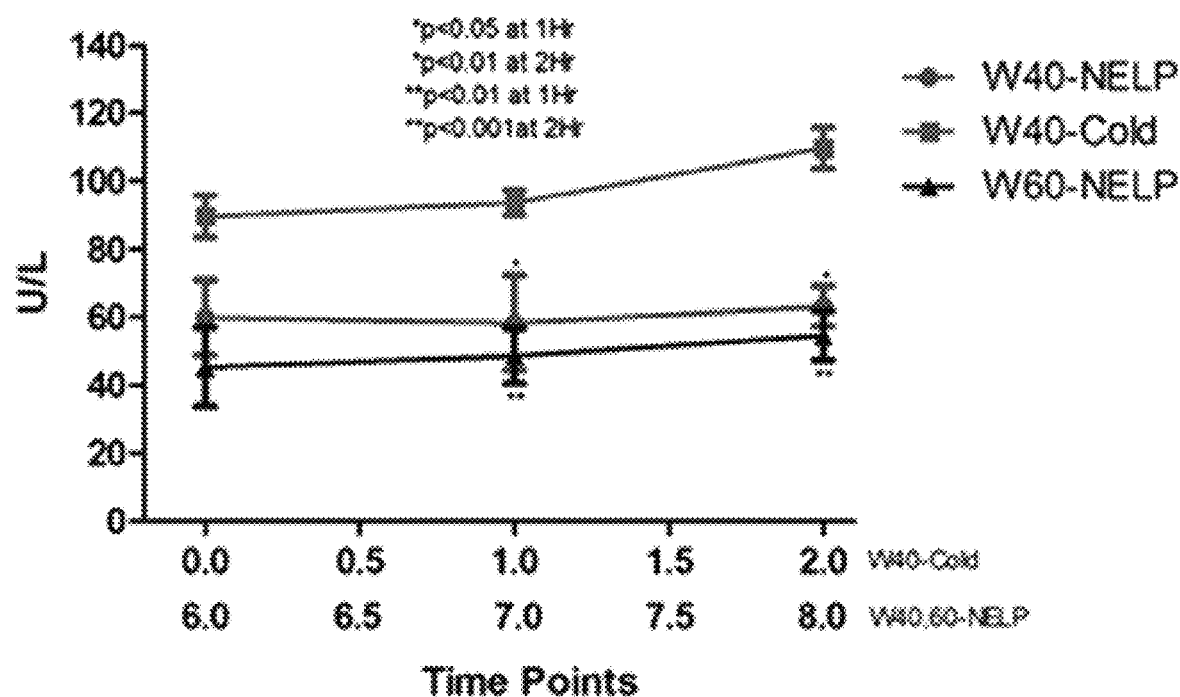
FIG. 2B is a graph showing the level of alanine transaminase (ALT) during the evaluation phase of the liver in the perfusion system.

Graft function, degree of damage, and recovery potential of W40-NELP versus W40-Cold groups, were evaluated. During the final 2-hour evaluation phase, a substantial difference in AST and ALT concentrations were detected between the groups. In the cold preserved livers, the AST and ALT levels increased to 1,942±641 U/L and 109±10 U/L, respectively, by the end of the evaluation phase. However, the liver enzymes were not only significantly lower (P<0.01) but also remained stable in W40-NELP livers; by the end of the study, the mean concentrations were (610±121 U/L, P<0.01) for AST and (63±10 U/L, P<0.01) for ALT (FIG. 2A and FIG. 2B). Synthetic functions of the livers were assessed by INR and bile production. Average bile production was substantially greater in W40-NELP livers in all time points during the final evaluation phase. Although the W40-Cold group had an average bile production of 2.33±2 mL/h, the W40-NELP group achieved bile production at 9±2.6 mL/h (FIG. 2C; P<0.01). In addition, W40-NELP livers had lesser INR compared with cold preserved livers (W40-NELP 2.53±0.15 vs. W40-Cold 5.73±1.12, P<0.001), indicating that warm perfusion leads to better preservation of the synthetic properties of DCD livers (FIG. 2D).

Figure 5A:
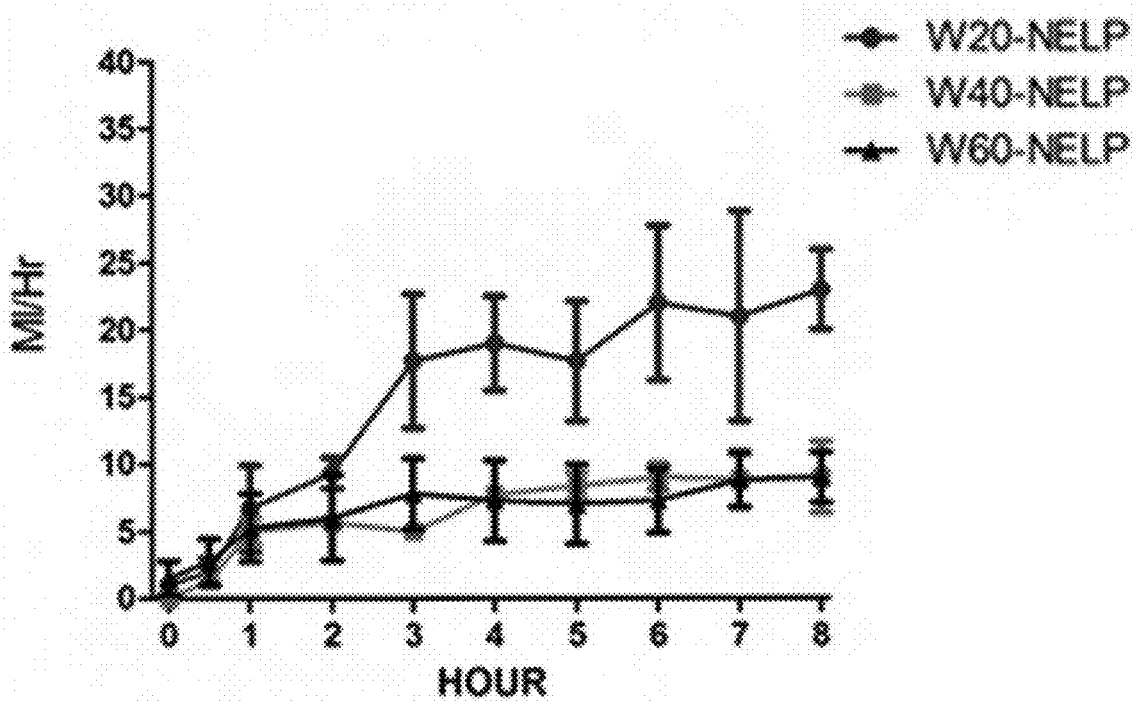
FIG. 5A is a graph showing the bile production compared in three experimental groups, 20, 40 and 60 minutes warm ischemia time followed by immediate warm perfusion for 8 hours.

Liver biopsies were taken at the start and end of each experiment for H&E staining. In the W40-NELP group, limited zone 3 necrosis and mild IRI was noted after 8 hours of NELP. In contrast, biopsies taken from the W40-Cold group revealed marked sinusoidal dilation and moderate IRI (FIG. 5A). These results strongly suggest that normothermic perfusion of livers subjected to significant periods of warm ischemia is superior to static cold storage in terms of preservation of synthetic functions and physiological properties.

Figure 2C:
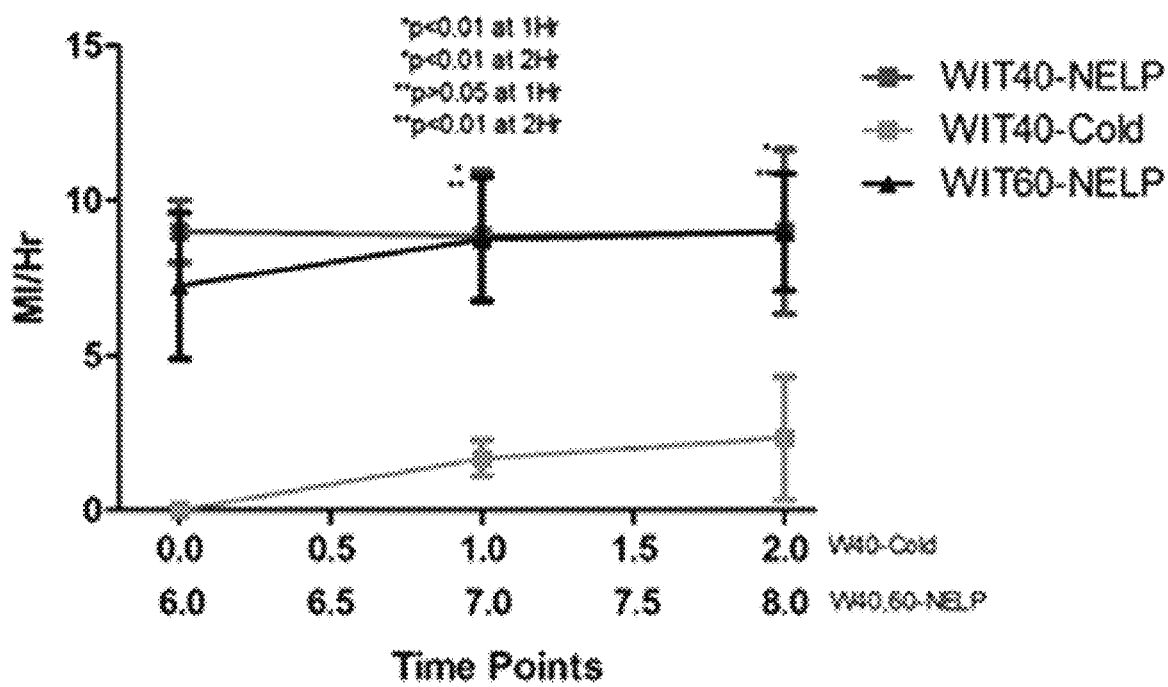
FIG. 2C is a graph showing the level of bile production during the evaluation phase of the liver in the perfusion system.
Figure 2D:
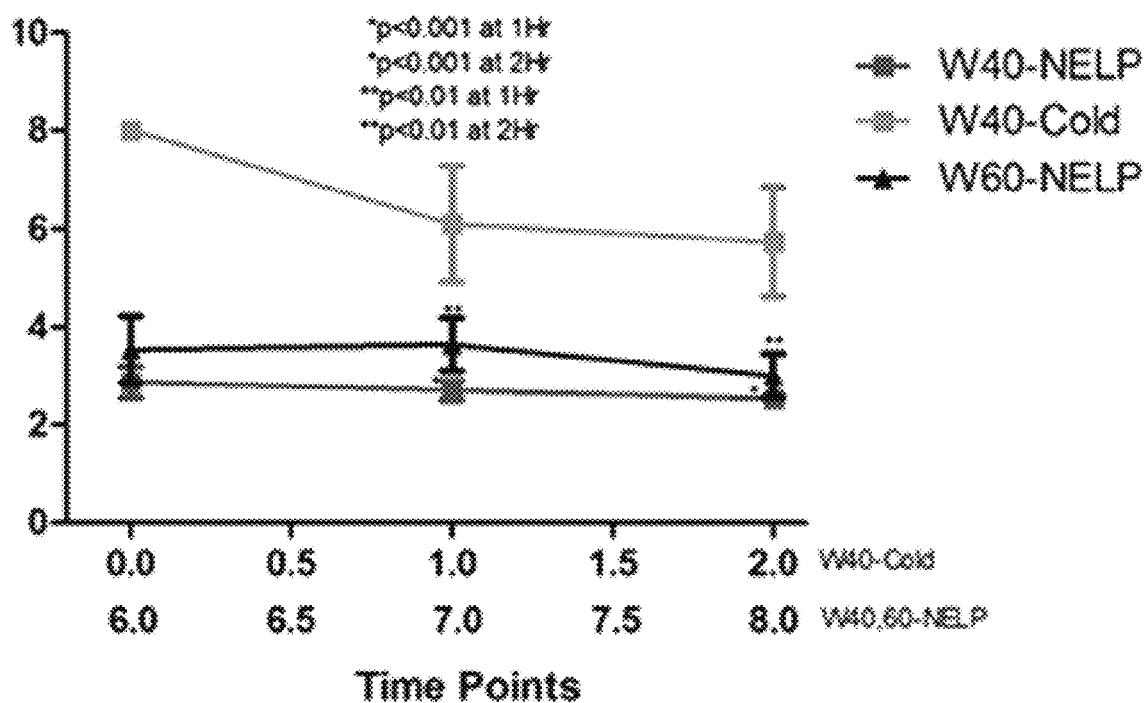
FIG. 2D is a graph showing the level of coagulation factors in the perfusate during the evaluation phase of the liver in the perfusion system.

NELP recovers DCD livers with long warm ischemia times. Data from livers subjected to longer warm ischemia of 60 minutes (W60-NELP) with W40-Cold livers were compared. The functional parameters of the W60-NELP livers in the final evaluation phase also were significantly improved compared with the W40-Cold group. The markers of hepatocyte injury were significantly lower in W60-NELP livers: AST (W60-NELP 904±173 U/L vs. W40-Cold 1,942±641 U/L, P<0.05) and ALT (W60-NELP 54±12.5 U/L vs. W40-Cold 109±10.5 U/L, P<0.001) (FIG. 2A and FIG. 2B). Comparison of synthetic parameters between these groups revealed that despite longer duration of warm ischemia in the W60-NELP group, they had greater bile and coagulation factor production: bile production (W60-NELP 8.98±1.89 mL/h vs. W40-Cold group 2.33±2 mL/h, P<0.01)

and INR (W60-NELP 3±0.45 vs. W40-Cold 5.73±1.12, P<0.01) (FIG. 2C and FIG. 2D).

NELP Reduces Anaerobic Metabolism During Preservation Period

Figure 3:
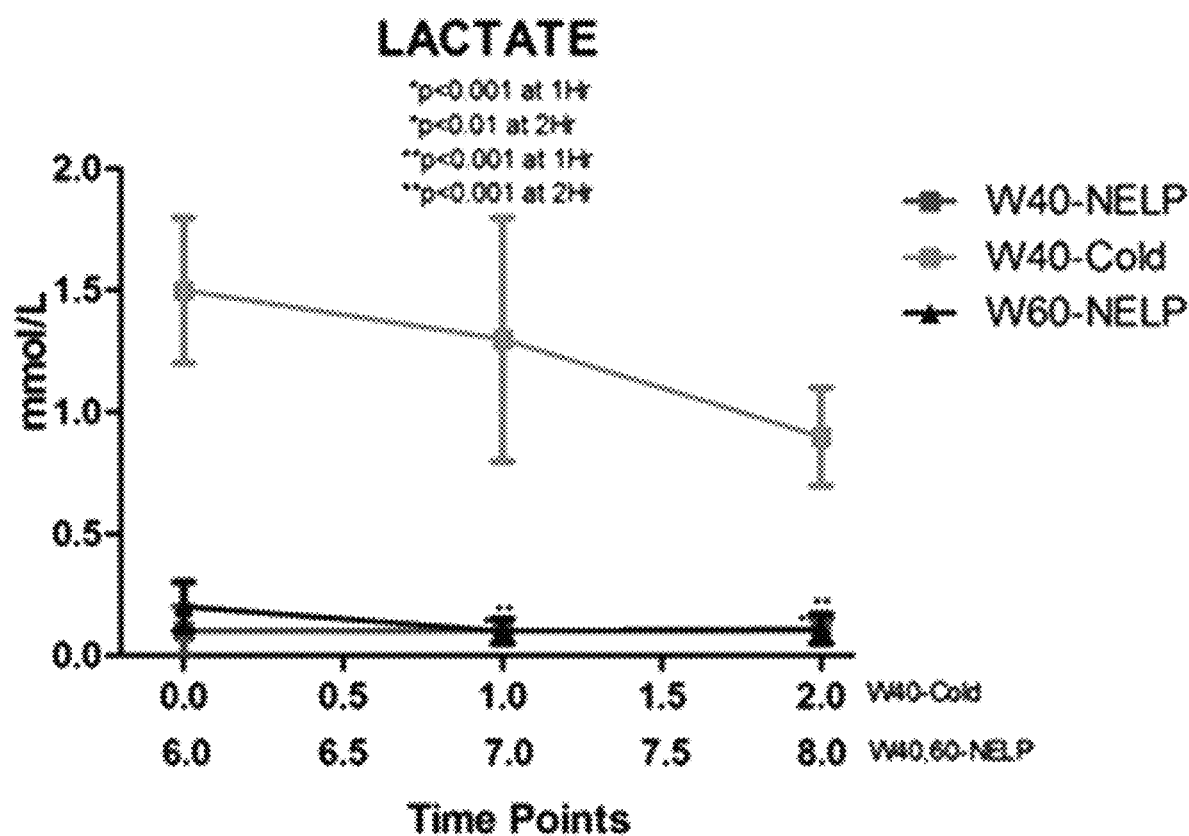
FIG. 3 is a graph showing the lactate concentration in the perfusate during the evaluation phase of the liver in the perfusion system.

Despite remarkable reduction in aerobic metabolism with static cold storage, continuation of anaerobic metabolism leads to lactic acid production and subsequent injury. Lactate levels were measured as a marker of anaerobic metabolism. Our data indicated that during the evaluation phase, livers on NELP had lower lactate levels when compared to livers preserved in static cold storage (FIG. 3): W40-NELP 0.1±0.05 mmol/L vs. W40-Cold 0.9±0.1 mmol/L (P<0.01). Lactate levels in the longer ischemic W60-NELP livers were also significantly lower when compared to W40-Cold group (0.11±0.06 mmol/L vs. 0.9±0.1 mmol/L, P<0.001).

General perfusion data comparison. NELP stabilizes electrolytes and pH parameters as well as hepatic artery and portal vein flows.

Figure 4A:
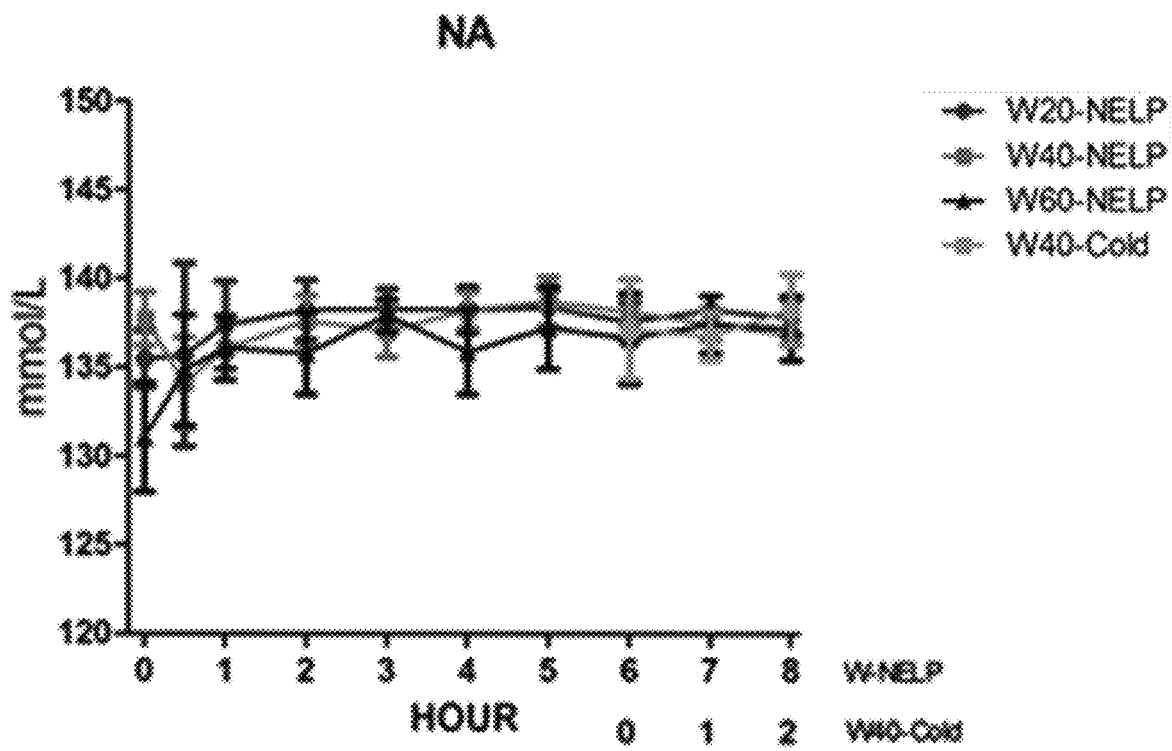
FIG. 4A is a graph showing the sodium levels in the perfusate during the evaluation phase of the liver in the perfusion system.
Figure 4B:
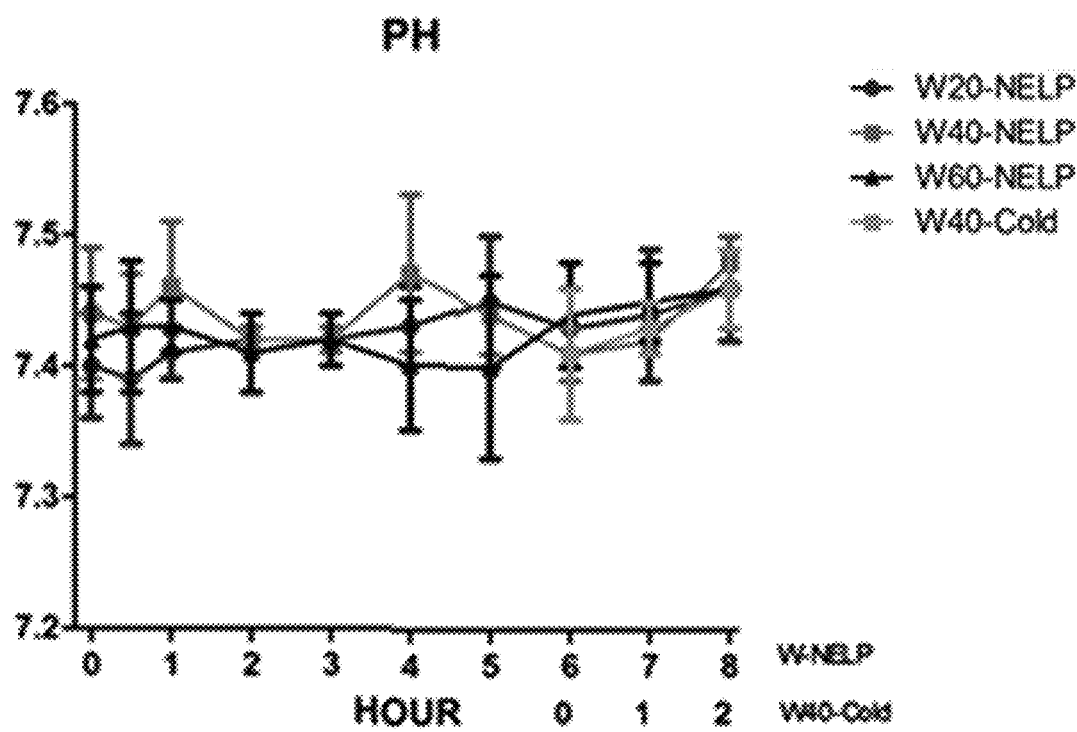
FIG. 4B is a graph showing the pH of the perfusate during the evaluation phase of the liver in the perfusion system.
Figure 4C:
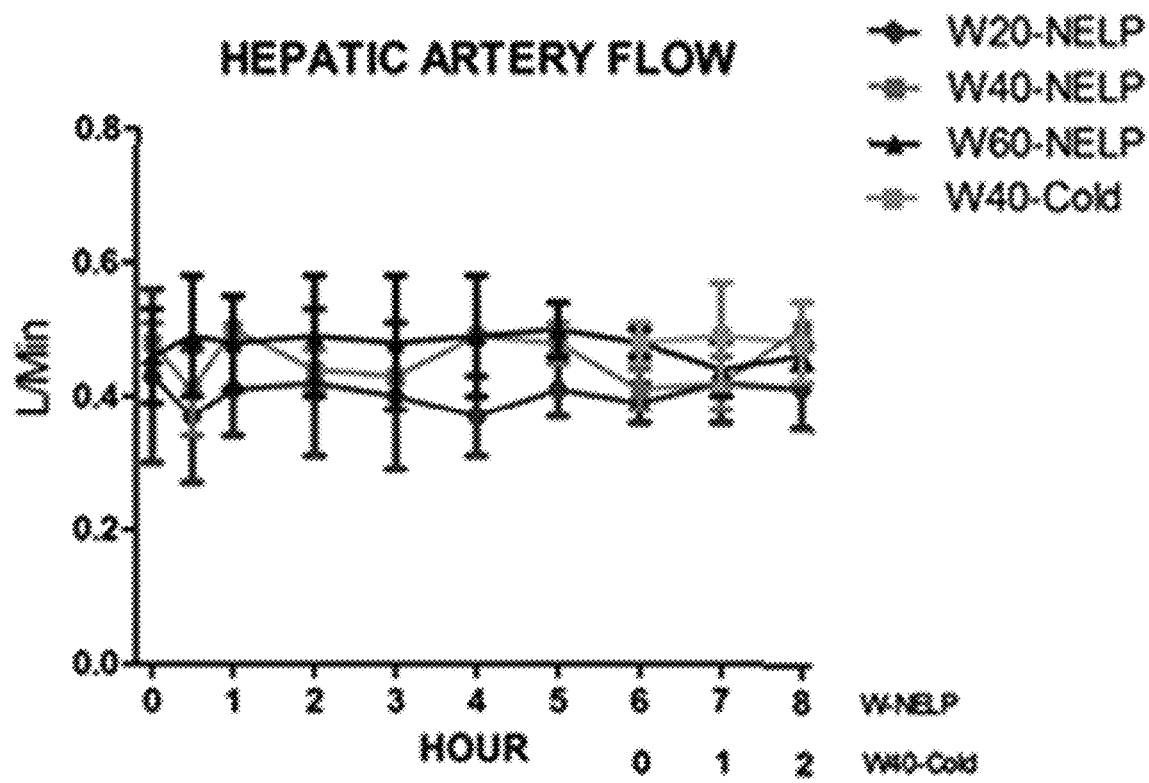
FIG. 4C is a graph showing the hepatic arterial flow rate into the hepatic artery during the evaluation phase of the liver in the perfusion system.
Figure 4D:
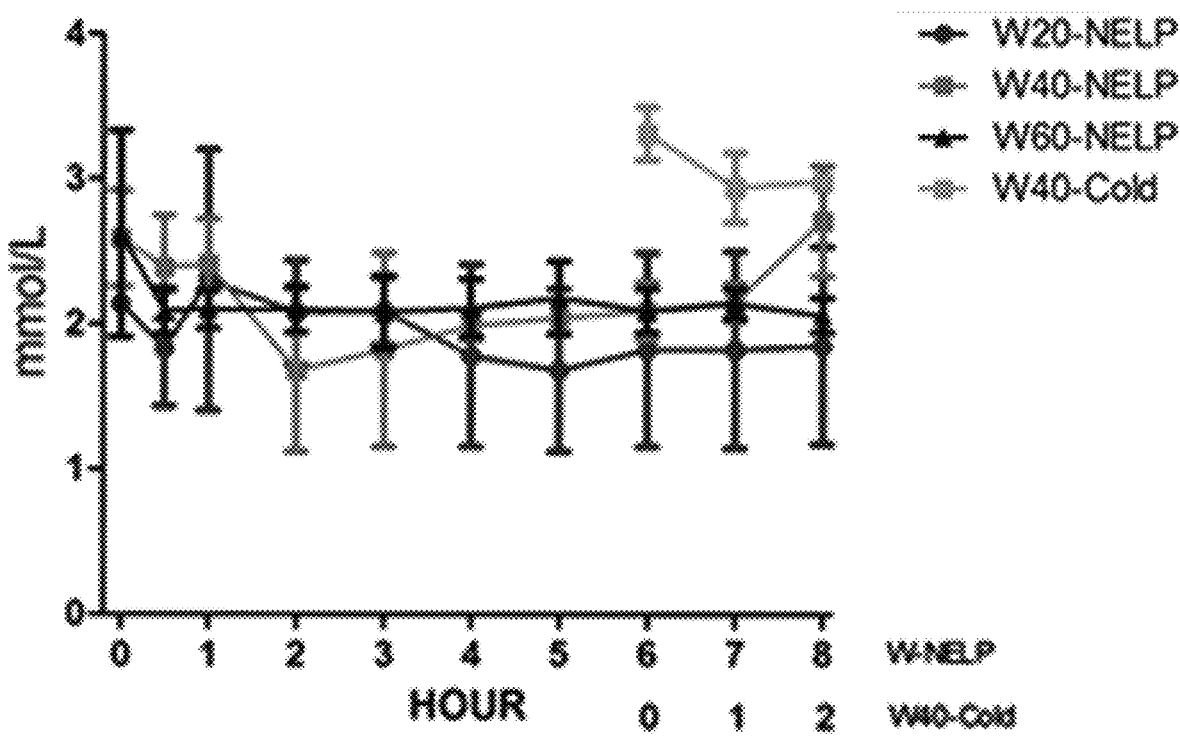
FIG. 4D is a graph showing the potassium levels in the perfusate during the evaluation phase of the liver in the perfusion system.
Figure 4E:
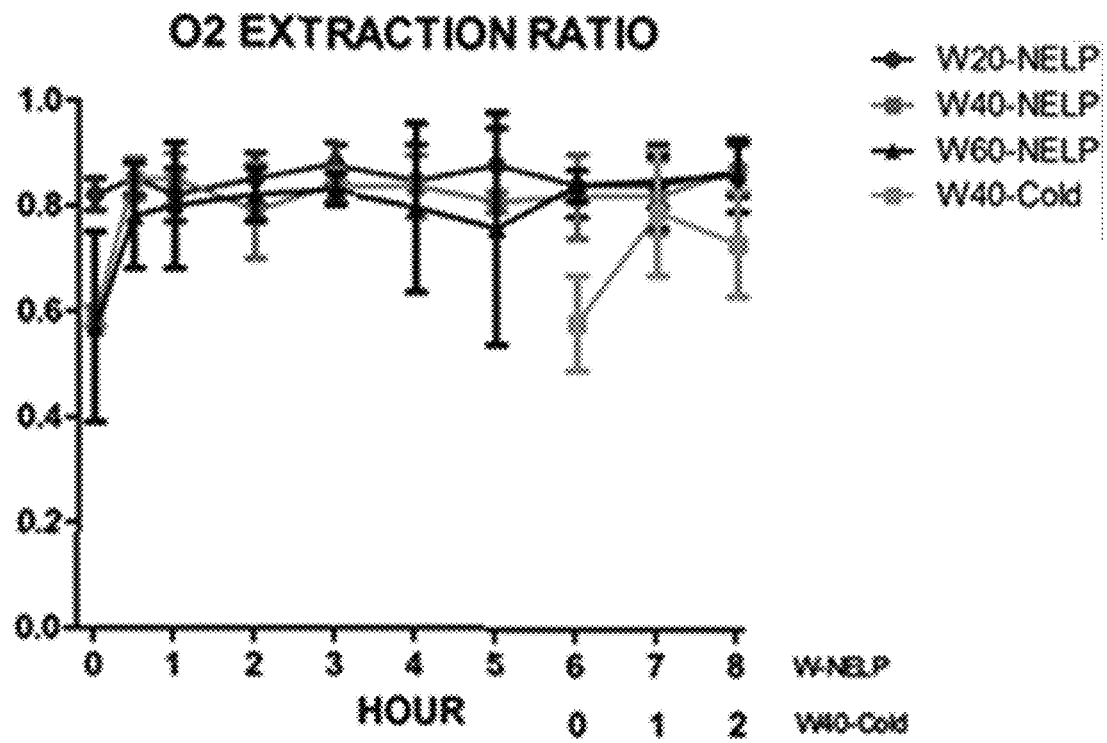
FIG. 4E is a graph showing the oxygen extraction ration in the perfusate during the evaluation phase of the liver in the perfusion system.
Figure 4F:
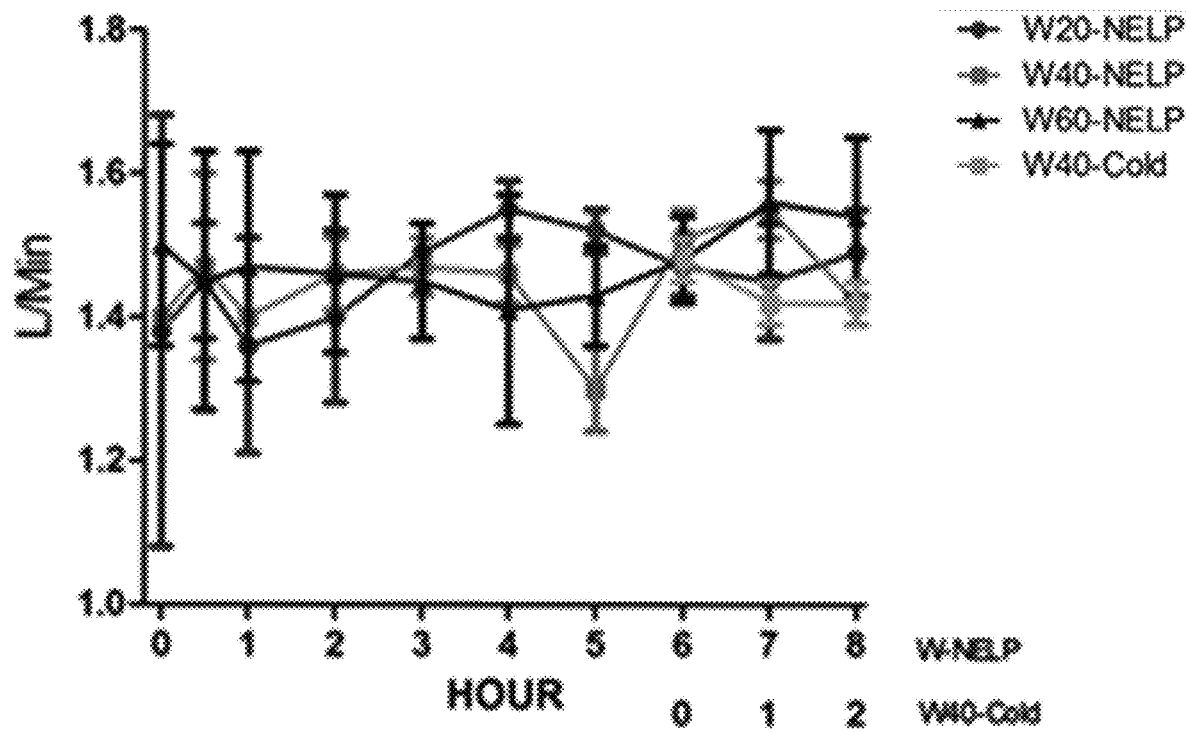
FIG. 4F is a graph showing the portal vein flow rate into the portal vein during the evaluation phase of the liver in the perfusion system.

Before placing livers onto NELP, whole blood was added to the circuit allowing for the dialyzer to first establish physiologic pH and electrolyte levels. The mean cold storage time for all W-NELP groups was 30±15 minutes. Data obtained in the first 30 minutes of reperfusion uniformly displayed evidence of high vascular resistance in the graft, but continued perfusion led to normalization of both portal and arterial flows and pressures. This was accompanied by increase in the oxygen extraction ratio. Electrolyte, glucose, and pH levels remained stable throughout reperfusion without a significant difference among the W-NELP groups (FIG. 4A, FIG. 4B, FIG. 4D).

NELP led to significant bile production and reduction in lactate and INR values accompanied by liver enzyme release stabilization.

Figure 5B:
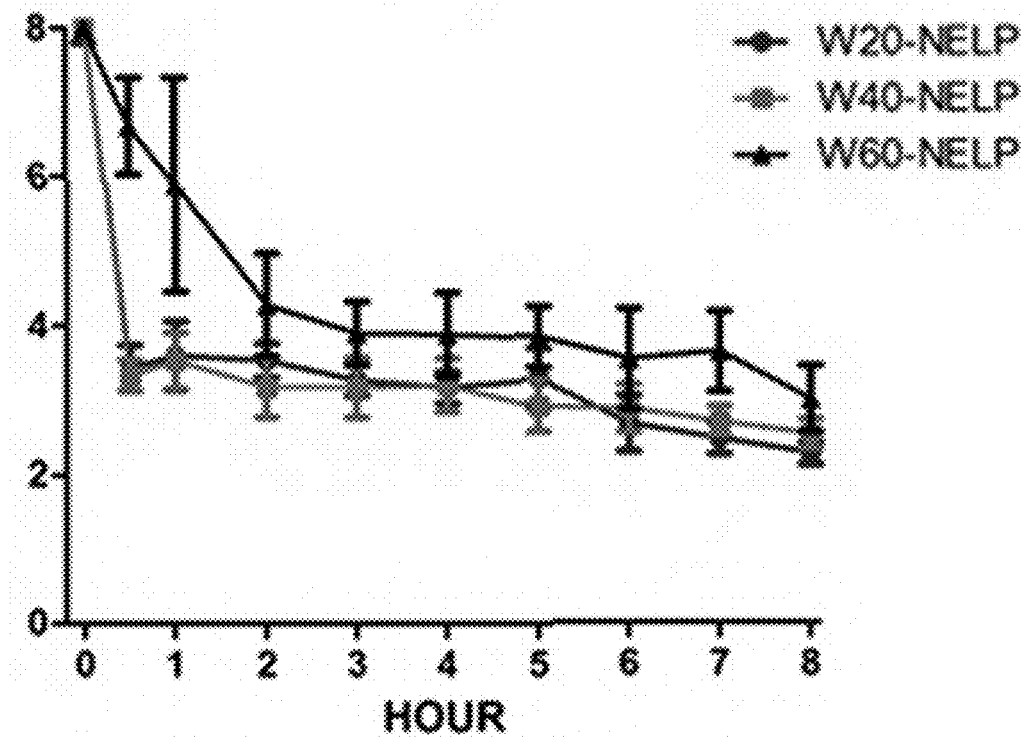
FIG. 5B is a graph showing the liver function as illustrated by International Normalized Ratio (INR) compared in three experimental groups, 20, 40 and 60 minutes warm ischemia time followed by immediate warm perfusion for 8 hours.
Figure 5C:
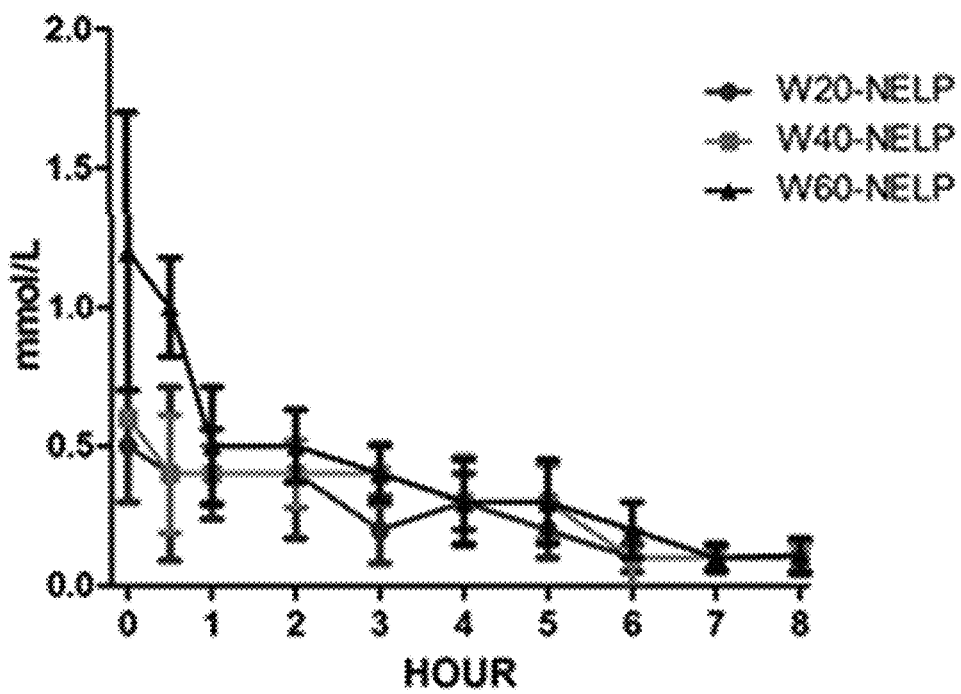
FIG. 5C is a graph showing the lactate level in the perfusate compared in three experimental groups, 20, 40 and 60 minutes warm ischemia time followed by immediate warm perfusion for 8 hours.
Figure 5D:
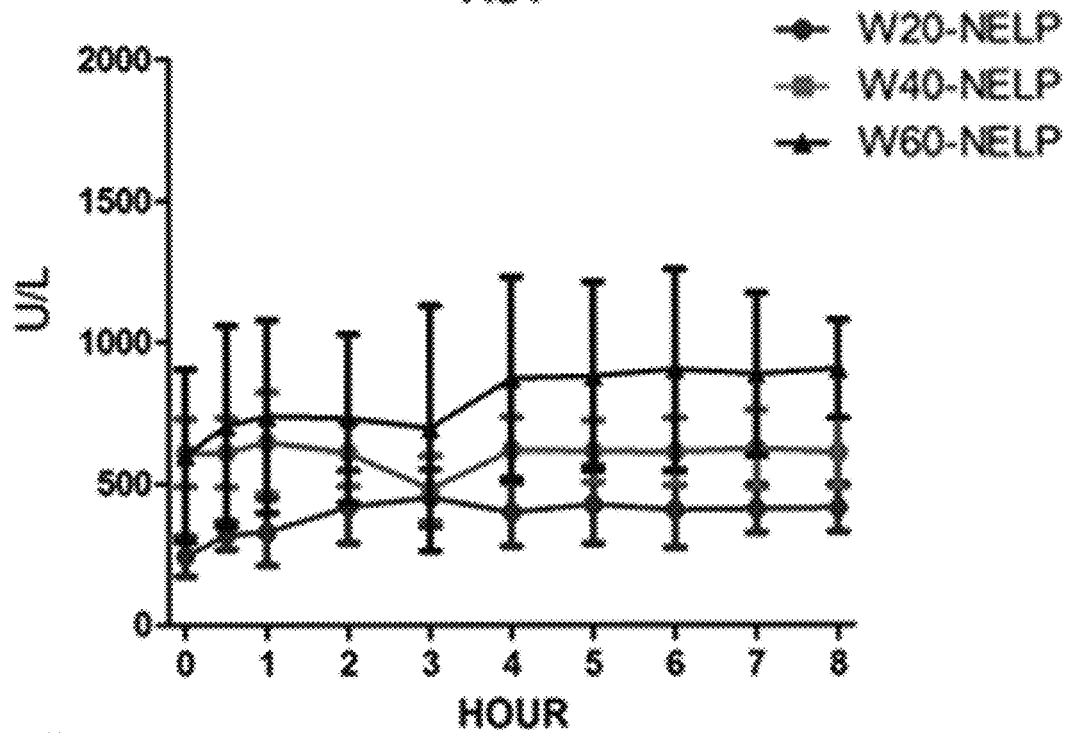
FIG. 5D is a graph showing the AST level in the perfusate compared in three experimental groups, 20, 40 and 60 minutes warm ischemia time followed by immediate warm perfusion for 8 hours.
Figure 5E:
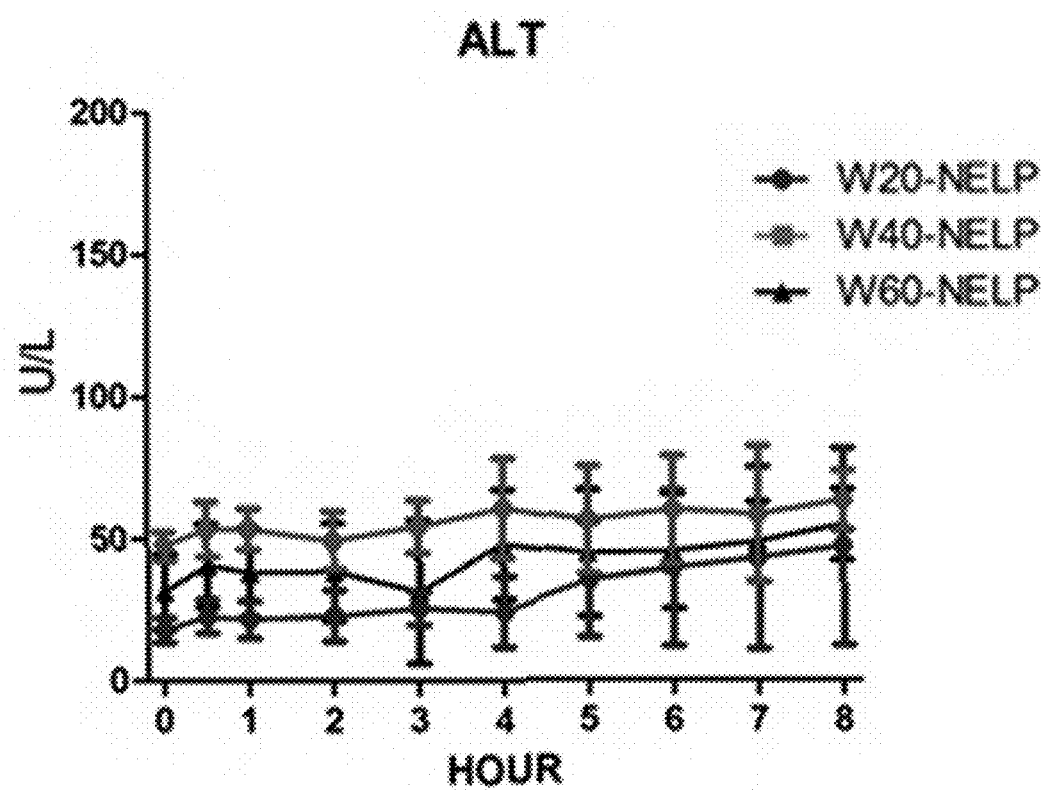
FIG. 5E is a graph showing the ALT level in the perfusate compared in three experimental groups, 20, 40 and 60 minutes warm ischemia time followed by immediate warm perfusion for 8 hours.
Figure 5F:
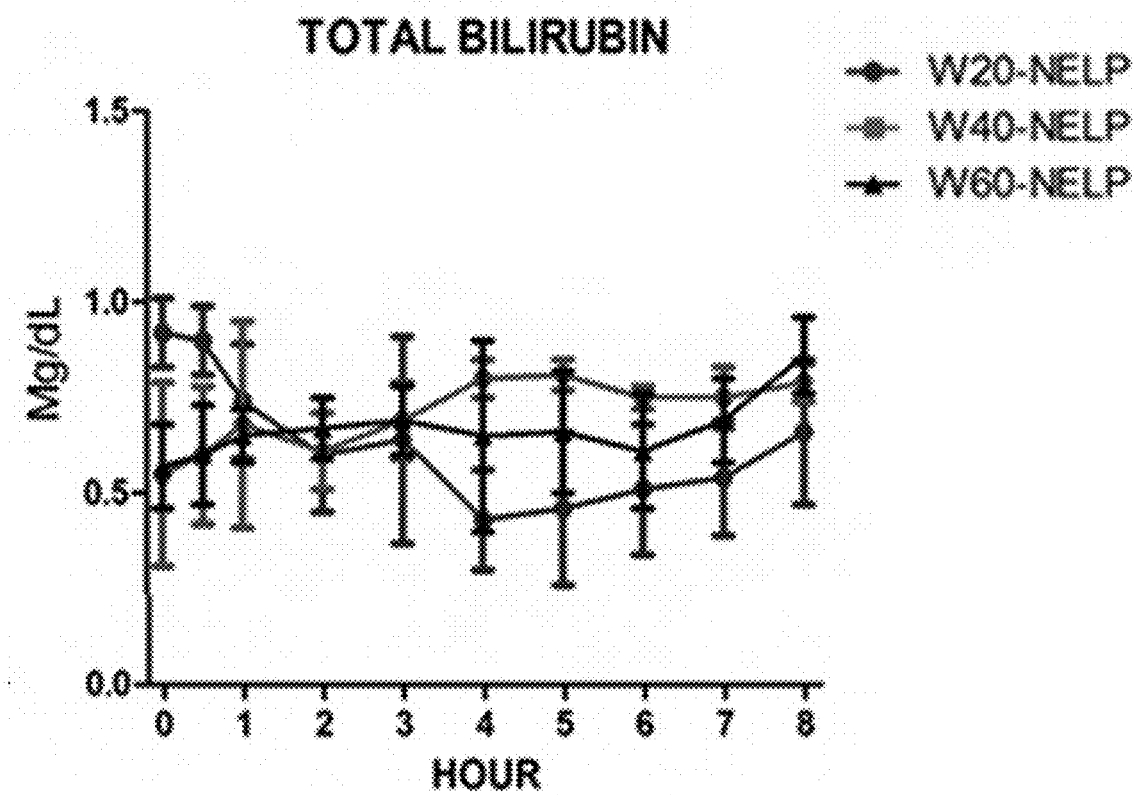
FIG. 5F is a graph showing the total bilirubin level in the perfusate compared in three experimental groups, 20, 40 and 60 minutes warm ischemia time followed by immediate warm perfusion for 8 hours.

Synthetic functions of the liver were assessed by measuring bile production and INR. Our results show that in all W-NELP groups, bile production was minimal during first 30 minutes of NELP. By the first hour of warm perfusion, however, these values began to normalize and by the end of the experiment, the mean bile production for the W20-NELP, W40-NELP and W60-NELP groups were 23±3 mL/h, 9±2.65 mL/h, and 8.9±1.89 mL/h, respectively. Interestingly, INR levels decreased rapidly in all study groups despite high starting point (INR=8). After 30 minutes on NELP, INR decreased by half in the W20-NELP and W40-NELP groups, and W60-NELP livers also reached similar levels after 3 hours on NELP. Mean INRs at the end of the study were: W20-NELP (2.27±0.15), W40-NELP (2.53±0.2), and W60-NELP (3±0.45). Similarly, lactate concentration decreased during NELP in all groups. Increased lactate levels were seen primarily in the W60-NELP and W40-Cold groups, with a starting concentration of 1.2±0.5 mmol/L and 1.5±0.3 mmol/L, respectively. All W-NELP groups displayed a decreased lactate level down to 0.1 mmol/L after 8 hours of NELP (FIG. 5A). NELP also stabilized release of liver enzymes and total bilirubin in all W-NELP groups. AST and ALT concentrations maintained in near physiologic levels during the experiment (FIG. 5B).

NELP preserved histologic architecture of the hepatocytes and maintained integrity of the presinusoidal areas in all groups.

Figure 6A:
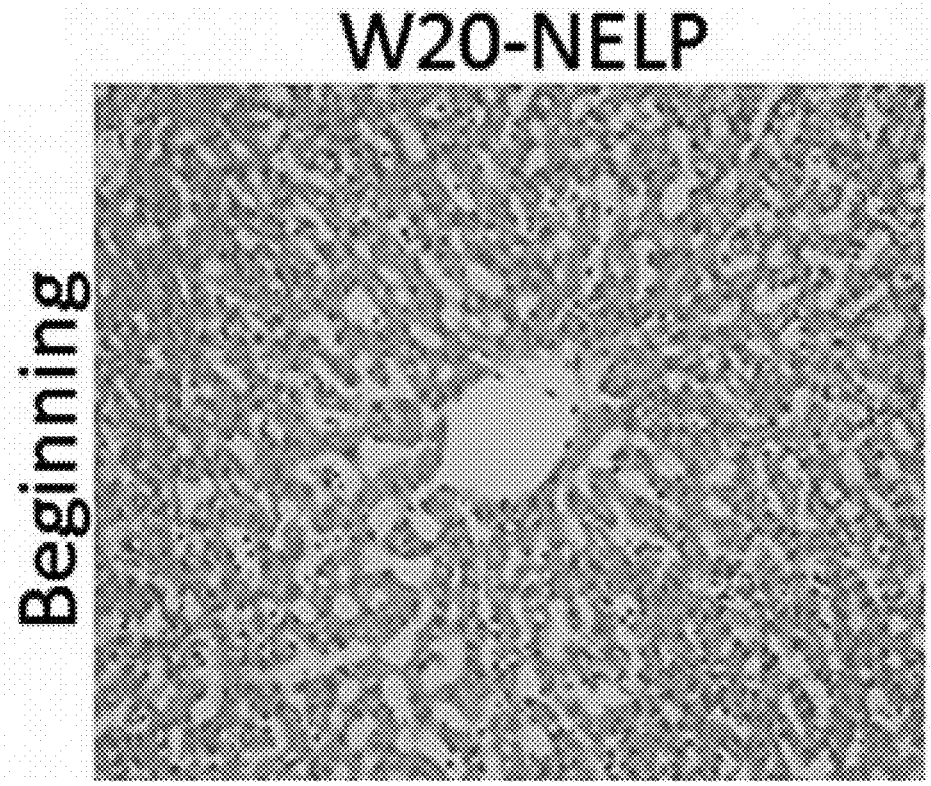
FIG. 6A is a histological picture of H&E staining of the liver, at the beginning perfusion period of the experimental group 20 minutes warm ischemia time followed by immediate warm perfusion for 8 hours.
Figure 6B:
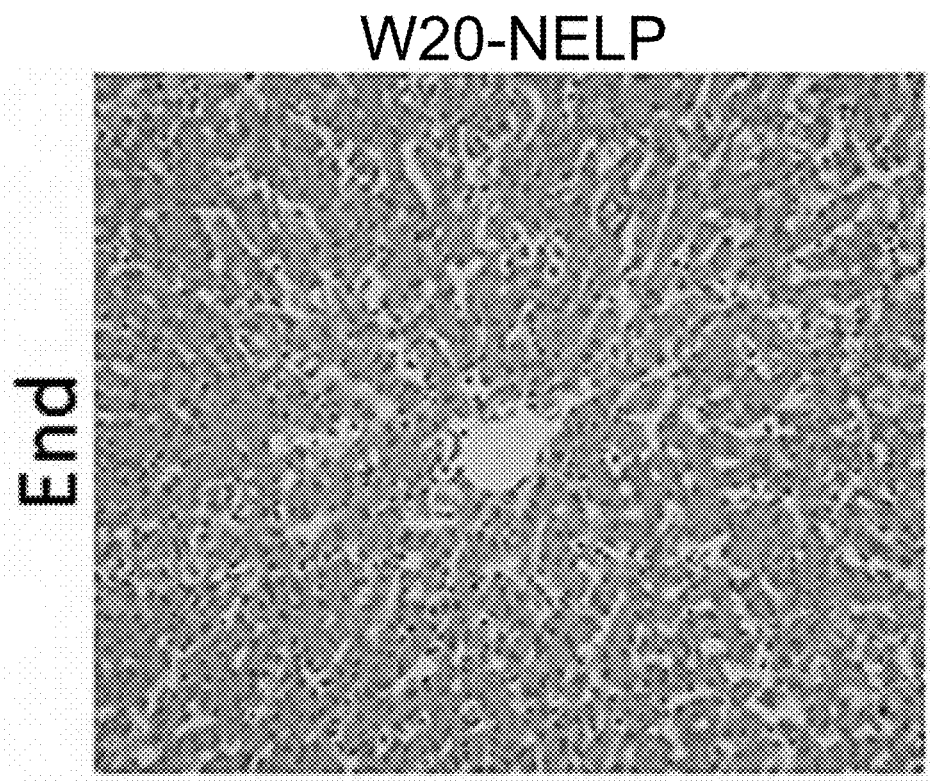
FIG. 6B is a histological picture of H&E staining of the liver, at the end of perfusion period of the experimental group 20 minutes warm ischemia time followed by immediate warm perfusion for 8 hours.
Figure 6C:
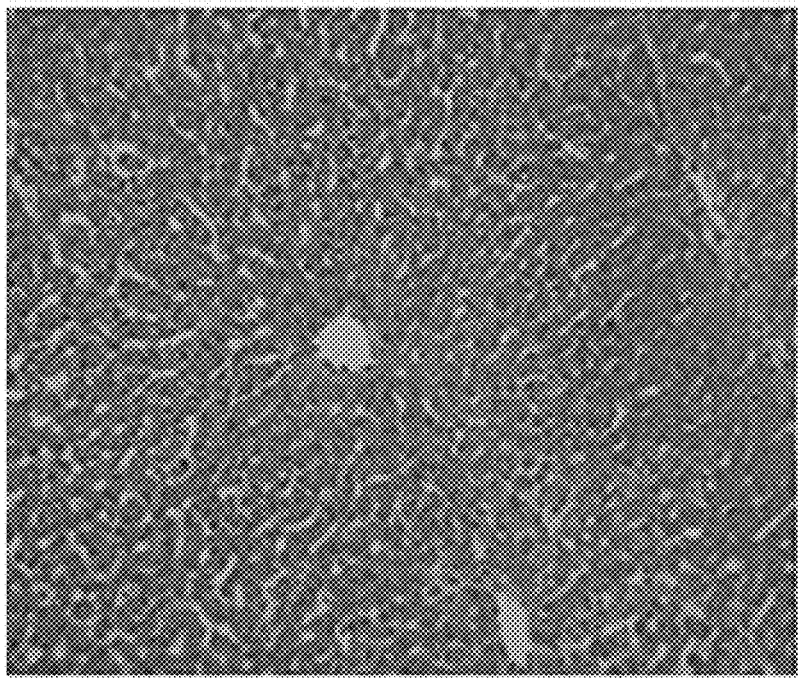
FIG. 6C is a histological picture of H&E staining of the liver, at the beginning perfusion period of the experimental group 40 minutes warm ischemia time followed by immediate warm perfusion for 8 hours.
Figure 6D:
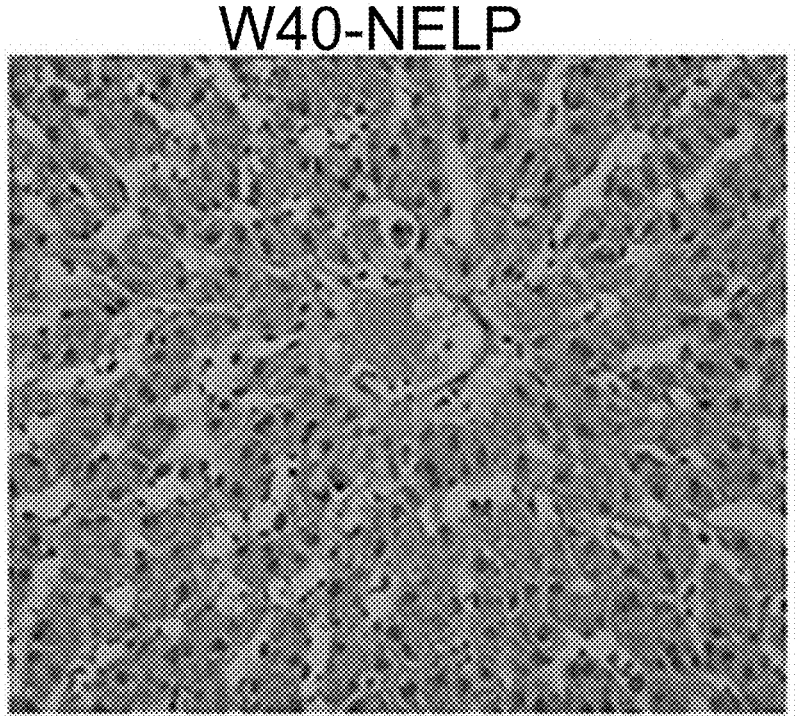
FIG. 6D is a histological picture of H&E staining of the liver, at the end of perfusion period of the experimental group 40 minutes warm ischemia time followed by immediate warm perfusion for 8 hours.
Figure 6E:
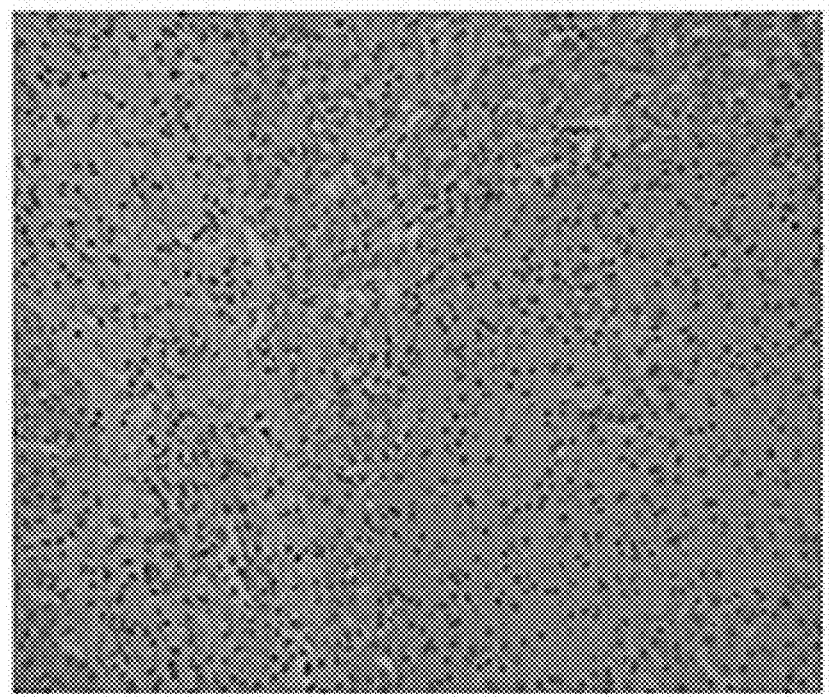
FIG. 6E is a histological picture of H&E staining of the liver, at the beginning perfusion period of the experimental group 120 minutes warm ischemia time followed by immediate warm perfusion for 8 hours.
Figure 6F:
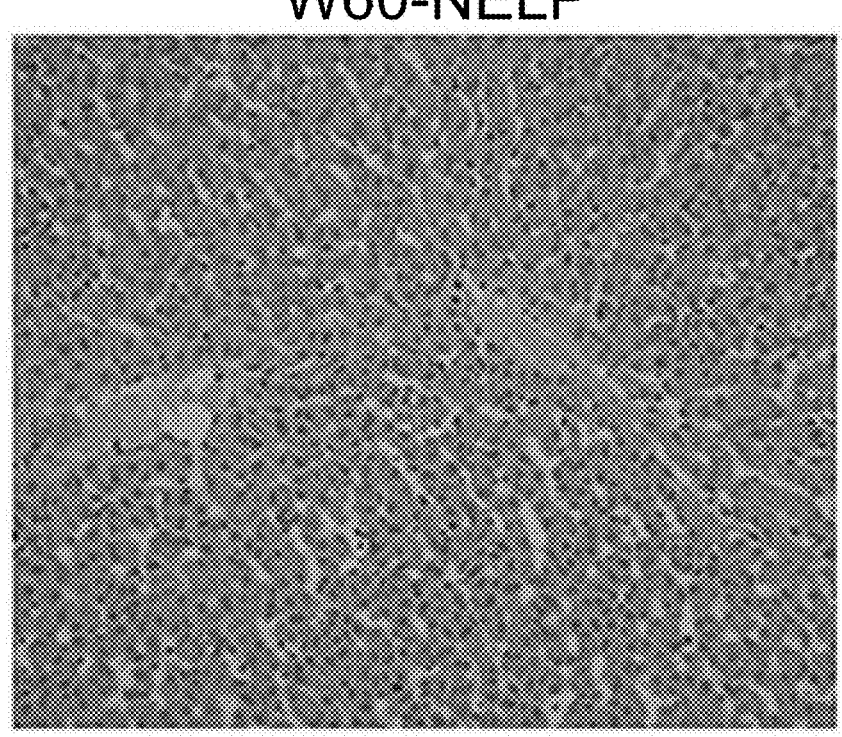
FIG. 6F is a histological picture of H&E staining of the liver, at the end of perfusion period of the experimental group 120 minutes warm ischemia time followed by immediate warm perfusion for 8 hours.
Figure 6G:
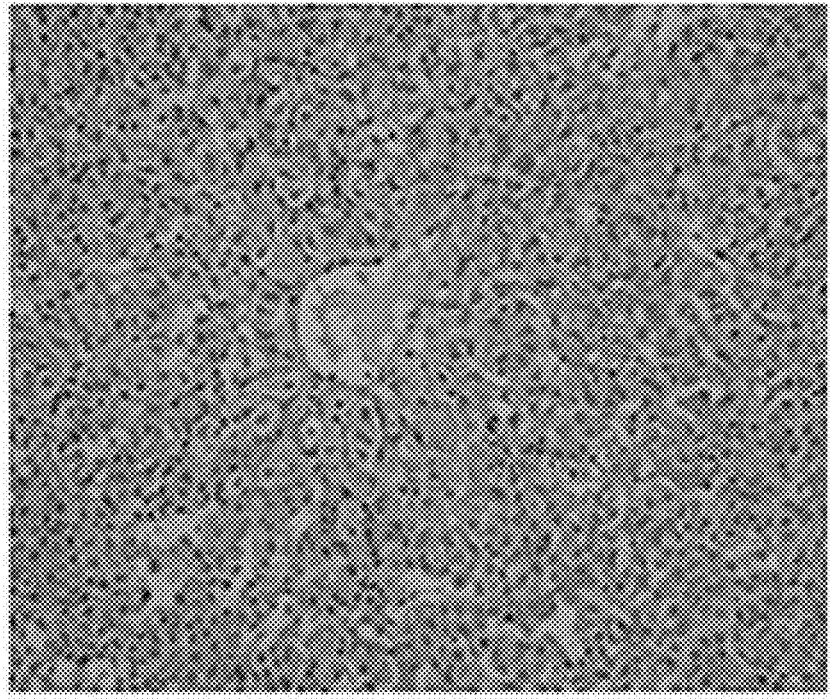
FIG. 6G is a histological picture of H&E staining of the liver, at the beginning perfusion period of the experimental group 40 minutes warm ischemia time followed by cold perfusion for 8 hours.
Figure 6H:
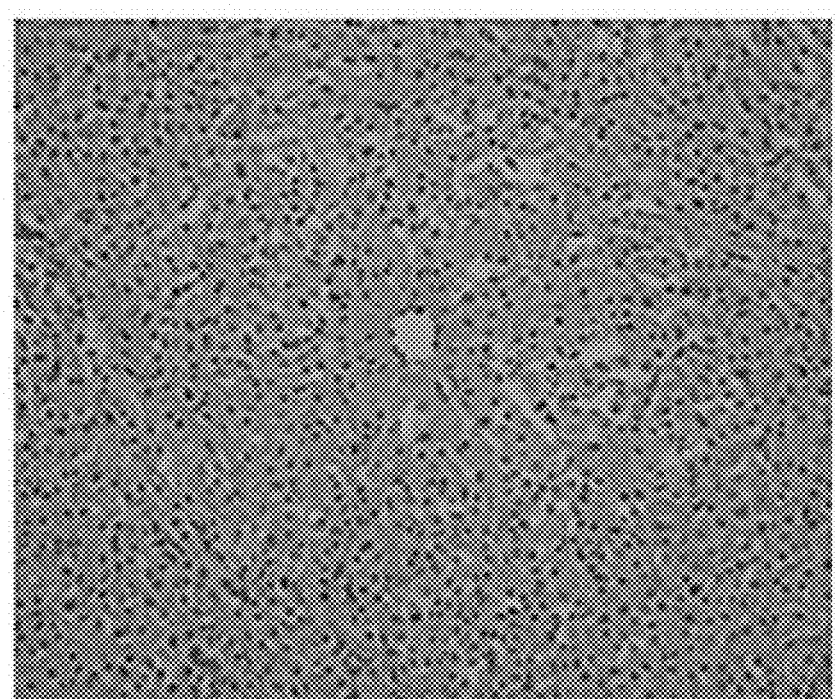
FIG. 6H is a histological picture of H&E staining of the liver, at the end of perfusion period of the experimental group 40 minutes warm ischemia time followed by cold perfusion for 8 hours.
Figure 6I:
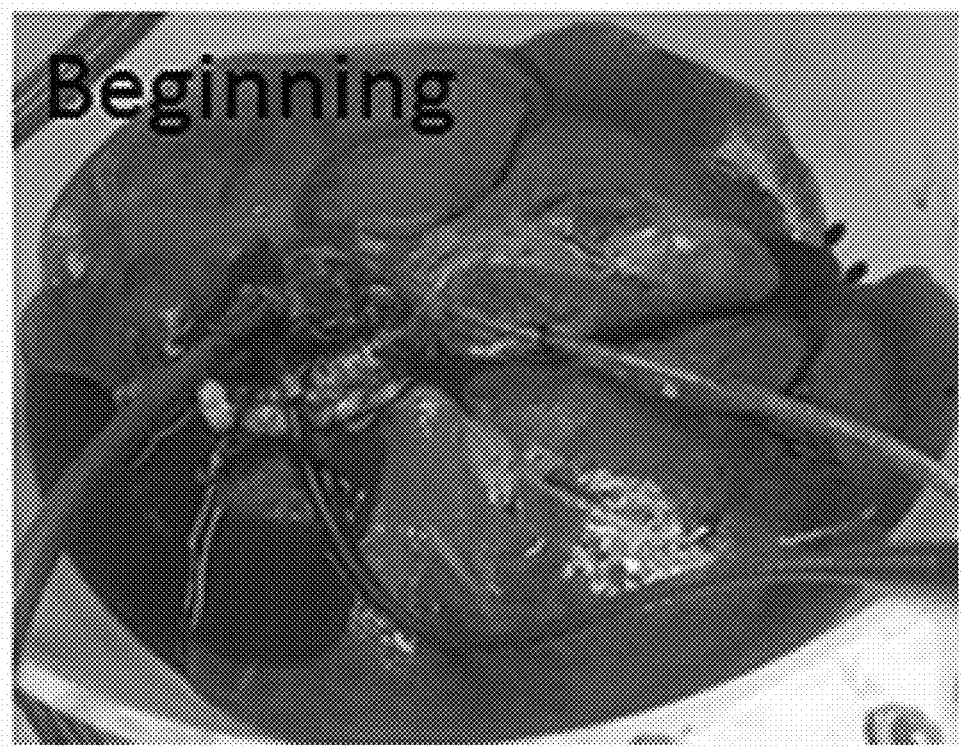
FIG. 6I is a representative gross picture of the liver at the beginning of the normothermic perfusion.
Figure 6J:
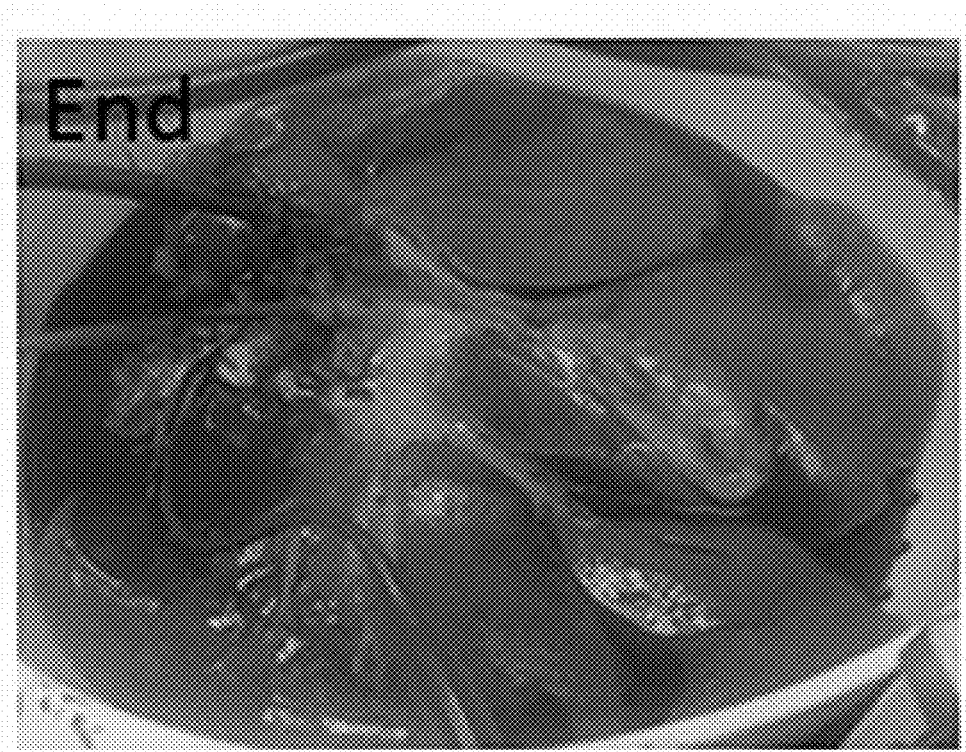
FIG. 6J is a representative gross picture of the liver at the end of the normothermic perfusion.

Histologically, the W60-NELP group had the most areas of necrosis and sinusoidal dilation compared to the other W-NELP groups; however, these areas did not expand during NELP. Generally, histologic evidence of IRI was less in all W-NELP groups compared to the W40-Cold group (FIG. 6A). Grossly, W60-NELP livers had larger areas of patchy necrosis at the beginning of the NELP. These areas gradually vanished and after 8 hours of warm perfusion, all livers appeared pink and resembled normal livers (FIG. 6B).

Example 5: Decreased Reperfusion Injuries and Improved Function of Cold Preserved Livers Using Normothermic Ex-Vivo Liver Perfusion Machine This example illustrates the benefits of rewarming of cold-stored livers followed by normothermic perfusion using the normothermic extracorporeal organ perfusion system.

Eighteen Female land race/farm pigs (30-35 kg) were purchased from Oak Hill Genetics, IL. All animals were housed and maintained in accordance with the National Resource Council guidelines. All experimental procedures and protocols were approved by the Animal Studies Committee (ASC) and Department of Comparative Medicine (DCM) at Washington University School of Medicine in St Louis. The animals were given access to food and water ad libitum and were restricted from solid food but not water 12 hours prior to the operation.

Animals were pre-medicated with buprenorphine 0.01-0.05 mg/kg and TKX cocktail (Telazol 4 mg/kg, ketamine 2 mg/kg, and xylazine 2 mg/kg) IM. They were intubated and anesthetized with 1% isoflurane (induction and maintenance), 50% nitrous oxide and oxygen, and maintained on full anesthetic support. Through a midline abdominal approach, the access to the liver for standard dissection and isolation was performed, and the abdominal aorta was cannulated. The animal was heparinized (300 U/kg), and whole blood was collected in blood collection bags (Jorgensen Laboratories, Inc.). The supra-celiac and infra-renal aorta were then ligated, the portal vein was cannulated and cardiac arrest was induced using KCl (75-100 mg/kg). The livers were flushed with 3 L (1 L via aorta, 2 L via portal vein) of Custodial HTK (histidine-tryptophan-ketoglutarate) solution (Dr. Franz Kohler Chemie Co.) at 4° C. The livers were prepared and cannulated on the back table. The cold storage before NELP did not exceed 15 minutes.

Animals were randomly assigned to six groups (3 livers per group) (FIG. 7B): In the Immediate-NELP group, livers were procured and immediately perfused (cold time <15 minutes) with NELP for eight hours. In the Cold-NELP group, livers were procured and stored at 4° C. for four hours followed by warm perfusion with NELP for four hours. In the rewarming groups, livers were procured and stored at 4° C. for four hours. Then they were divided into four subgroups: they were connected to the NELP system and gradually rewarmed to 38° C., over different time periods: 120 minutes (120'-Rewarming), 60 minutes (60'-Rewarming), 30 minutes (30'-Rewarming) and 20 minutes (20'-Rewarming). The total normothermic machine perfusion period after rewarming was 4 hours. Three livers were used for each group of this study. For comparison purposes, the data obtained during the four hours of machine perfusion of Cold-NELP group and rewarming groups were compared to data from last 4 hours of Immediate-NELP group.

Example 6: Ex-Vivo Normothermic Liver Perfusion System Initial Assessment

The circuit was primed with 700 ml of normal saline and 10,000 U heparin. Blood was then added (1100±150 ml) to the circuit. The NELP circuit was run for 30 minutes to allow the dialyzer to achieve equilibrium prior to placement of the liver onto the system (Table 1).

TABLE 1

| Parameter | Immediate NELP | Cold-NELP | 20'-Rewarming | 30'-Rewarming | 60'-Rewarming | 120'-Rewarming |
|---|---|---|---|---|---|---|
| pH | 7.45 ± 0.05 | 7.42 ± 0.09 | 7.29 ± 0.05 | 7.29 ± 0.04 | 7.29 ± 0.19 | 7.2 ± 0.04 |
| pCO2(mmHg) | 41.6 ± 1.8 | 51 ± 6.1 | 72.5 ± 6.5 | 72.9 ± 10 | 72.5 ± 14 | 86.9 ± 7.3 |
| pO2(mmHg) | 434 ± 27 | 494 ± 56 | 669 ± 76 | 408 ± 16 | 660 ± 28 | 650 ± 50 |
| Hct (%) | 25 ± 4 | 23 ± 3 | 24 ± 1 | 24 ± 1.2 | 23 ± 1.4 | 19 ± 2 |
| Na++ (mmol/L) | 135.2 ± 1.1 | 137.7 ± 2.8 | 135.9 ± 2.1 | 144.8 ± 2 | 131.1 ± 2.1 | 144.5 ± 3.1 |
| K+ (mmol/L) | 2.83 ± 0.45 | 3.2 ± 0.3 | 3.1 ± 0.06 | 2.81 ± 0.09 | 3.4 ± 0.2 | 4.52 ± 1.9 |
| Cl− (mmol/L) | 105.4 ± 1.6 | 108.3 ± 4 | 99.8 ± 1.2 | 107 ± 5.1 | 101.3 ± 3.4 | 97.1 ± 5.8 |
| HCO3− (mmol/L) | 29.6 ± 0.6 | 33.4 ± 5.3 | 29 ± 3.1 | 35.5 ± 4.7 | 35 ± 6.8 | 35.2 ± 3.4 |
| Ca (mg/L) | 3.2 ± 0.4 | 2.9 ± 1.6 | 3 ± 0.5 | 3.4 ± 0.4 | 3.1 ± 0.1 | 2.9 ± 1.5 |
| Glucose (mg/L) | 109 ± 11 | 215 ± 23 | 239 ± 61 | 183 ± 45 | 296 ± 121 | 274 ± 49 |

Example 7: Assessment of the Liver and Perfusate

This example shows data of assessment of the liver and perfusate from the experimental design described in Example 5.

Samples for blood gas analysis and hepatic enzymes were taken hourly. The oxygen content (C) was calculated using the formula: Ca/vO2=Hb×1.39×Sa/vO2. Oxygen extraction ratio was then calculated using Fick's equation: (CaO2−CvO2)/CaO2. Liver biopsies were sent for hematoxylin and eosin (H&E) staining. A pathologist, blinded to the experimental conditions, reviewed the slides for hepatocyte morphology, necrosis, and level of IRI. Bile production was assessed every hour and was evaluated for concentrations of LDH, ALP, bicarb, glucose as well as pH. INR (CoaguChek XS system; Roche diagnostics, Germany) and lactate (Lactate plus; Nova biomedical, UK) levels were also measured at hourly intervals.

β-galactosidase enzyme has been previously used as a marker of Kupffer cell activation (21). In addition, concentration of hyaluronic acid enzyme has been used as a marker of SEC damage (21, 24). The Kupffer cells activation and SEC damage were measured by measuring concentrations of these enzymes in the perfusate. Blood samples were taken at hourly intervals and used for ELISA according to the manufacture's protocol for porcine β-galactosidase (My Biosource) and porcine hyaluronic acid (Echelon Biosciences, Inc).

GraphPad prism (v5) software was used to generate graphs. 2-way ANOVA test for scatter plots, and t-test for columnar graphs were carried out for direct comparison of study groups. P-values less than 0.05 were considered to be significant. Data are presented as mean±SD.

Figure 8A:
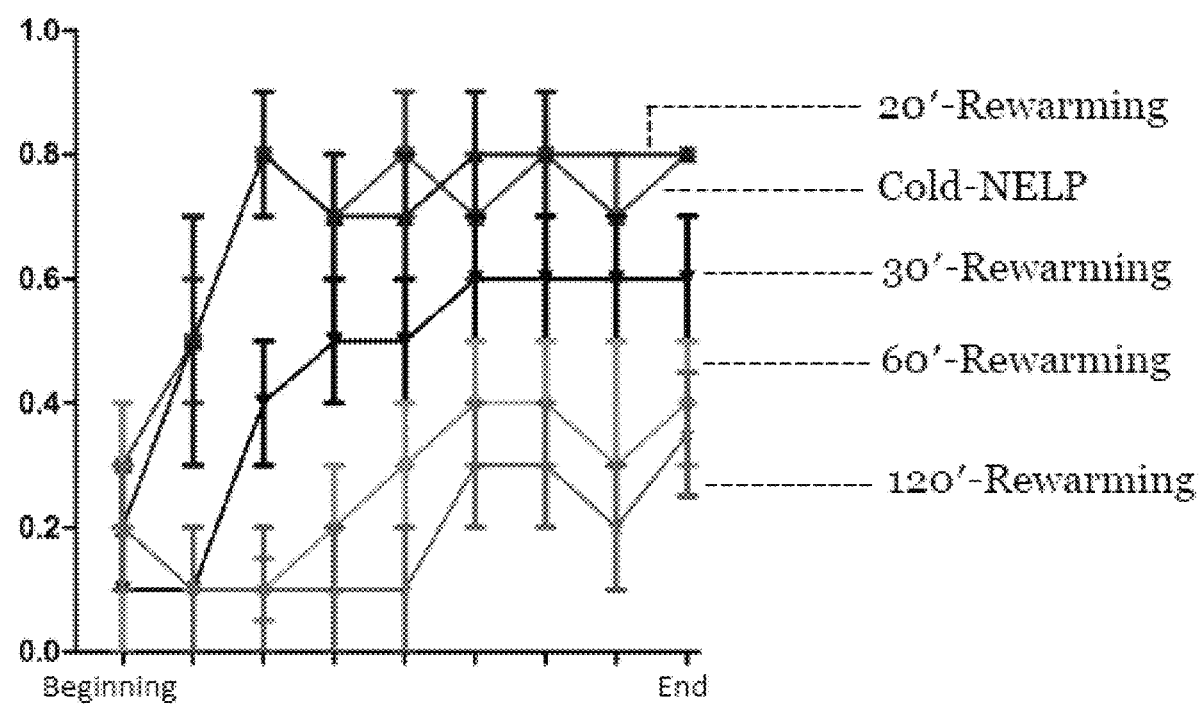
FIG. 8A is a graph showing the oxygen extraction ratio of perfusate in the evaluation period for different experimental groups of no rewarming, 20'-rewarming, 30'-rewarming, 60'-rewarming, 120'-rewarming respectively followed by warm perfusion.

Since oxygen-hemoglobin dissociation curve shifts to the left in low temperatures, to overcome increased hemoglobin affinity towards oxygen, the blood was mildly acidified by the dialyzer and pH was set to 7.2-7.3 during the rewarming period. Oxygen extraction ratio was used as the marker of oxygen utilization by the livers during evaluation phase. O2 extraction ratio was recovered above 50% in the first hour of warm perfusion in the Cold-NELP and 20'- and 30'-Rewarming livers. However, 60'- and 120'-Rewarming livers revealed lower extraction ratio by the end of the evaluation phase: 0.4±0.1 and 0.35±0.1 respectively (FIG. 8A). Oxygen extraction ratio remained above 80% in the Immediate-NELP group during the evaluation phase.

Figure 8B:
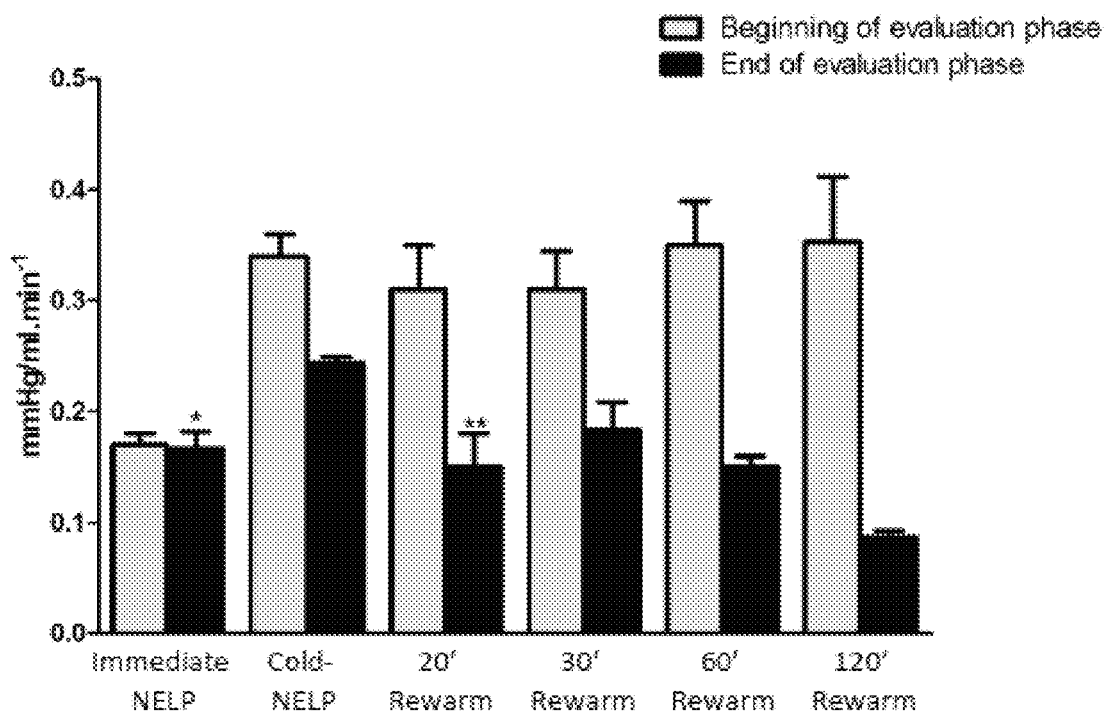
FIG. 8B is a graph showing the vascular resistance of the liver in the evaluation period for different experimental groups of no rewarming, 20'-rewarming, 30'-rewarming, 60'-rewarming, 120'-rewarming respectively followed by warm perfusion.
Figure 8C:
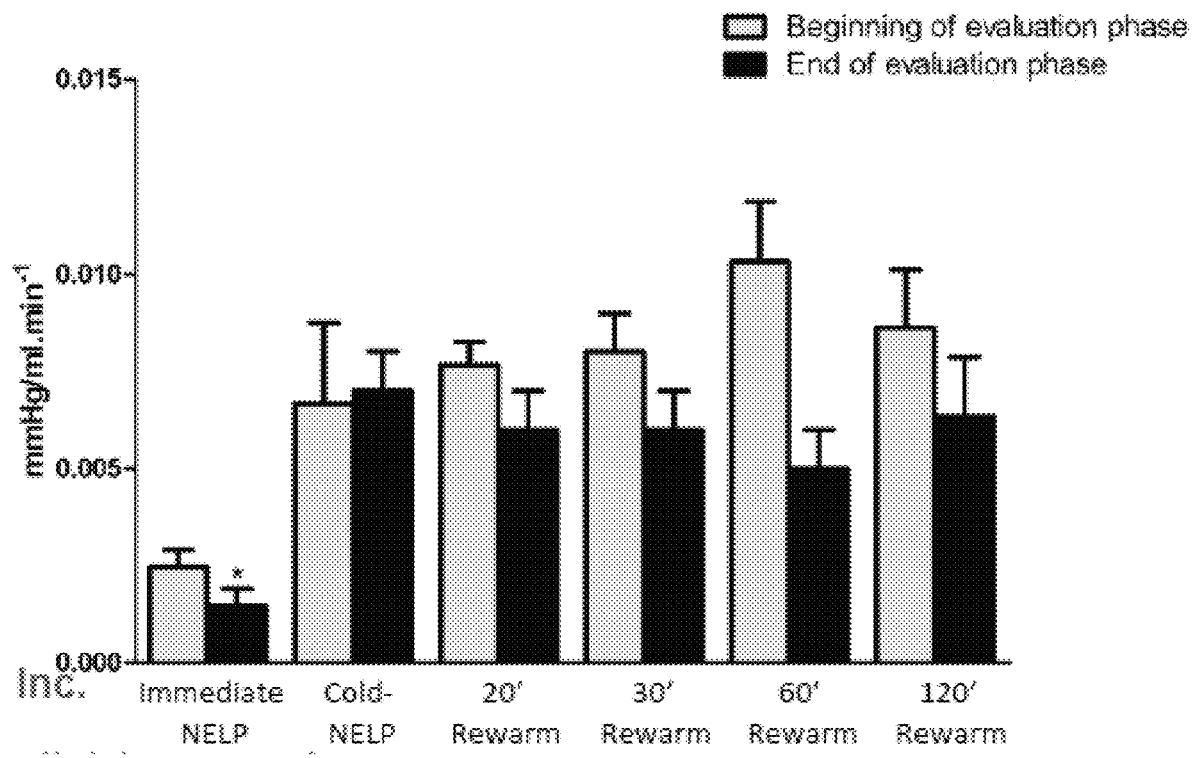
FIG. 8C is a graph showing the vascular resistance of the liver in the evaluation period for different experimental groups of no rewarming, 20'-rewarming, 30'-rewarming, 60'-rewarming, 120'-rewarming respectively followed by warm perfusion.

To assess the hepatic vascular response to gradual rewarming, the NELP circuit was designed as a pressure-controlled system. Hence, the flows were adjusted to keep the pressure within the physiologic ranges for the hepatic artery (75-85 mm Hg) and the portal vein (5-7 mm Hg). In all groups (FIG. 8B and FIG. 8C), the resistance was higher at the beginning of the evaluation phase and lower at the end of experiments. Although the pressures were within physiologic ranges, comparison of the data showed significantly lower hepatic artery resistance in Immediate-NELP group (0.16±0.01 mmHg/ml·min-1, p=0.001) and 20'-Rewarming group (0.15±0.03 mmHg/ml·min-1, p=0.006) when compared to Cold-NELP group (0.24±0.005 mm Hg/ml·min-1) at the end of evaluation phase.

Figure 9A:
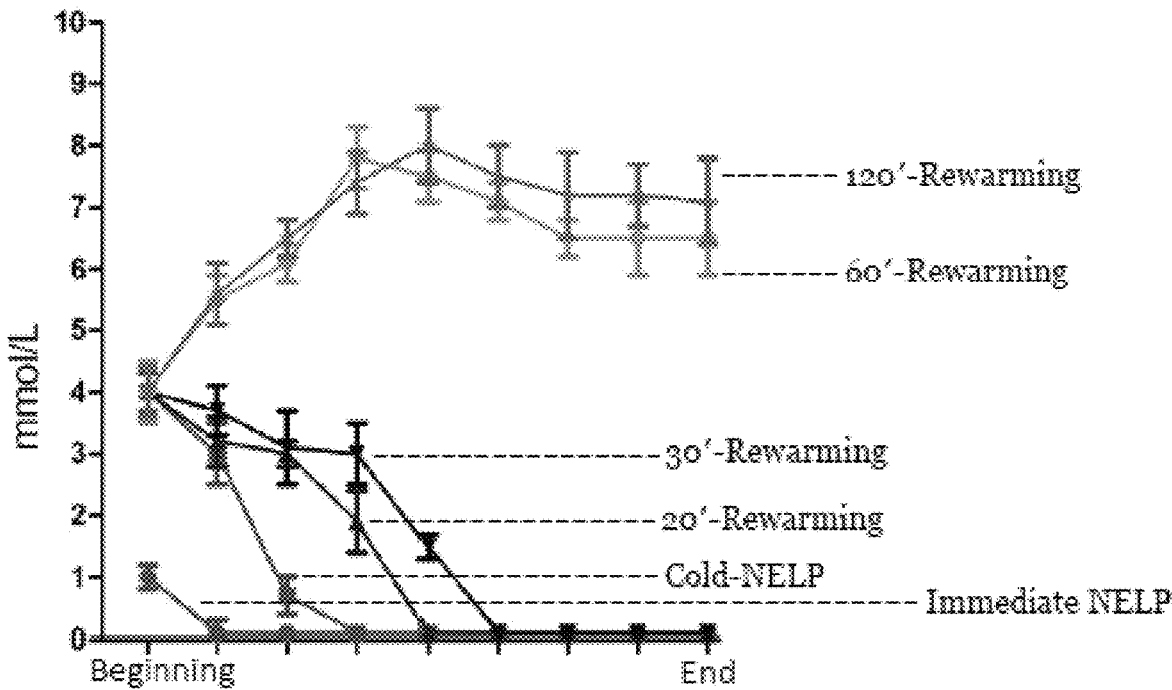
FIG. 9A is a graph showing the lactate level in the perfusate during the evaluation period for different experimental groups of no rewarming, 20'-rewarming, 30'-rewarming, 60'-rewarming, 120'-rewarming respectively followed by warm perfusion.
Figure 9B:
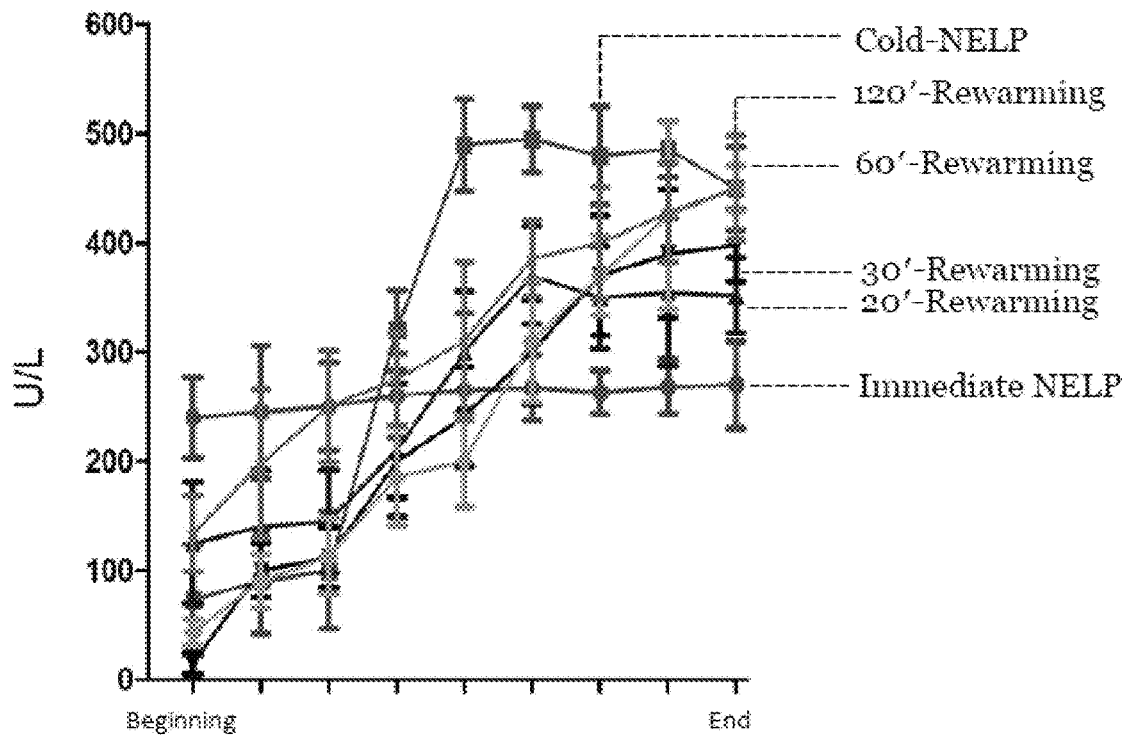
FIG. 9B is a graph showing the AST level in the perfusate during the evaluation period for different experimental groups of no rewarming, 20'-rewarming, 30'-rewarming, 60'-rewarming, 120'-rewarming respectively followed by warm perfusion.
Figure 9C:
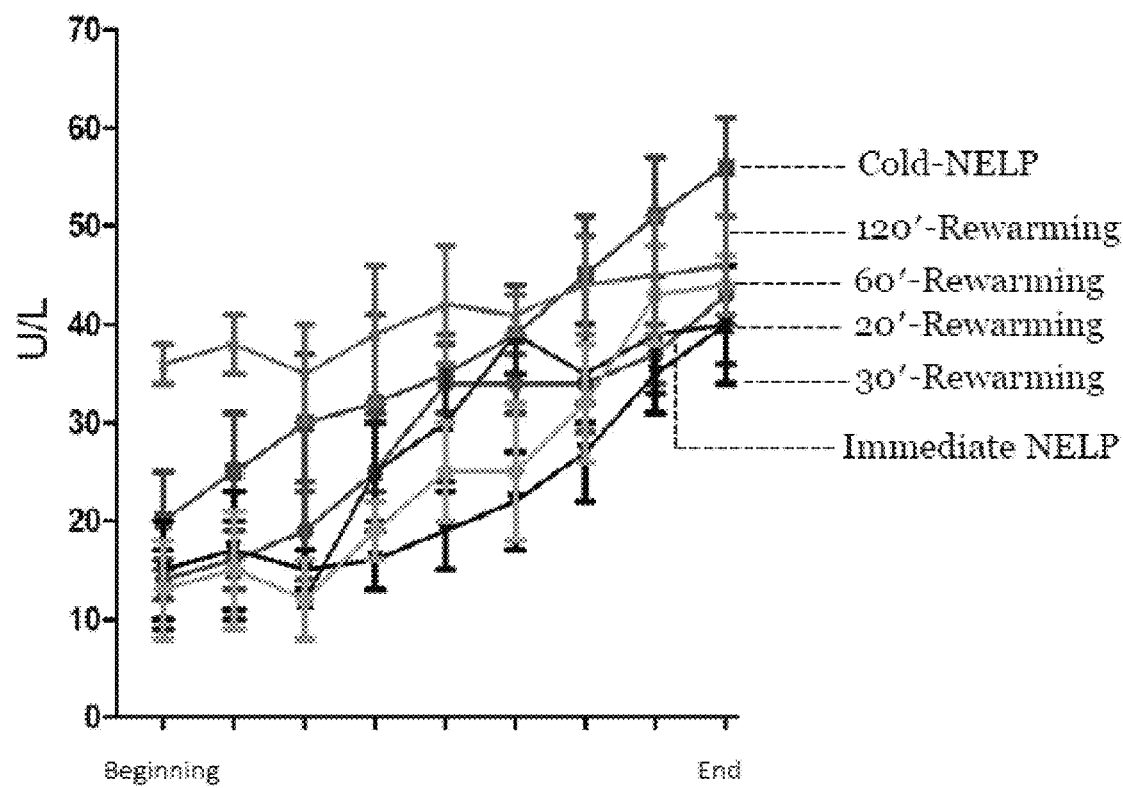
FIG. 9C is a graph showing the ALT level in the perfusate during the evaluation period for different experimental groups of no rewarming, 20'-rewarming, 30'-rewarming, 60'-rewarming, 120'-rewarming respectively followed by warm perfusion.

Lactate was measured as a marker of anaerobic metabolism in the grafts. Our data indicated that gradual rewarming over 30 minutes lead to a significant increase in lactate levels (FIG. 9A). Livers that were rewarmed over 60 and 120 minutes finished the 4 hours of NELP runs with elevated lactate values (6.5±0.6 and 7.2±0.7 mmol/L respectively), suggesting that after prolong rewarming periods anaerobic metabolism continues despite perfusion with normothermic blood. Lactate levels dropped dramatically in the Immediate-NELP group in first 30 minutes of warm perfusion. In the Cold-NELP group, although the mean starting lactate concentrations were elevated (4±0.03 mmol/L), they decreased after one hour of warm perfusion. Liver enzymes were measured to evaluate hepatocyte damage. Immediate-NELP group livers had the most stable hepatic enzyme levels throughout the experiments and finished the study with significantly lower concentrations of liver enzymes when compared to Cold-NELP livers (FIG. 3B): AST (270±40 U/L vs. 450±38 U/L, p<0.001) and ALT (43±3 U/L vs. 56±5 U/L, p=0.01). Comparison of ALT levels between the Cold-NELP group and rewarmed livers showed statistically significant lower ALT in the 20'-Rewarming (40±4 U/L, p=0.012), 30'-Rewarming (40±6 U/L, p=0.009), 60'-Rewarming (44±3 U/L, p=0.02) groups, but not in the 120'-Rewarming (46±5 U/L, p>0.05) group. Comparison of rewarmed livers with the Immediate-NELP group did not show statistically significant differences in ALT values.

Comparing final AST concentrations between the Cold-NELP group and rewarmed livers did not reveal any significant differences. These data suggest that rewarming of a cold preserved liver is "safe" and does not further extend the injuries to the hepatocytes from cold preservation period.

Figure 10A:
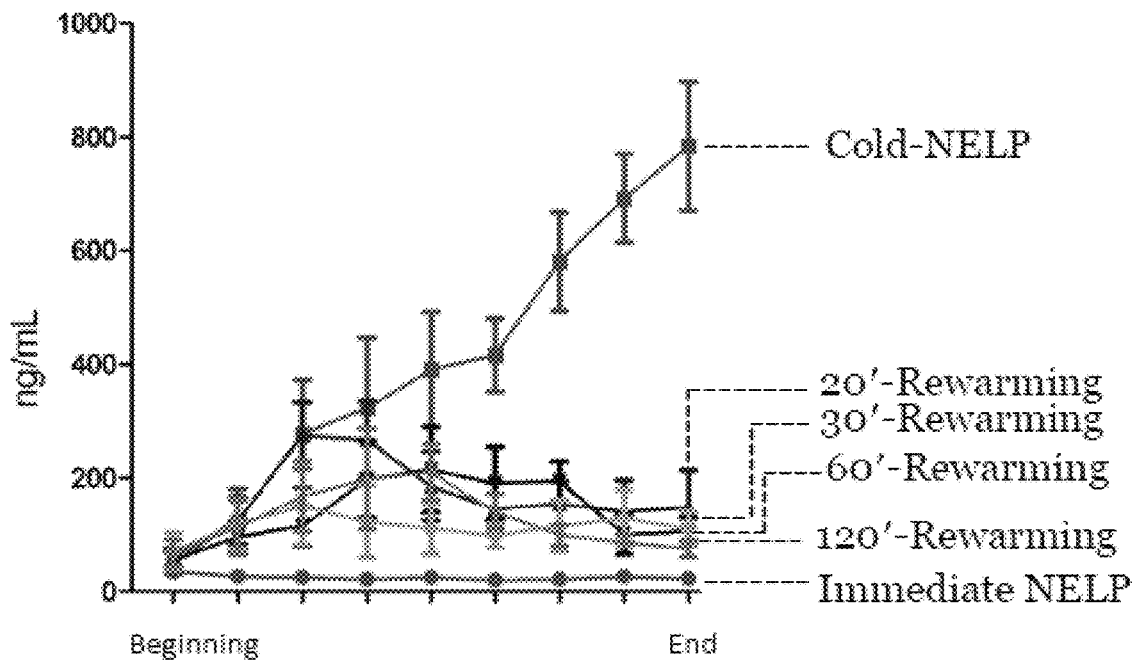
FIG. 10A is a graph showing the beta-galactosidase level in the perfusate during the evaluation period for different experimental groups of no rewarming, 20'-rewarming, 30'-rewarming, 60'-rewarming, 120'-rewarming respectively followed by warm perfusion.

Rewarming led to lower Kupffer cell activation and sinusoidal endothelial cells damage. β-galactosidase is a lysosomal enzyme that is mainly released by Kupffer cells following activation. Using ELISA assay to measure hourly β-galactosidase levels in the perfusate, it was found that Immediate-NELP livers had low steady concentrations of β-galactosidase in the perfusate and completed the study with significantly lower enzyme levels when compared to Cold-NELP livers (23±9 vs. 784±113 ng/mL, p<0.001) (FIG. 10A). Rewarmed livers, however, revealed a different pattern of enzyme release when compared to the Cold-NELP group: in the 20'-Rewarming group, the enzyme peaked at 90 minutes of NELP (268±68 ng/mL) and gradually decreased until the end of the experiment (149±65 ng/mL, p<0.001). In 30'-Rewarming group the enzyme peaked at 120 minutes of NELP and gradually reduced decreased the end of the study (105±25 ng/mL, p<0.001). 60'-Rewarming livers peaked at 60 minutes of warm perfusion (151±69 ng/mL) and completed the experiments with remarkably lower enzyme concentrations (110±30 ng/mL, p<0.001). Interestingly, 120'-Rewarming had the lowest overall enzyme levels among rewarmed groups: enzyme levels peaked at 120 minutes of NELP and significantly decrease to 75±15 ng/mL (p<0.001) by end of the study. These data indicate that gradual rewarming of a cold preserved liver significantly reduces Kupffer cell activation after starting warm perfusion.

Figure 10B:
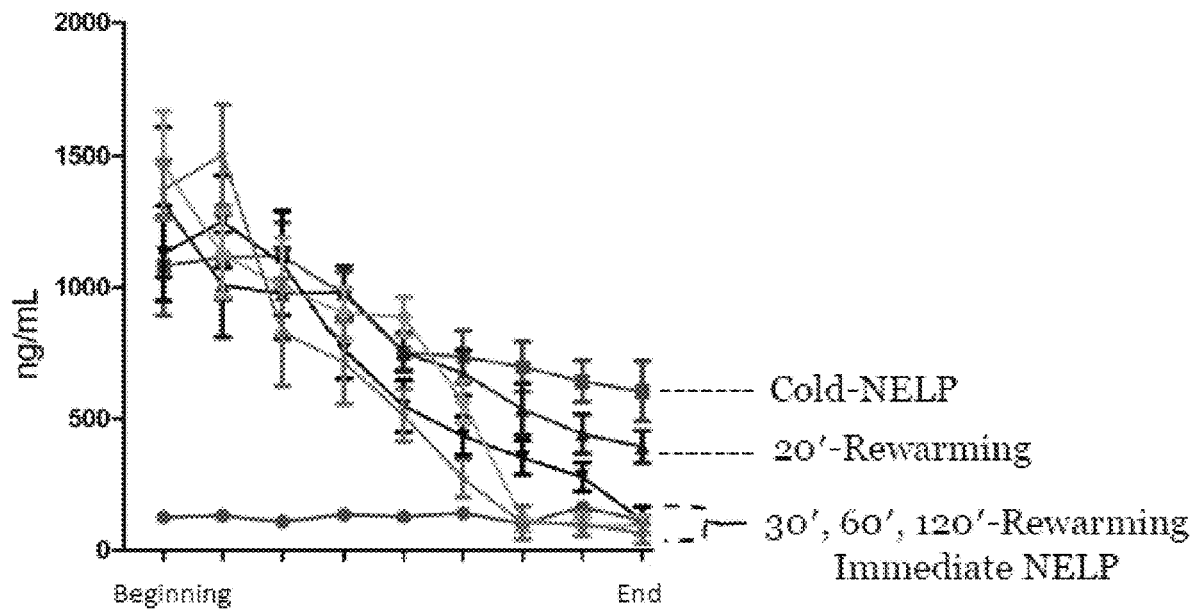
FIG. 10B is a graph showing the hyaluronic acid level in the perfusate during the evaluation period for different experimental groups of no rewarming, 20'-rewarming, 30'-rewarming, 60'-rewarming, 120'-rewarming respectively followed by warm perfusion.

Hyaluronic acid is a matrix polysaccharide enzyme that is known to be associated with inflammation and has been used as a marker of SEC damage. Using ELISA assays, concentrations of hyaluronic acid in the perfusate were measured at hourly intervals. Immediate-NELP livers had constantly lower concentrations throughout the experiments and completed the study with significantly lower hyaluronic acid concentrations when compared to Cold-NELP group (113±14 ng/mL vs. 603±115 ng/mL, p<0.001) (FIG. 10B). In Cold-NELP and rewarmed groups, enzyme release was diminished during warm perfusion nevertheless. Generally, rewarmed livers had significantly lower enzyme release by the end of the experiments when compared to Cold-NELP group, however, 60'- and 120'-Rewarming livers revealed the lowest concentrations: 20'-Rewarming (392±62 ng/mL, p>0.05), 30'-Rewarming (114±50 ng/mL, p<0.001), 60'-Rewarming (95±35 ng/mL, p<0.001) and 120'-Rewarming (65±39 ng/mL, p<0.001). These data suggest that the slower rate of rewarming period leads to a significant reduction in cold-induced SEC damage.

Figure 10C:
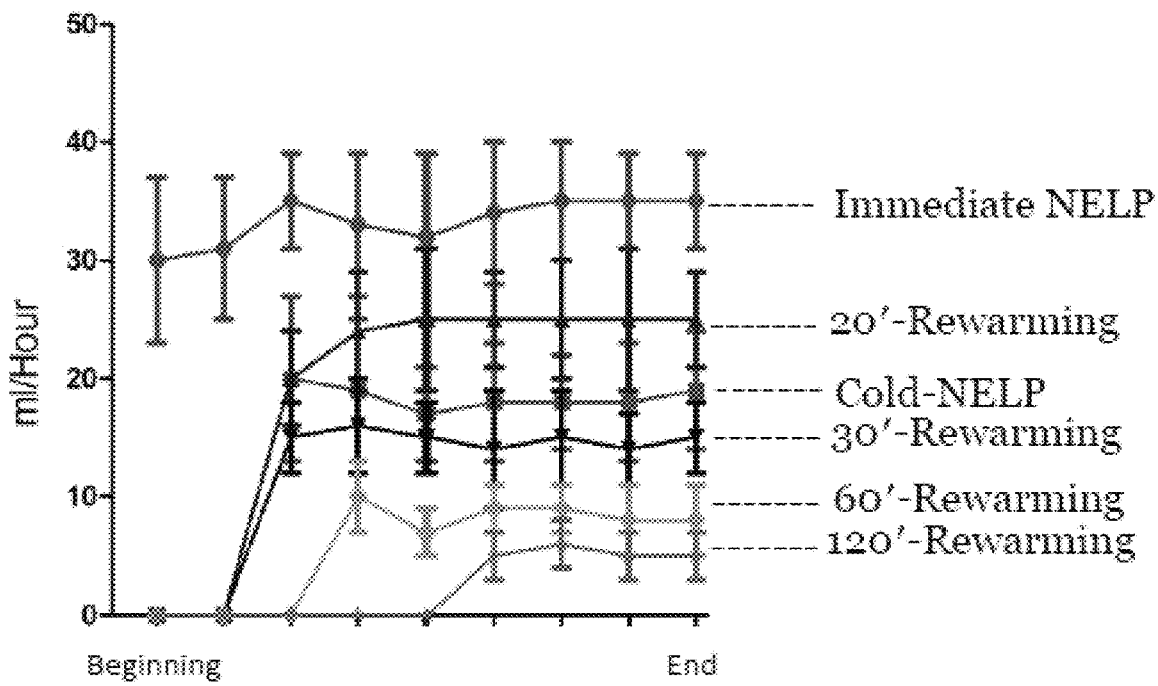
FIG. 10C is a graph showing the bile production during the evaluation period for different experimental groups of no rewarming, 20'-rewarming, 30'-rewarming, 60'-rewarming, 120'-rewarming respectively followed by warm perfusion.

Fast rewarming led to better bile and coagulation factors production when compared to slow rewarming. Immediate-NELP livers started making bile almost immediately upon placement on NELP and maintained remarkably high bile production during the study. At the end of experiments, Immediate-NELP livers had significantly higher bile production when compared to the Cold-NELP group: 35±4 vs. 19±5 ml/hour (p<0.001) (FIG. 10C). In rewarming livers, a short period of rewarming yielded better bile production when compared to long rewarming periods. However, comparison of bile production of Cold-NELP livers at the end of the experiments with 20'- and 30'-Rewarming did not show statistically significant differences: 20'-Rewarming (25±4 ml/hour, p>0.05) and 30'-Rewarming (15±3 ml/hour, p>0.05). 60'- and 120'-Rewarming livers produced remarkably lower bile during warm perfusion when compared to Cold-NELP group: 8±3 ml/hour (p=0.03) and 5±2 ml/hour (p<0.001) respectively.

Figure 10D:
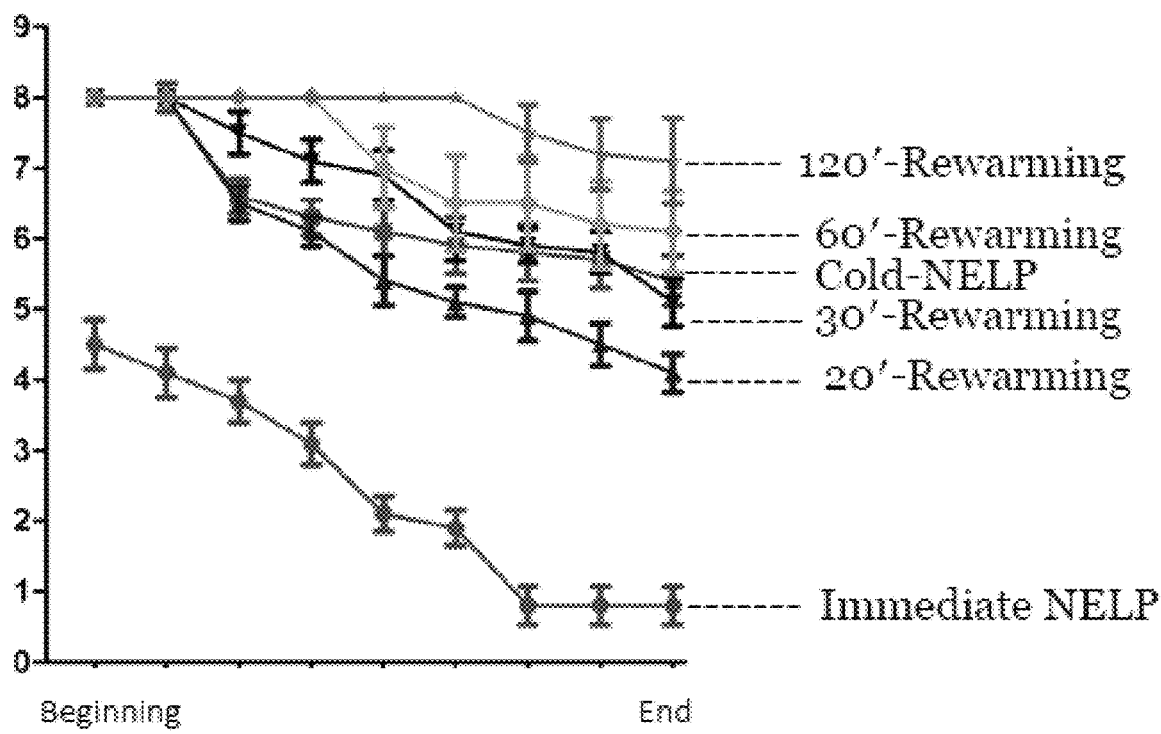
FIG. 10D is a graph showing the INR level during the evaluation period for different experimental groups of no rewarming, 20'-rewarming, 30'-rewarming, 60'-rewarming, 120'-rewarming respectively followed by warm perfusion.

Production of coagulation factors was assessed by measuring INR. The Immediate-NELP group started the experiments with INR of 4.5±0.3 and completed the study with significantly lower INR when compared to Cold-NELP group (0.8±0.3 vs. 5.4±0.4, p<0.001) (FIG. 10D). Among the gradual rewarming livers, only 20'-Rewarming completed the experiments with significantly lower INR compared to Cold-NELP group: 20'-Rewarming (4.1±0.2, p<0.001), 30'-Rewarming (5.1±0.3, p>0.05), 60'-Rewarming (6.1±0.6, p>0.05) and 120'-Rewarming (7.1±0.6, p>0.05).

Figure 11A:
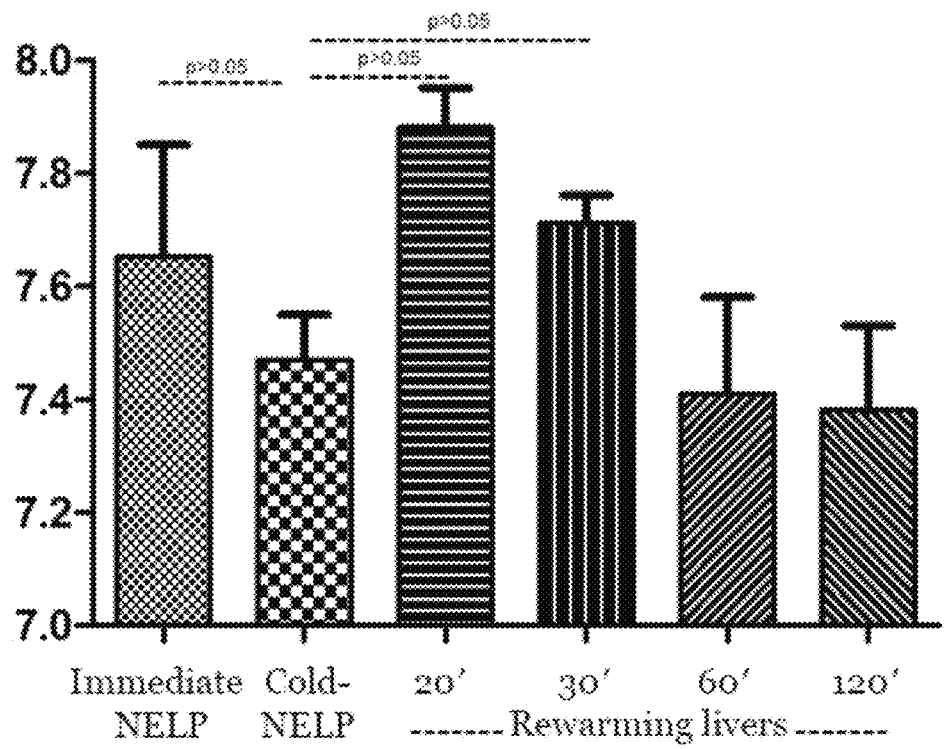
FIG. 11A is a graph showing the biliary pH during the evaluation period for different experimental groups of no rewarming, 20'-rewarming, 30'-rewarming, 60'-rewarming, 120'-rewarming respectively followed by warm perfusion.

Short period of rewarming preserved cholangiocytes' function and led to less biliary epithelial injury. Biliary epithelial cell function was evaluated by assessing pH, bicarbonate and glucose concentrations in produced bile by the livers. In addition, the degree of damage to the epithelial cells was evaluated by measuring alkaline phosphatase (ALP) and lactate dehydrogenase (LDH) concentrations in the bile. Our data revealed overall higher cholangiocyte function as well as less damage in 20'- and 30'-Rewarming livers when compared to Cold-NELP group. At the end of evaluation phase there were no significant differences in biliary pH: 7.88±0.07 (p>0.05) for 20'-Rewarming and 7.71±0.05 (p>0.05) for 30'-Rewarming and Cold-NELP group (7.47±0.08). However, the results showed remarkable differences in glucose and bicarb concentrations when compared to Cold-NELP group (FIG. 11A). Biliary glucose: Immediate-NELP (41±3 mg/dL, p=0.012), 20'-Rewarming (40±3 mg/dL, p=0.02), 30'-Rewarming (37±6 mg/dL, p>0.05) and Cold-NELP group (34±2 mg/dL). Biliary bicarb concentrations were: Immediate-NELP group (25±3 mmol/L, p=0.003), 20'-Rewarming (19±1.7 mmol/L, p=0.04), 30'-Rewarming (19±2 mmol/L, p=0.003) and Cold-NELP group (34±2 mmol/L).

Figure 11B:
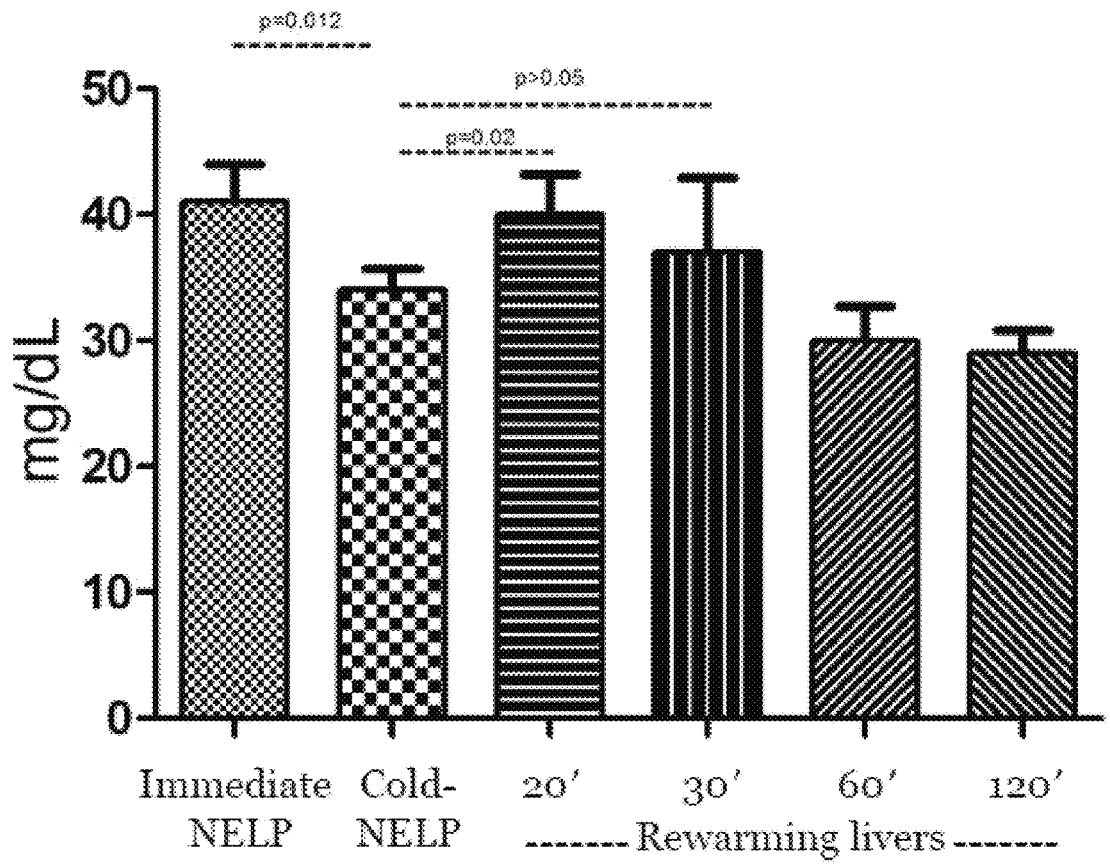
FIG. 11B is a graph showing the biliary glucose level during the evaluation period for different experimental groups of no rewarming, 20'-rewarming, 30'-rewarming, 60'-rewarming, 120'-rewarming respectively followed by warm perfusion.
Figure 11C:
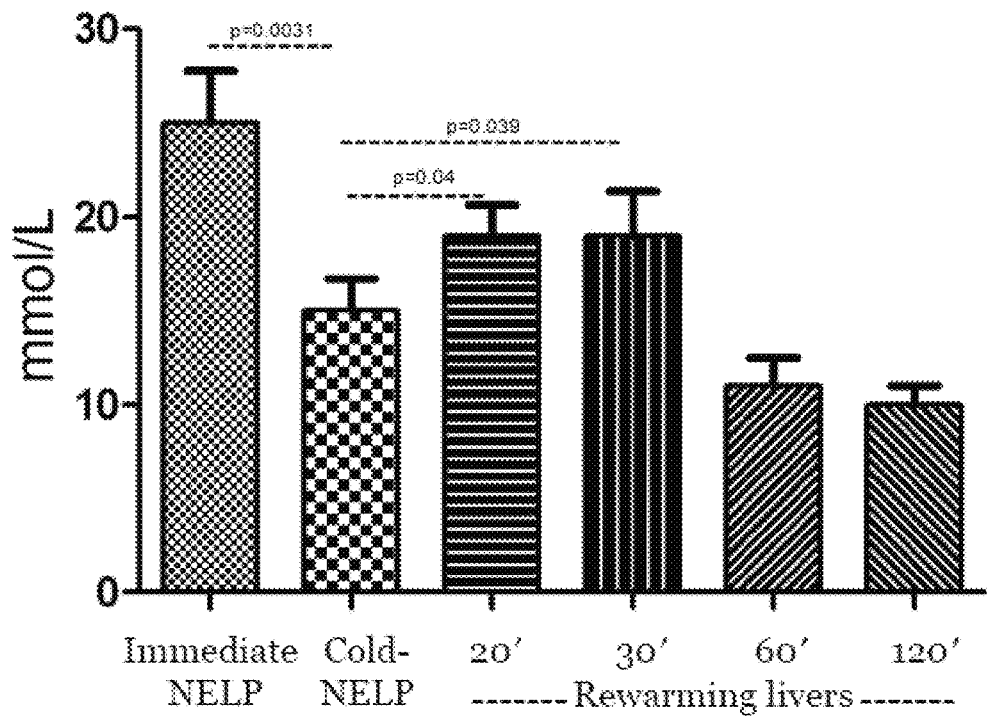
FIG. 11C is a graph showing the biliary bicarbonate level during the evaluation period for different experimental groups of no rewarming, 20'-rewarming, 30'-rewarming, 60'-rewarming, 120'-rewarming respectively followed by warm perfusion.
Figure 11D:
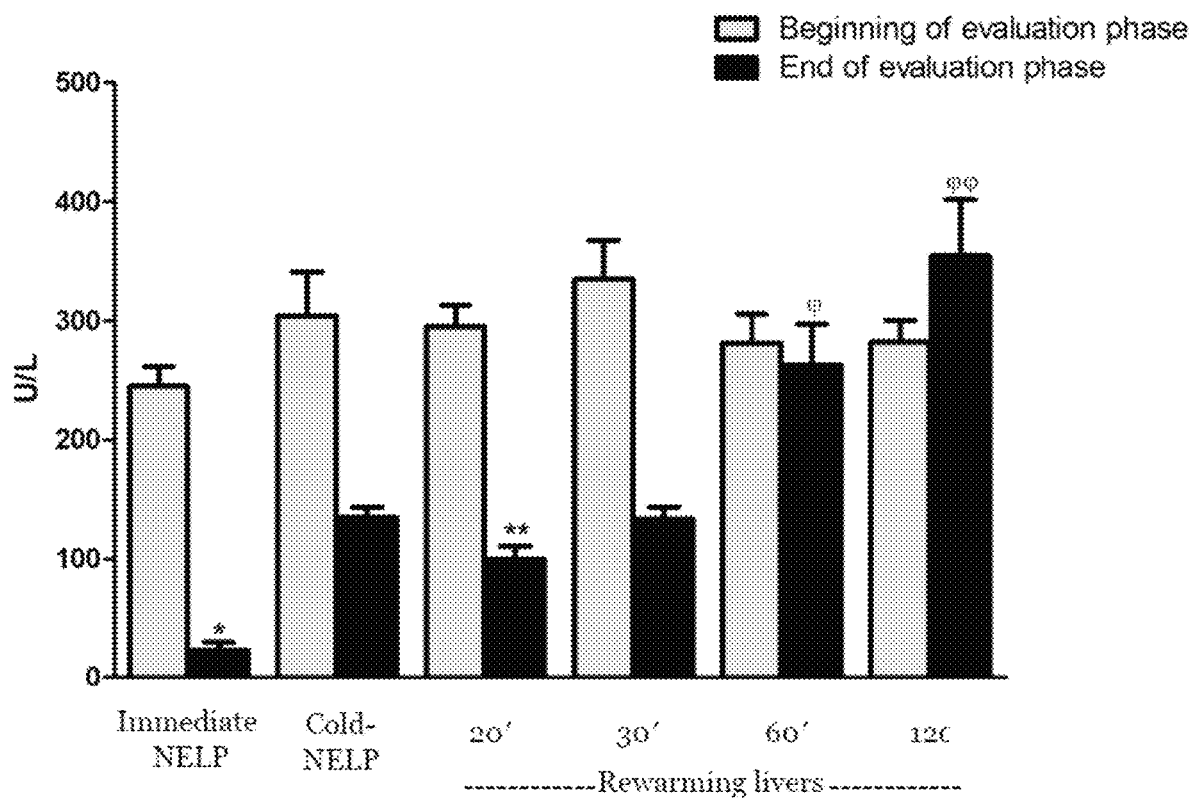
FIG. 11D is a graph showing the biliary ALP level during the evaluation period for different experimental groups of no rewarming, 20'-rewarming, 30'-rewarming, 60'-rewarming, 120'-rewarming respectively followed by warm perfusion.
Figure 11E:
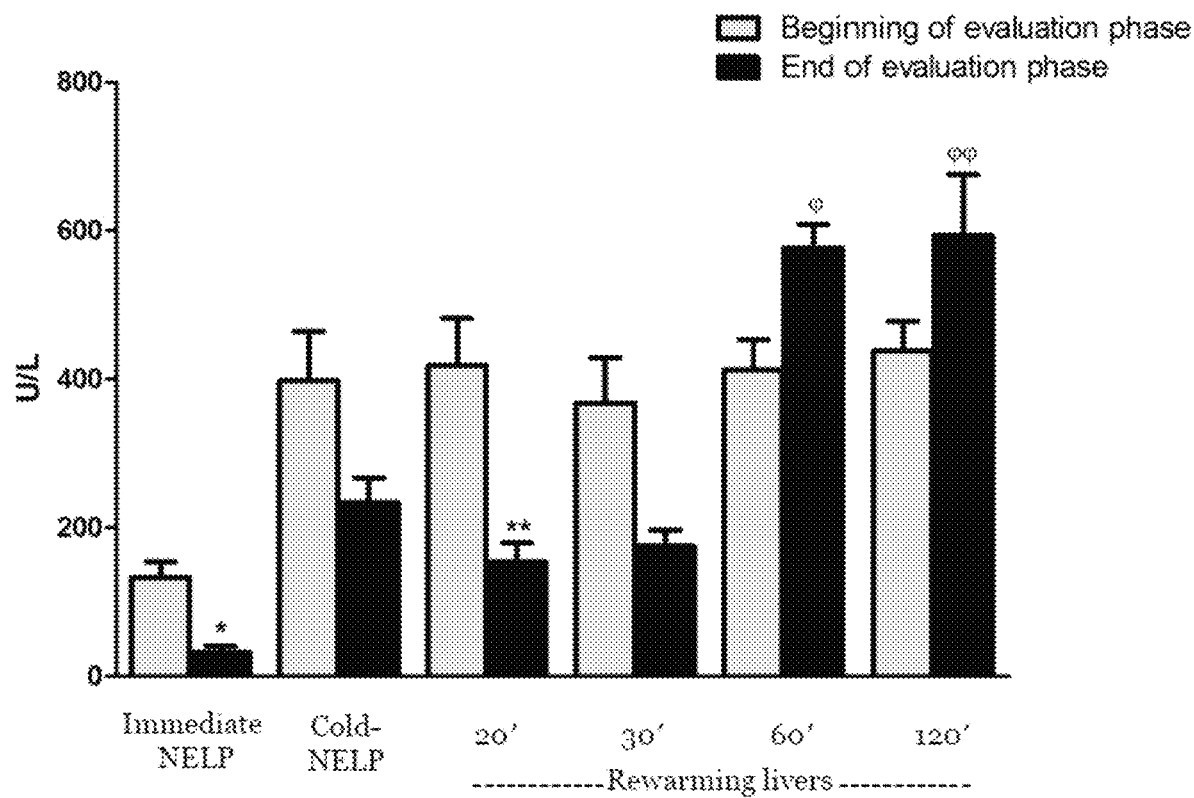
FIG. 11E is a graph showing the biliary LDH level during the evaluation period for different experimental groups of no rewarming, 20'-rewarming, 30'-rewarming, 60'-rewarming, 120'-rewarming respectively followed by warm perfusion.
Figure 12A:
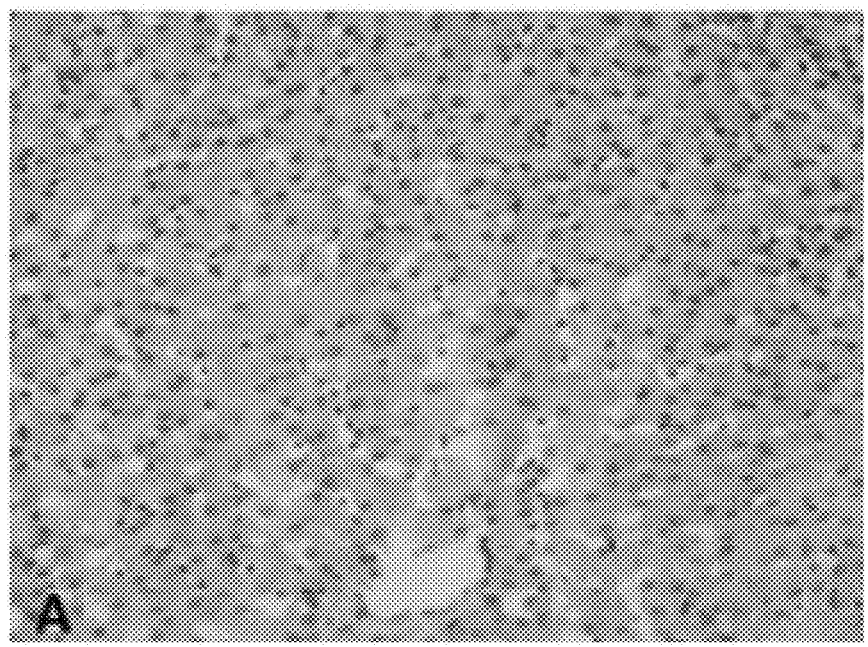
FIG. 12A is a histological picture of H&E staining of the liver, at the end of perfusion period of the experimental group of immediate warm perfusion.
Figure 12B:
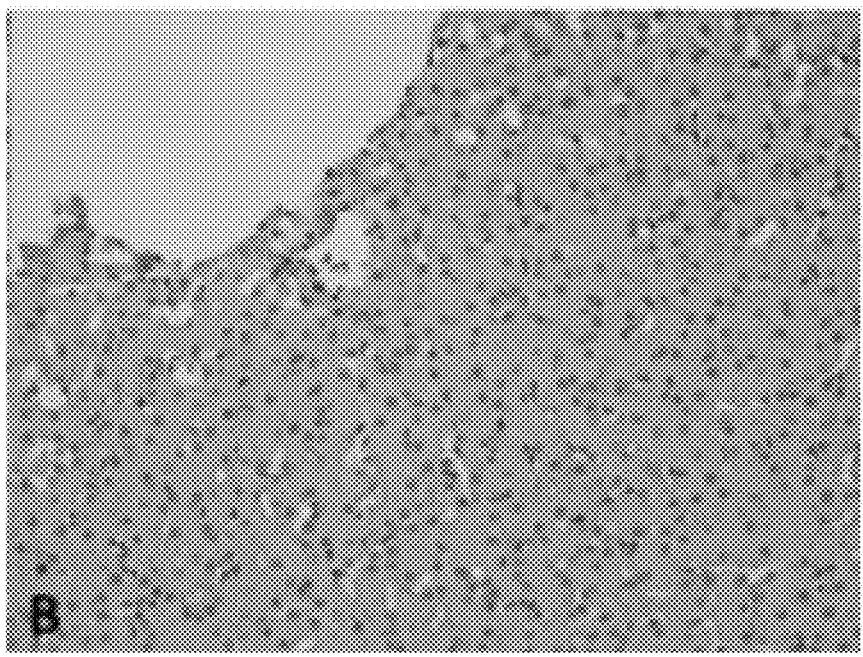
FIG. 12B is a histological picture of H&E staining of the liver, at the end of perfusion period of the experimental group 20'-rewarming followed by warm perfusion.
Figure 12C:
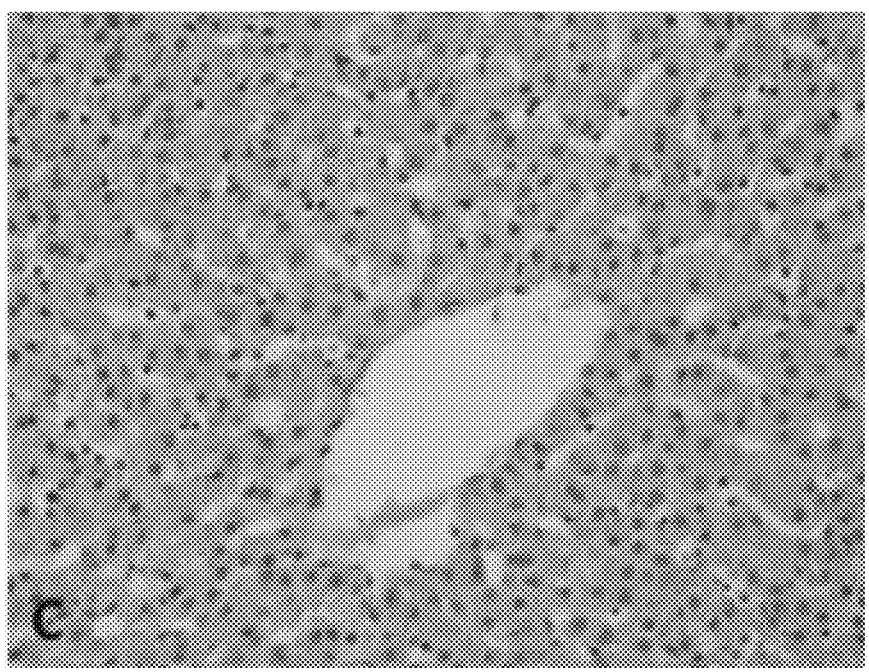
FIG. 12C is a histological picture of H&E staining of the liver, at the end of perfusion period of the experimental group 30'-rewarming followed by warm perfusion.
Figure 12D:
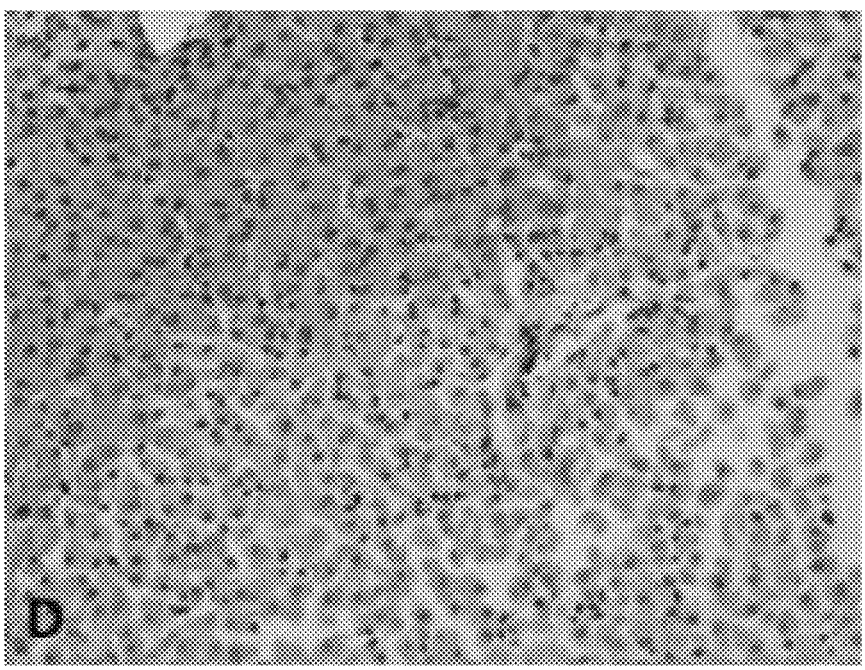
FIG. 12D is a histological picture of H&E staining of the liver, at the end of perfusion period of the experimental group no rewarming from cold followed by warm perfusion.
Figure 12E:
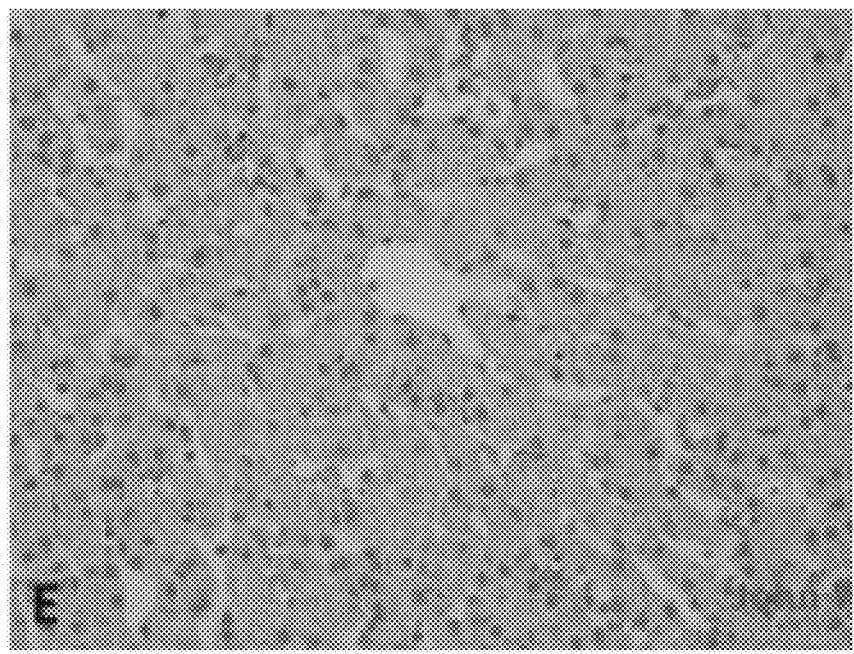
FIG. 12E is a histological picture of H&E staining of the liver, at the end of perfusion period of the experimental group 60'-rewarming followed by warm perfusion.
Figure 12F:
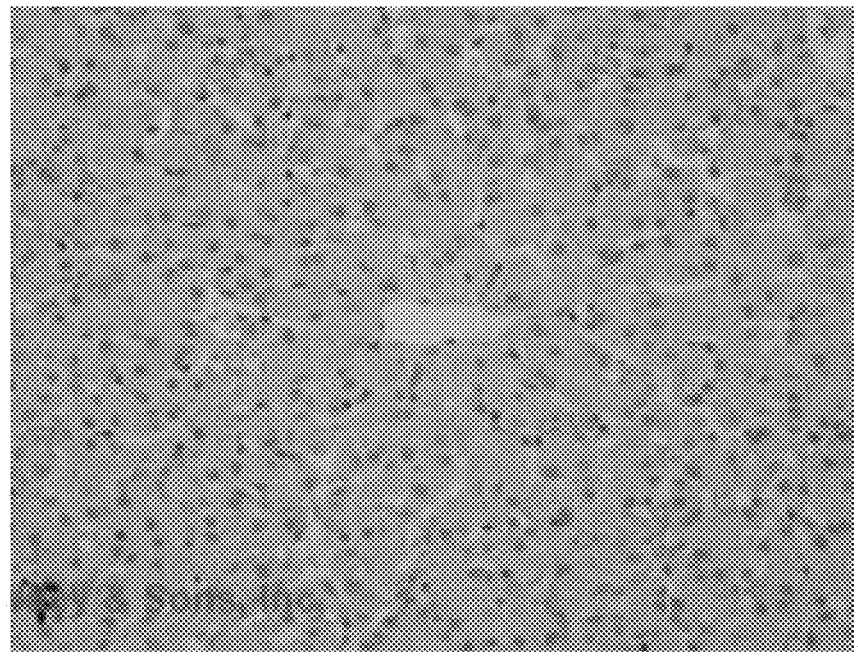
FIG. 12F is a histological picture of H&E staining of the liver, at the end of perfusion period of the experimental group 120'-rewarming followed by warm perfusion.
Figure 13:
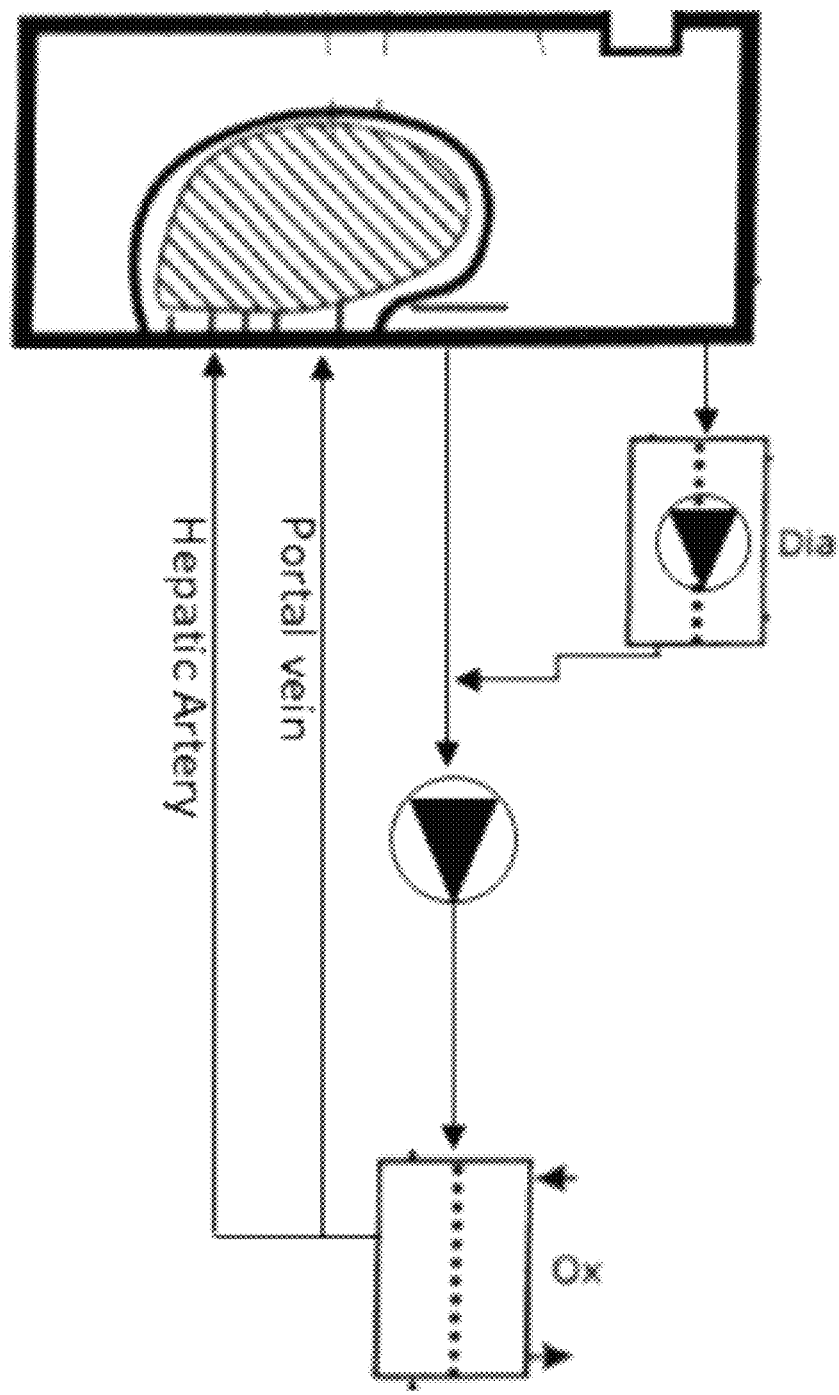
FIG. 13 illustrates warm perfusion circuit for the liver contains one centrifugal pump and a dialyzer.

Markers of epithelial injury were significantly lower in Immediate-NELP group and 20'-Rewarming when compared to Cold-NELP livers. However, last two groups revealed significantly higher biliary concentrations of ALP and LDH at the end of evaluation phase (FIG. 11B): ALP levels were 22.6±6.8 U/L (p<0.001) for Immediate-NELP, 99.6±10.5 U/L (p=0.012) for 20'-Rewarming, 175±21 (p>0.05) for 30'-Rewarming, 262.3±35 U/L (p=0.003) for 60'-Rewarming, 354.6±47 U/L (p<0.001) for 120'-Rewarming and 134.6±8 U/L for Cold-NELP group. LDH levels were 31.6±9 U/L (p<0.001) for Immediate-NELP group, 154.3±24 U/L (p=0.02) for 20'-Rewarming, 175±21 (p>0.05) for 30'-Rewarming, 576.3±32 U/L (p=0.002) for 60'-Rewarming, 593.6±82 U/L (p=0.002) for 120'-Rewarming and 233.3±33 U/L for Cold-NELP group. These data suggest that gradual rewarming over 20-30 minutes can decrease biliary epithelial damage in cold-preserved livers.

Gradual rewarming led to significant IRI reduction after warm perfusion with NELP. H&E staining of Immediate-NELP livers showed little evidence of necrosis or IRI in the liver sections. Cold-NELP liver sections showed confluent necrosis with mild IRI but tissue obtained from rewarmed livers uniformly had little IRI or hepatocellular necrosis (FIG. 12).

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A normothermic extracorporeal perfusion system for perfusing a human liver, the system comprising:
- an organ chamber containing the human liver to be perfused and a perfusate comprising blood that flows through the system, wherein the organ chamber serves as a reservoir for the perfusate;
- a perfusion circuit comprising:
  - a membrane oxygenator operable to oxygenate the perfusate, the membrane oxygenator comprising a heat exchanger for heating or cooling the perfusate; and
  - one centrifugal pump operable to move the oxygenated perfusate through the system;
- a dialysis circuit comprising:
  - a dialyzer;
- wherein the perfusion circuit and dialysis circuit are in parallel,
- wherein the centrifugal pump supplies the oxygenated, dialyzed perfusate to a first input connected to the hepatic artery and a second input connected to the portal vein,
- wherein the perfusate has a total volume of 800 cc to 1400 cc.

2. The system of claim 1, further comprising at least one pressure probe and at least one flow probe.

3. The system of claim 1, further comprising a flow controller, wherein the pressure within the system is maintained at the physiological pressure of an organ by controlling the pressure using the flow controller.

4. The system of claim 1, further comprising a thermo-electric water pump connected to the heat exchanger for controlling the perfusate temperature and incrementally increasing the temperature until the temperature reaches a physiological temperature of about 37-38° C.

5. The system of claim 1, wherein the system is a single re-circulating closed system.

6. The system of claim 1, further comprising a measurement cell for real-time monitoring of oxygen saturation and hematocrit of the perfusate.

7. The system in claim 1 wherein the organ is liver and the liver is in a dual circuit through the portal vein and the hepatic artery.

8. The system of claim 1, wherein the system is primed with a physiological solution and an anticoagulant before adding the perfusate.

9. The system of claim 1 further comprising a collection port to periodically collect perfusate during perfusion.

* * * * *